US008762178B2

(12) United States Patent
Ruggieri et al.

(10) Patent No.: US 8,762,178 B2
(45) Date of Patent: Jun. 24, 2014

(54) SYSTEM AND METHOD FOR PROVIDING GLOBAL INFORMATION ON RISKS AND RELATED HEDGING STRATEGIES

(75) Inventors: Tom Ruggieri, New York, NY (US); Edward Forer, New York, NY (US)

(73) Assignee: Advisen, Ltd., New York, NY (US)

( * ) Notice: Subject to any disclaimer, the term of this patent is extended or adjusted under 35 U.S.C. 154(b) by 1280 days.

(21) Appl. No.: 11/021,111

(22) Filed: Dec. 23, 2004

(65) Prior Publication Data

US 2005/0154617 A1    Jul. 14, 2005

Related U.S. Application Data

(63) Continuation-in-part of application No. 10/949,112, filed on Sep. 24, 2004, now abandoned, which is a continuation of application No. 09/969,493, filed on Oct. 1, 2001, now abandoned.

(60) Provisional application No. 60/242,483, filed on Sep. 30, 2000, provisional application No. 60/532,780, filed on Dec. 24, 2003.

(51) Int. Cl.
*G06Q 40/08* (2012.01)

(52) U.S. Cl.
CPC ..................... *G06Q 40/08* (2013.01)
USPC .......................................................... 705/4

(58) Field of Classification Search
CPC .................................................. G06Q 40/08
USPC .......................................................... 705/37
See application file for complete search history.

(56) References Cited

U.S. PATENT DOCUMENTS

| | | | | |
|---|---|---|---|---|
| 4,718,025 A | * | 1/1988 | Minor et al. | 702/187 |
| 5,446,885 A | | 8/1995 | Moore et al. | |
| 5,630,127 A | * | 5/1997 | Moore et al. | 707/103 R |
| 5,799,287 A | * | 8/1998 | Dembo | 705/36 R |
| 5,806,049 A | * | 9/1998 | Petruzzi | 705/36 R |
| 5,812,988 A | * | 9/1998 | Sandretto | 705/36 R |
| 5,893,071 A | | 4/1999 | Cooperstein | |
| 5,930,762 A | * | 7/1999 | Masch | 705/7 |
| 5,963,910 A | * | 10/1999 | Ulwick | 705/7 |
| 5,970,479 A | * | 10/1999 | Shepherd | 705/37 |
| 5,991,743 A | * | 11/1999 | Irving et al. | 705/36 R |
| 5,991,751 A | * | 11/1999 | Rivette et al. | 707/1 |
| 6,009,402 A | * | 12/1999 | Whitworth | 705/4 |
| 6,021,402 A | * | 2/2000 | Takriti | 705/412 |

(Continued)

OTHER PUBLICATIONS

Features—A review of Lexis-Nexis Intranet Solutions, Roger V. Skalbeck, published May 16, 1999, 7 pages.*

(Continued)

*Primary Examiner* — Bruce I Ebersman
(74) *Attorney, Agent, or Firm* — Sofer & Haroun, LLP

(57) ABSTRACT

The present system provides information on risks and related hedging strategies. A plurality of client terminals are coupled to the system, for providing access to the system for accessing information on risks and related hedging strategies. A data aggregation module is configured to store financial and risk related information from a plurality of data sources, including private client data sources and public data sources. An analytical module is coupled to the data aggregation module, and configured to perform benchmarking estimates based on information retrieved from the private client data sources and the public data sources. The benchmarking estimates are performed against the private data and the public data obtained from a plurality of industries.

6 Claims, 76 Drawing Sheets

(56) References Cited

U.S. PATENT DOCUMENTS

| | | | |
|---|---|---|---|
| 6,064,972 A * | 5/2000 | Jankowitz et al. | 705/7 |
| 6,078,903 A * | 6/2000 | Kealhofer | 705/36 R |
| 6,078,904 A * | 6/2000 | Rebane | 705/36 R |
| 6,078,905 A * | 6/2000 | Pich-LeWinter | 705/36 R |
| 6,088,678 A * | 7/2000 | Shannon | 705/7.23 |
| 6,253,186 B1 * | 6/2001 | Pendleton, Jr. | 705/2 |
| 6,272,471 B1 * | 8/2001 | Segal | 705/4 |
| 6,278,981 B1 * | 8/2001 | Dembo et al. | 705/36 R |
| 6,336,096 B1 | 1/2002 | Jernberg | |
| 6,456,979 B1 * | 9/2002 | Flagg | 705/4 |
| 6,523,021 B1 * | 2/2003 | Monberg et al. | 1/1 |
| 6,587,552 B1 * | 7/2003 | Zimmermann | 379/114.14 |
| 6,654,735 B1 * | 11/2003 | Eichstaedt et al. | 707/749 |
| 6,691,106 B1 * | 2/2004 | Sathyanarayan | 1/1 |
| 6,725,201 B2 * | 4/2004 | Joao | 705/4 |
| 6,879,984 B2 * | 4/2005 | Duddleson et al. | 1/1 |
| 6,937,990 B1 * | 8/2005 | Walker et al. | 705/4 |
| 7,130,779 B2 | 10/2006 | Beverina et al. | |
| 7,249,080 B1 * | 7/2007 | Hoffman et al. | 705/36 R |
| 7,263,492 B1 * | 8/2007 | Suresh et al. | 705/2 |
| 7,401,036 B2 | 7/2008 | Vande Pol | |
| 2002/0002475 A1 * | 1/2002 | Freedman et al. | 705/4 |
| 2002/0032586 A1 * | 3/2002 | Joao | 705/4 |
| 2002/0046053 A1 * | 4/2002 | Hare et al. | 705/1 |
| 2002/0095317 A1 * | 7/2002 | McCabe | 705/4 |
| 2002/0138407 A1 * | 9/2002 | Lawrence et al. | 705/38 |
| 2002/0194014 A1 * | 12/2002 | Starnes et al. | 705/1 |
| 2002/0198744 A1 * | 12/2002 | Sagalow et al. | 705/4 |
| 2003/0028404 A1 * | 2/2003 | Herron et al. | 705/4 |
| 2003/0061075 A1 * | 3/2003 | Heckman et al. | 705/4 |
| 2003/0093304 A1 * | 5/2003 | Keller et al. | 705/4 |
| 2004/0054553 A1 * | 3/2004 | Zizzamia et al. | 705/1 |
| 2005/0027645 A1 * | 2/2005 | Lui et al. | 705/38 |
| 2007/0005515 A1 * | 1/2007 | Rosenberg | 705/76 |

OTHER PUBLICATIONS

US "Business Insurance, Risk Management & Online Resources Spotlight report" Dec. 2000 detailing known software of various ages, hearafter "RMIS".*

* cited by examiner

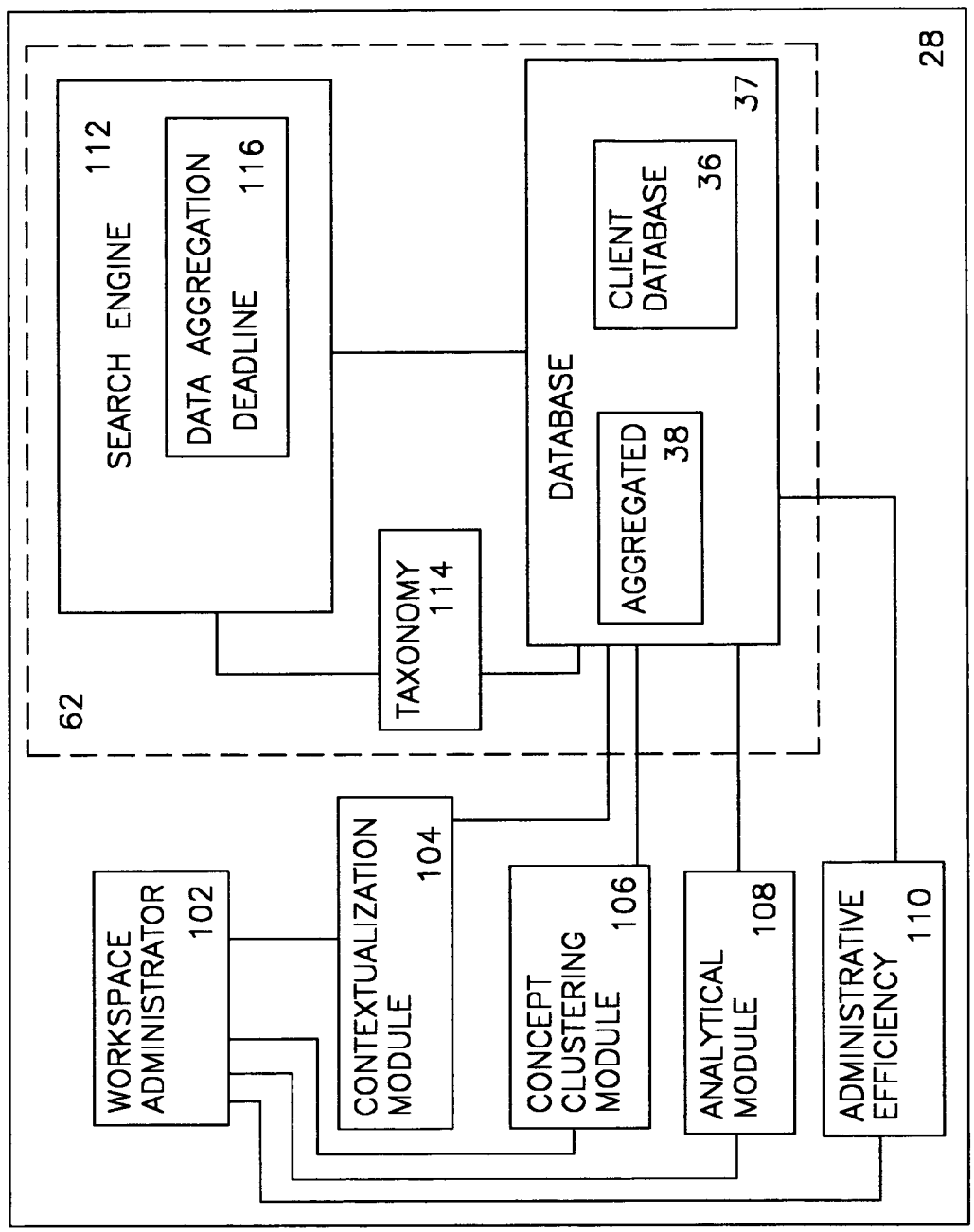
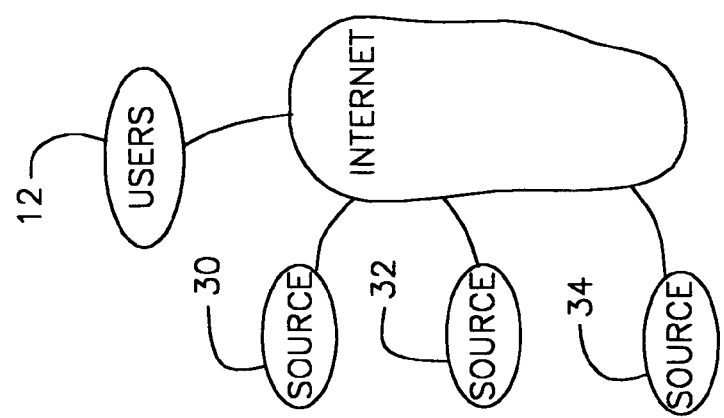
FIG. 1B

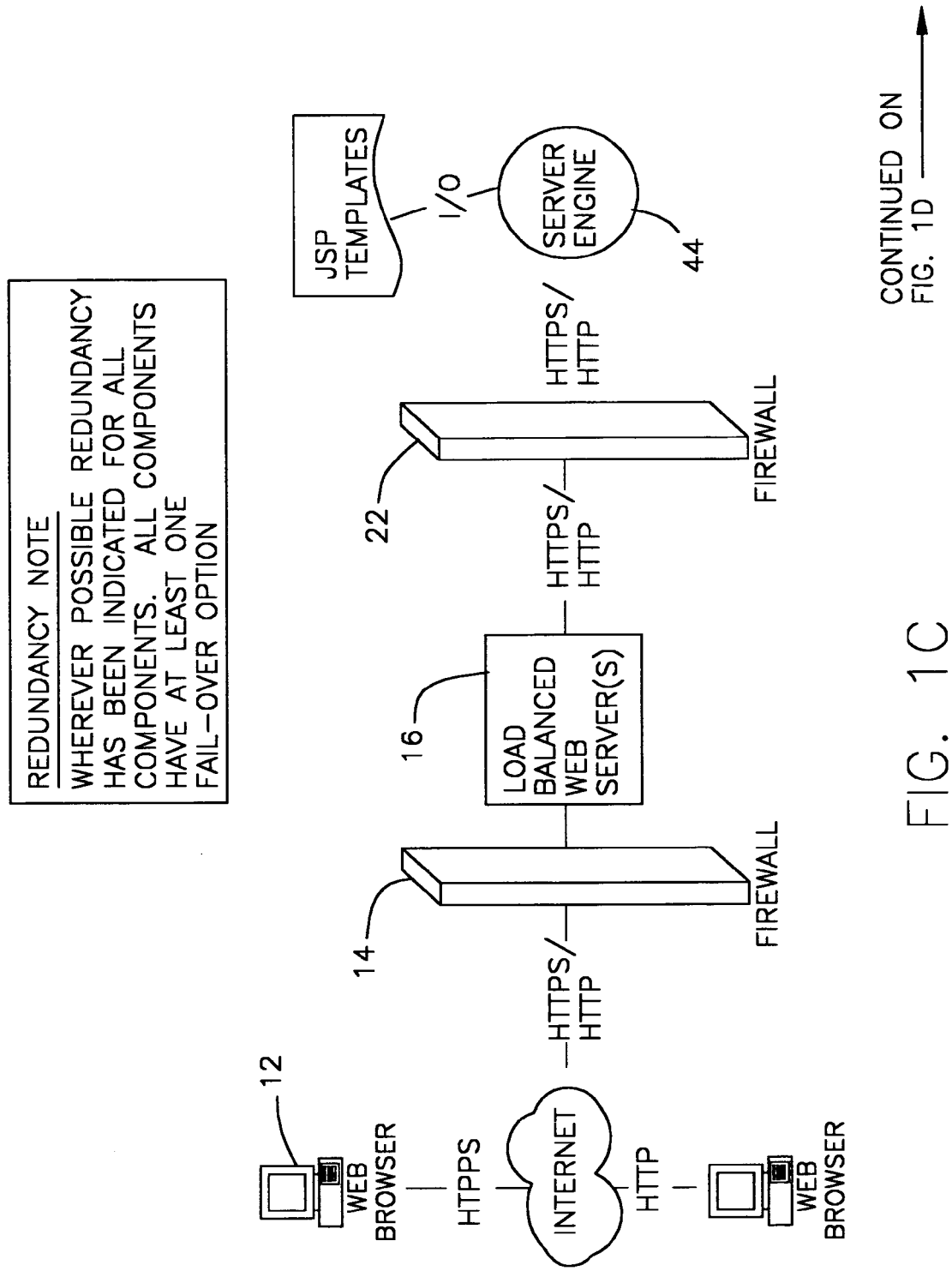

| FIELD | CATEGORY INFORMATION |
|---|---|
| CATEGORY_PREFIX | X00_RENO_NV |
| EXPERTS | JOHN SMITH AND PAUL JONES |
| ORIGINAL CATEGORY NAME | RENO GAMBLING |
| UPDATED CATEGORY NAME (IF APPROPRIATE) | |
| ORIGINAL CATEGORY DEFINITION | INFORMATION ABOUT TYPES OF GAMBLING IN RENO NEVADA |
| UPDATED CATEGORY DEFINITION (IF APPROPRIATE) | |

ITEMS

| ITEM # | EXACT? | CASE SENSITIVE? | MANY? | WEIGHT (1-10) | WORD OR PHRASE (PHRASES IN DOUBLE QUOTES) |
|---|---|---|---|---|---|
| 1 | YES | YES | | | RENO |
| 2 | YES | YES | | | NEVADA |
| 3 | YES | YES | | | NV |
| 4 | | | YES | 8 | GAMBLING |
| 5 | | | YES | 8 | CASINO |
| 6 | YES | | | | BLACKJACK |
| 7 | YES | | | | POKER |
| 8 | YES | | | | CRAPS |
| 9 | | | | | SLOT |
| 10 | | | | | "SLOT MACHINE" |
| 11 | YES | YES | | | JANET |
| 12 | YES | YES | | | "ATTORNEY GENERAL" |
| 13 | YES | YES | | | RENO |

PARTS

| PART | DESCRIPTION |
|---|---|
| A | #1 SHOULD BE IN THE SAME SENTENCE AS EITHER #2 OR #3 |
| B | THE DOCUMENT SHOULD CONTAIN ANY OF #4 THROUGH #10. THE MORE OF THESE IT CONTAINS THE BETTER. |
| C | EITHER #11 OR #12 SHOULD PRECEDE #13 IN THE SAME SENTENCE. |

STRUCTURE

THE DOCUMENT SHOULD CONTAIN PART A AND PART B, BUT NOT PART C.

FIG. 3A

| RISK TYPE | INSURANCE TYPE | GROUP | CATEGORY NAME | CATEGORY DEFINITIONS |
|---|---|---|---|---|
| HAZARD | PROPERTY | RISK/EXPOSURE | BUSINESS PROPERTY | FOR COLLECTION OF DOCUMENTS BUILDINGS |
| OPERATIONAL | PROPERTY | PERILS | VEHICLE RISK | |
| FINANCIAL | CASUAL EXPOSURES | EXPOSURES | DEFECTIVE PRODUCTS | |
| ENTERPRISE | | EXPOSURES | ENTERPRISE RISK | |
| STRATEGIC | | | STRATEGIC RISK | |

- 320
- 322 SOURCES
  - ☐ EXACT PHASE MATCHING
  - ☐ NEWS & JOURNALS
  - ☐ BUSINESS FINANCIAL REPORTS
  - ☐ WEB
  - ☐ REGULATORY
  - ☐ CASE LAW
- 324
- 316 DATE RANGE ○ THE PAST MONTH ▽
  - ○ FROM SEPTEMBER ▽ 28 ▽ 2001 ▽
  - TO SEPTEMBER ▽ 28 ▽ 2001 ▽
- 328 INDUSTRY  ALL SECTORS ▽
- 330 GEOGRAPHIC REGION  ALL REGIONS ▽
  - ○ ALL CATEGORIES
  - ○ SELECT UP TO 25 CATEGORIES
- 332 CATEGORIES
  - PRODUCT TRENDS
  - PRODUCTS/PRODUCTS RECALL EXPOSURE
  - PROFESSIONAL SERVICES
  - REINSURANCE – FACULTATIVE/AUTO – FAC
  - REINSURANCE CATASTROPHE

SEARCH

CONTINUED ON

| USER | ABOUT | HELP |

📰 BREAKING NEWS

🖥 P&C TOOLS

RISK COST BENCHMARKING
D&O BENCHMARKING
RENEWAAL PLAN ACTION
IND. FIN. ANALYSIS
CAPTIVE DOMICILE
LEAGUE TABLES
P&C BENCHMARKING
COMPANY COMPARISON
SECURITIES LITIGATION
CO-CHART
CLAIMS
POLICIES
APPLICATIONS

📊 RISK DOLLAR TOTAL

CONTINUED FROM
FIG. 7A

△ ④ ACQUISITIONS DATA SHOULD BE ADDED

☑ CLAIMS DATABASE
☑ CLAIMS WORKPAD

△ ⑤ SCREEN OUT ERRONEOUS DATA FROM OUTSIDE ENTITIES

☑ CLAIMS DATABASE
☑ CLAIMS WORKPAD

△ ⑥ COMPILE CLAIMS AND LOSS DATA FROM INTERNAL
        AND INSURANCE RECORDS

☑ RIMS

△ ⑦ INCLUSION OF LOSS DATA

☑ CLAIMS WORKPAD

△ ⑧ DATA SHOULD BE SEGMENTED BY TYPE

☑ CLAIMS WORKPAD

△ ⑨ CLAIMS AND LOSS EXPERIENCE SHOULD BE EXTENDED
        BACK TO 5 YEARS

☑ RMIS
☑ AD HOC CLAIMS DATA
☑ APPLICATION FORM

CONTINUED FROM
FIG. 7B

▷ ⑨ ESTABLISH PROJECTION MODULE

☐ NEWS/JOURNAL SEARCH
☐ ISO/NCCI SEARCH
☐ S&P SEARCH
☐ CLAIMS WORKPAD
☐ COST OF RISK
☐ LOSS TRIANGLES
☐ LOSS DEVELOPMENT ANALYSIS

▷ ⑩ SUMMARIES OF PROJECTED COSTS

☐ CLAIMS WORKPAD
☐ LEGAL TREND SEARCH

▷ ⑫ LOSS DEVELOPMENT FACTORS PERMIT
    LOSS PROJECTION OF CLAIMS

☐ CLAIMS WORKPAD
☐ LOSS TRIANGLES
☐ LOSS DEVELOPMENT ANALYSIS
☐ NEWS/JOURNAL SEARCH
☐ NEWS/JOUNAL SEARCH

[ BACK TO TOP ]

COPYRIGHT ADVISEN LTD. 2001 ALL RIGHTS RESERVED

USER | ABOUT | HELP

▷ TEMPLATES

▷ KEY PRACTICE COMP

1. PROCESS AND ANALYZE
2. CLAIMS & LOSS
3. DIVESTITURES DATA
4. ACQUISITION DATA
5. SCREEN OUT
6. COMPILE CLAIMS
7. INCLUSION OF LOSS
8. DATA SHOULD BE...
9. CLAIMS AND LOSS...
10. ESTABLISH PROJECT
11. SUMMARIES OF PROJECT
12. LOSS DEVELOPMENT

◻ COMPANY SEARCH

STOCK DETAILS
PROFILE
LEGAL
MD&A
NEWS
SEC
FINANCIALS

COMPETITORS
CHART
SEARCH FOR DOCUMENT
ABOUT THE COMPANY

☐ PROJ. BOOKMARKS

☐ PROJ. SEARCHES

☐ PROJ. FILES

CONTINUED FROM
FIG. 7D

FIG. 7E

CONTINUED FROM
FIG. 8C

△ ⑰ SPECIAL EXPOSURE COVERAGES
  ▭ SEARCH
  ▭ LEGAL SEARCH
  ▭ COVERAGE SPECIFICATIONS

△ ⑱ CLAIMS MADE POLICIES
  ▭ LEGAL SEARCH
  ▭ COVERAGE COMPARISONS
  ▭ COVERAGE SPECIFICATIONS

△ ⑲ NEED FOR TRANSITIONAL COVERAGES
  ▭ SEARCH FOR THESE
  ▭ COVERAQGE COMPARISONS
  ▭ COVERAGE SPECIFICATIONS

△ ⑳ AND COVERAGE FOR CANDIDATE COMPANY AFTER ACQUISITION
  ▭ BINDER FORM

USER | ABOUT | HELP

☐ TEMPLATES

▷ KEY PRACTICE CONT

1. OBTAIN & REVIEW
2. ANNUAL REPORTS
3. MEDIA ARTICLES
4. SALES & MARKETING
5. CORPORATE HISTORY
6. PROVIDE RISK MGMT.
7. RECOMMEND RISK MGMT.
8. PART. IN DATA ROOM
9. OBTAIN & REVIEW
10. EVALUATE CANDIDATE'S....
11. ANALYZE CANDIDATE'S....
12. QUALITY OF RISK
13. SAFETY STATS.
14. REVIEW INSURANCE
15. DETERMINE IF CANDIDATE....
16. RUN-OFF COVERAGES
17. SPECIAL EXPOSURES
18. CLAIMS MADE...
19. NEED FOR TRANSITION
20. BIND COVERAGE...
1. OBTAIN & REVIES...

CONTINUED FROM FIG. 9A

▷ ④ COMPILE, UPDATE AND SCREEN UNDERWRITING DATA
- APPLICATION PROCESS
- RISK MAPPING
- RISK ACCOUNTING

▷ ⑤ PROJECT FUTURE LOSSES
- LOSS TRIANGLES
- LOSS DEVELOPMENT

▷ ⑥ CATASTROPHE LOSS ANALYSIS
- SEVERITY MONTE CARLO SIMULATION

▷ ⑦ LOSS CONTROL/SAFETY PROGRAMS
- SAFETY ADMINISTRATION REPORT
- ENGINEERING REPORT
- NEWS/JOURNAL SEARCH

▷ ⑧ REVISION COVERAGE SPECS. ISSUE REQUEST FOR PROPOSAL
- COVERAGE SPECIFICATION FORM
- CO-CHART
- SEARCH FOR LATEST COVERAGE TRENDS
- POLICY COMPARISON TOOL

▷ ⑨ KEEP UNDERWRITERS NEEDS IN MIND
- LEAGUE TABLES
- S&P INSURANCE RATING
- COMPANY/PRODUCT SEARCH
- NEWS/JOURNAL SEARCH

CONTINUED FROM FIG. 9B

△ ① PUT TOGETHER TPA SPECS
- SERVICE SPECIFICATION FROM
- NEWS/JOUNAL SEARCH
- LEAGUE TABLES
- COMPANY/SERVICES SEARCH

△ ② SCREEN INSURERS/REINSURERS/TPA'S, OBTAIN PRICING TERMS
- COMPANY AND PRODUCT SEARCH – WHAT'S HAPPENING WITH RENEWALS
- LEAGUE TABLES
- SEARCH CLAIMS REGULATIONS

△ ③ RISK PHILOSOPHY
- LEAGUE TABLES
- NEWS/JOURNAL SEARCH
- EDGAR SEARCH
- SEARCH THE COMAPNY'S WEBSITE

△ ④ FINANCIAL RATINGS
- INS. FIN. ANALYSIS
- S&P INSURANCE RATINGS
- ATHER RATING LINKS

△ ⑤ REPUTATION/RELATIONSHIP/CULTURE
- NEWS/JOURNAL SEARCH
- LEGAL SEARCH ON CLAIMS

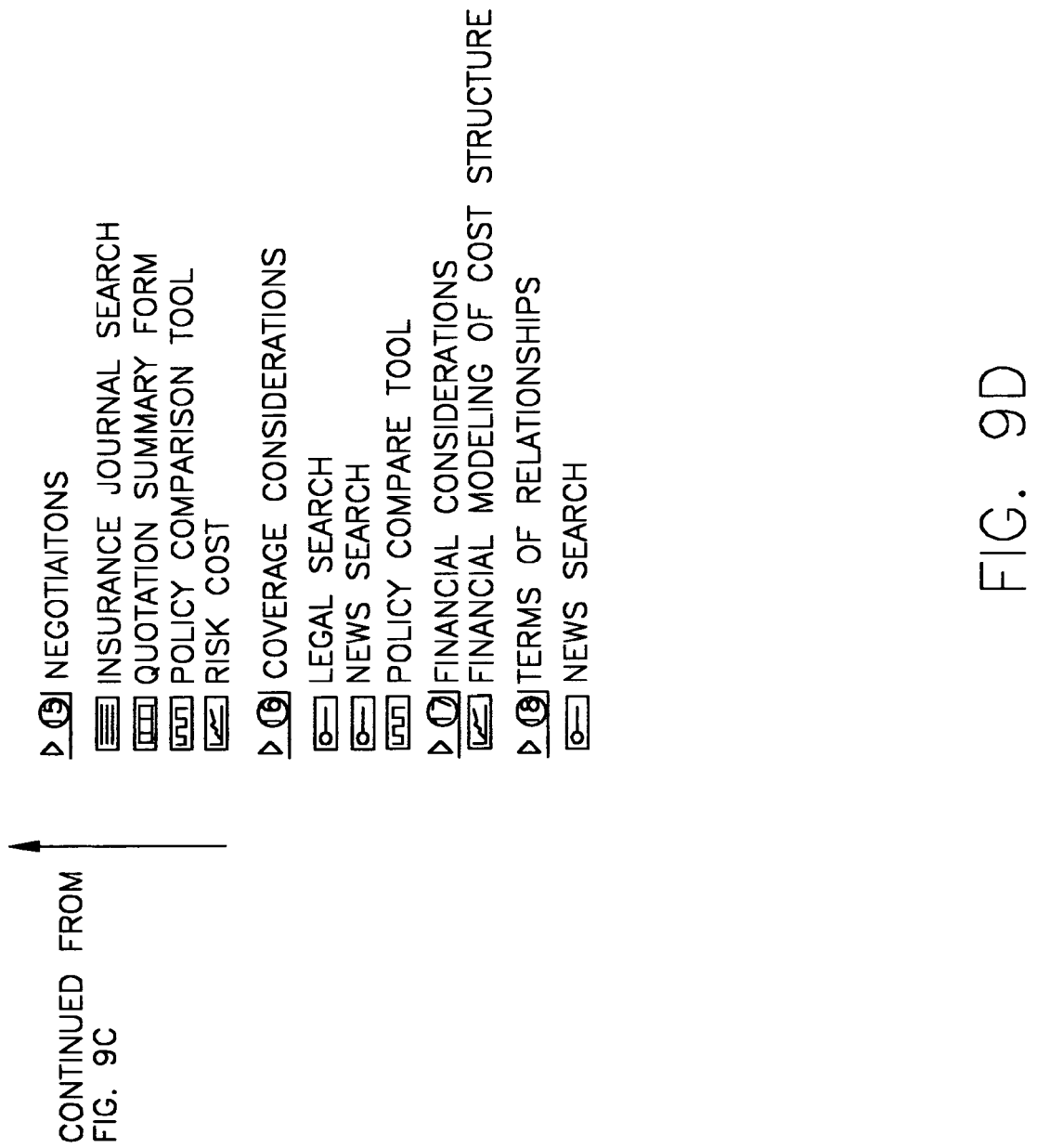

| USER | ABOUT | HELP |

▷ TEMPLATES

▷ KEY PRACTICE CONT

1. REVIEW RISK PROFILE..
2. PRELIM. MEETING..
3. MARKETPLACE TRENDS..
4. COMPILE UPDATE..
5. PROJECT FUTURE LOSSES
6. CAL. LOSS ANALYSIS
7. LOSS CONTROL..
8. DEVELOP CO. SPECS..
9. KEEP UWS NEEDS
10. TPA SPECS..
11. SCREEN INSURERS..
12. RISK PHILOSOPHY
13. FINANCIAL RATINGS..
14. REPUTATION/CULTURE..
15. NEGOTIATIONS
16. COV. CONSIDERATIONS
17. FIN. CONSIDERATIONS
18. TERMS..
19. BIND. PAY REVIEW

CONTINUED FROM
FIG. 9E

◻ COMPANY SEARCH

STOCK DETAILS
PROFILE
LEGAL
MD&A
NEWS
SEC
FINANCIALS

COMPETITORS
CHART
SEARCH FOR DOCUMENT
ABOUT THE COMPANY

◻ PROJ. BOOKMARKS

◻ PROJ. SEARCHES

◻ PROJ. FILES

FIG. 9F

▷ ⓘ IDENTIFY LIKELY SUPPLIERS OF INSURANCE FOR ALTERNATIVE SOLUTIONS
☑ INS. FIN. ANALYSIS
☉ NEWS/JOURNAL SEARCH
▦ LEAGUE TABLES

BACK TO TOP

COPYRIGHT ADVISEN LTD. 2001 ALL RIGHTS RESERVES

CONTINUED FROM
FIG. 10C

| USER | ABOUT | HELP |

▷ TEMPLATES

▷ KEY PRACTICE CONT

1. USE RISK ANALYSIS
2. INTERNAL BENCHMARK
3. IDENTIFY & SEPARATE
4. AVOID COMPARISONS...
5. DISPLAY DATA
6. COMPILE ALL COSTS OF..
7. EXTERNAL BENCHMARKS..
8. DETERMINE SIC...
9. OBTAIN TRADE ASSOC...
10. COMPARE TO INTERNAL...
11. RIMS BENCHMARKING
12. ISO BENCHMARKING
13. D&O BENCHMARKING
14. FINANCING SOLUTIONS
15. CHART ALTERNATIVES
16. ISSUES RELATED..
17. IDENTIFY KEY SUPPLIERS..

CONTINUED FROM
FIG. 10E

COMPANY SEARCH

STOCK DETAILS
PROFILE
LEGAL
MD&A
NEWS
SEC
FINANCIALS

COMPETITORS
CHART
SEARCH FOR DOCUMENT
ABOUT THE COMPANY

PROJ. BOOKMARKS

PROJ. SEARCHES

PROJ. FILES

FIG. 10F

△④ IDENTIFYING SIGNIFICANT TRENDS & DEVELOPMENTS
☐ NEWS ARCHIVES SEARCH
☐ COMPANY SEARCH
☐ INDUSTRY SEARCH
☐ INDUSTRY LINKS

BACK TO TOP

CONTINUED FROM
FIG. 11A

FIG. 11B

USER | ABOUT | HELP

▷ TEMPLATES

▷ KEY PRACTICE COMP

1. CONSTRUCT A BUSINESS PROFILE
2. CONSTRUCT A FINANCIAL PROFILE
3. IDENTIFY CURRENT AND PENDING...
4. IDENTIFY SIGNIFICANT TRENDS

▱ COMPANY SEARCH

STOCK DETAILS
PROFILE
LEGAL
MD&A
NEWS
SEC
FINANCIALS
COMPETITORS
CHART
SEARCH FOR DOCUMENT
ABOUT THE COMPANY

▱ PROJ. BOOKMARKS

▱ PROJ. SEARCHES

▱ PROJ. FILES

FIG. 11C

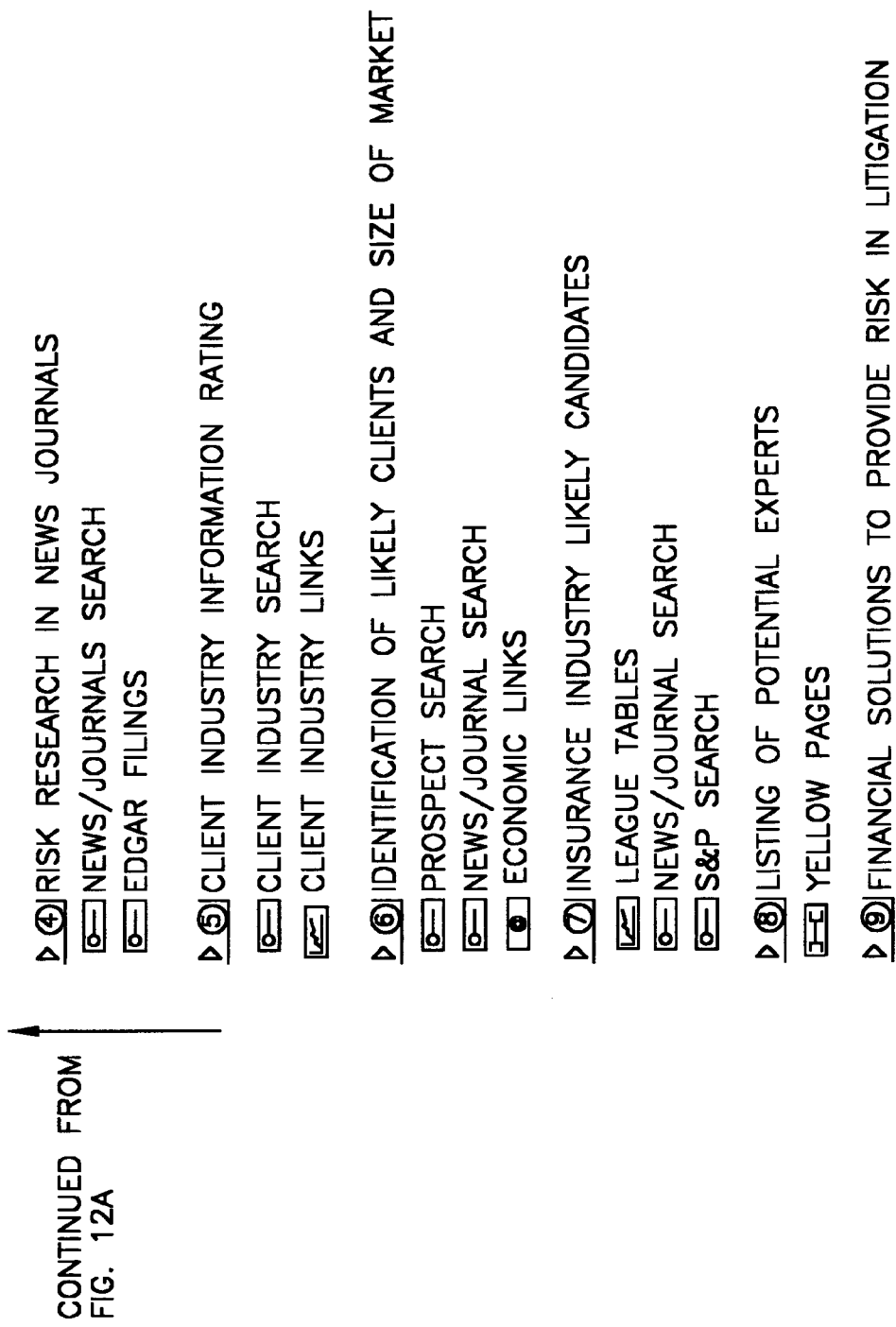

| USER | ABOUT | HELP |

▶ TEMPLATES

▶ KEY PRACTICE COMP

1. NEW EXPOSURE/LOSS
2. NEW CLAIM TRENDS
3. D&O CLAIMS ANALYSIS
4. RISK RESEARCH IN NEW..
5. CLIENT INDUSTRY INFO....
6. IDENT. OF LIKELY CLIENT
7. INS. INDUSTRY LIKELY CLIENT
8. LISTENING OF POTENTIAL CLIENT
9. FINANCIAL SOLUTIONS

☐ COMPANY SEARCH

STOCK DETAILS
PROFILE
LEGAL
MD&A
NEWS
SEC
FINANCIALS

CONTINUED FROM
FIG. 12D

COMPETITORS
CHART
SEARCH FOR DOCUMENT
ABOUT THE COMPANY

☐ PROJ. BOOKMARKS

☐ PROJ. SEARCHES

☐ PROJ. FILES

FIG. 12D

CONTINUED FROM FIG. 13A

FINANCING MECHANISMS

SITES DEALING WITH ALTERNATIVE RISK TRANSFER, SELFINSURANCE, CAPTIVE INSURERS, AND REINSURANCE.

LOSSES, LEGAL AND REGULATION

CASE LAW, STATUTES, AND REGULATIONS, INCLUDING GOVERNMENT REGULATORY AGENCIES.

ACTUARIAL AND ACCOUNTING

GATEWAY TO SITES CONNECTED TO THE FINANCIAL, STATISTICAL, AND TAX ASPECTS OF PROPERTY/CASUALTY INSURANCE.

EDUCATION, ASSOCIATIONS, AND PUBLICATIONS

DEGREE PROGRAMS, PROFESSIONAL DESIGNATIONS, TRADE ASSOCIATIONS, PERIODICALS AND OTHER PUBLICATIONS OF THE PROPERTY/CASUALTY INDUSTRY.

GENERAL REFERENCE

SOURCES FOR RESEARCHING GENERAL INFORMATION, ECONOMIC CONDITIONS AFFECTING ALL INDUSTRIES, AND GOVERNMENT STATISTICS AND DATA.

GENERAL BENEFITS

INCLUDES A WIDE VARIETY OF EMPLOYEE BENEFITS INFORMATION, LINKS TO INSURERS, BROKERS, CONSULTANTS, AND OTHER INDUSTRY PARTICIPANTS, AND A GLOSSARY.

CONTINUED FROM
FIG. 13B

BENEFIT PARTICIPANT TOPICS

ACCESS SITES RELATED TO CURRENT ISSUES AFFECTING THE EMPLOYEE BENEFITS COMMUNITY.

POLICIES AND CONTRACTS

INFORMATION ON EMPLOYEE BENEFITS COVERAGES, POLICIES, AND PRODUCTS.

FINANCIAL MECHANISMS

SITES DEALING WITH ALTERNATIVE RISK TRANSFER, SELFINSURANCE, CAPTIVE INSURERS, AND REINSURANCE.

HEALTH COSTS, LEGAL AND LEGISLATION

CASE LAW, STATUTES, AND REGULATIONS, INCLUDING GOVERNMENT REGULATORY AGENCIES.

ACTUARIAL AND ACCOUNTING

GATEWAY TO SITES CONNECTED TO THE FINANCIAL, STATISTICAL, AND TAX ASPECTS OF EMPLOYEE BENEFITS.

EDUCATION, ASSOCIATIONS, AND PUBLICATIONS

DEGREE PROGRAMS, PROFESSIONAL DESIGNATIONS, TRADE ASSOCIATIONS, PERIODICALS AND OTHER PUBLICATIONS DEALING WITH EMPLOYEE BENEFITS.

FIG. 13C

| USER | ABOUT | HELP |

☑ RATINGS UPDATES

S&P'S RATINGS/RANKING
AND PROFILES FOR WEEKS OF
JULY 30 AND AUGUST 06

⊞ RATINGS/RANKINGS

S&P INSURER SUMMARY

ALTERNATIVE INSURER
RATING SOURCES

INSURER RANKINGS

BROKER RANKINGS

CONSULTANT RANKING

⊞ LOOK-UP TABLES

WORKERS' COMP LAW

FEDERAL LAWS
STATE INS. LAWS
INTERNATIONAL INS. LAWS
CAPTIVE DOMICILE LAWS

FIG. 13D

CONTINUED FROM FIG. 15A

| COMPANY TYPE | | |
|---|---|---|
| ● ALL | | |
| ○ PUBLIC ONLY | <COUNT> | <COUNT> |
| ○ PRIVATE ONLY | <COUNT> | <COUNT> |
| | <COUNT> | <COUNT> |

FINANCIALS

SEARCH BASED ON: [ REVENUE ▽ ]

MATCHING THESE VALUE RANGES:

○ SELECT UP TO 3:

| ALL | | |
|---|---|---|
| <METRIC RANGE 1> | <METRIC 1> | <COUNT> <COUNT> |
| <METRIC RANGE 2> | <METRIC 2> | <COUNT> <COUNT> |
| ... | <METRIC 3> | <COUNT> <COUNT> |

○ [ ] — [ ]   <COUNT> <COUNT>

FINANCIALS (<METRIC>)
  <RANGE 1>
  <RANGE 2>
  <RANGE 3>

LOCATION
  <STATE 1>
  <STATE 2>
  <STATE 3>
  <CANADA>
  <OTHER>

COVERAGE:
  <COVERAGE>
LOBs
  <PERIOD 1>
  <PERIOD 2>
  <PERIOD 3>

CONTINUED FROM FIG. 16A

TIME PERIOD

● TRAILING, UP TO 12 MONTHS    <PERIOD 1> <COUNT>
     TRAILING 12 MONTHS ▽    <PERIOD 2> <COUNT>
                                 <PERIOD 3> <COUNT>

○ TRAILING, 12-24 MONTHS
    (SELECT UP TO 3):

◁ ☐ ▷
    <PERIOD 1>
    <PERIOD 2>

○ YEARS (SELECT UP TO 3):

◁ ☐ ▷
    ALL
    <YEAR 1>
    <YEAR 2>
    ...

LOCATION
   <STATE 1>
   <STATE 2>
   <STATE 3>
   <CANADA>
   <OTHER>

COVERAGE:
   <COVERAGE>

LOBs
   <PERIOD 1>
   <PERIOD 2>
   <PERIOD 3>

CONTINUED FROM FIG. 16B

PROGRAM CHARACTERISTICS

TO RESTRICT THE PEER GROUP TO PROGRAMS WITH SPECIFIC CHARACTERISTICS MAKE THE DESIRED SELECTIONS BELOW. THE RESTRICTION WILL BE BASED ON VALUES +/- 25% OF THE VALUE YOU SELECT. FOR EXAMPLE, IF YOU SELECT "LIMIT=60M", THE PEER GROUP WILL INCLUDE ONLY PROGRAMS WITH LIMITS BETWEEN 45M AND 75 M.

CHARACTERISTIC: [NONE ▽]

AMOUNT: [NONE ▽]

[          ]

TIME PERIODS
<PERIOD 1>
<PERIOD 2>
<PERIOD 3>

CHARACTERISTIC
<CHAR.>=<AMT>
+/- 25%

PEER GROUP SIZE
<COUNT>

\# MATCHING ALL COMPANY CRITERIA:   <COUNT>  <COUNT>  <COUNT>  <COUNT>

(UPDATE COUNTS)    (GO)

FIG. 16C

FIG. 17A — CONTINUED ON FIG. 17B

FIG. 17B

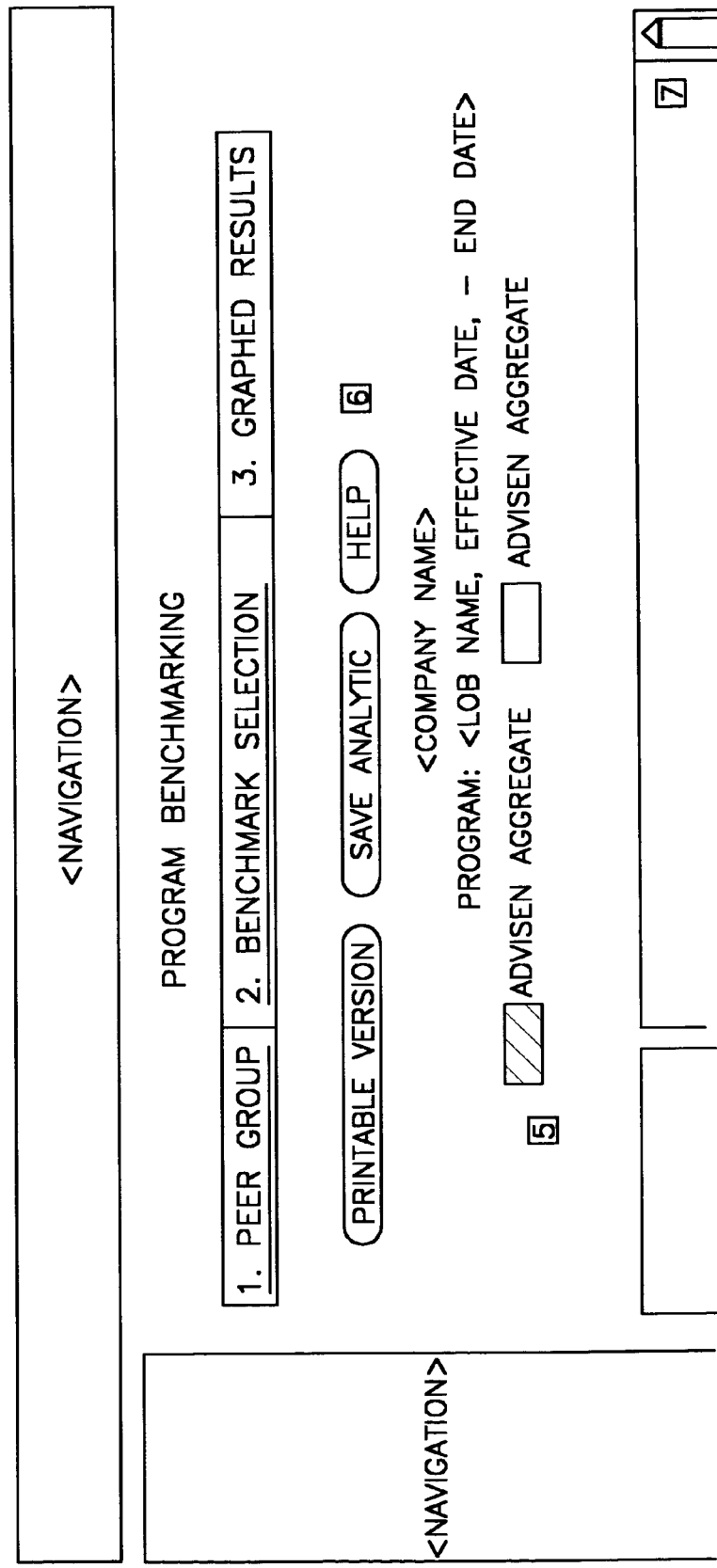
FIG. 19A   CONTINUED ON FIG. 19B

| USER POLICY DATA INPUT: | | GRAPHIC DISPLAY: | | | |
|---|---|---|---|---|---|
| # INPUT FIELDS | DENOMINATION | OPTIONAL INPUT | X-AXIS | Y-AXIS | LABEL |
| 1 BUSINESS ENTITY | INSURED NAME | | | | |
| 2 PROJECT NAME | USER DESIGNATED PROJECT NAME | | | | |
| 3 LINE OF BUSINESS (LOB) | DROP-DOWN BOX–SEE LOB SHEET | | | | x x |
| 4 SUB-LINE OF BUSINESS (SLOB) | DROP-DOWN BOX–SEE LOB SHEET | x | | | |
| 5 PREMIUMS | $000'S | x | x | x x x | |
| 6 RETENTIONS | $000'S | | x | x x | |
| 7 LIMIT OR VALUES | $000'S | x | | | |
| 8 SUB-LIMITS | $000'S | | x | x x | |
| 9 ATTACHMENT POINT | $000'S | x | | | |
| 10 PART OF (PO) | | | | | |
| 11 EFFECTIVE DATE | MM/DD/YYYY | | | | |
| 12 EXPIRATION DATE | MM/DD/YYYY | | x | x | |
| 13 RETROACTIVE DATE | MM/DD/YYYY | | | x | x |
| 14 POLICY FORM | USER INTERNAL ID | | | | |
| 15 POLICY NUMBER | USER INTERNAL ID | | | | |
| 16 INSURANCE COMPANY | INSURER NAME | | | | |
| 17 NOTICE OF CANCELLATION | DROP-DOWN BOX–# OF DAYS | | x | | |
| 18 EXTENDED REPORTING | DROP-DOWN BOX–# OF MONTHS | x | x | | |

FIG. 24

| USER | ABOUT | HELP |

⊕ RATINGS/RANKINGS

S&P INSURER SUMMARY
ALTERNATIVE INSURER
RATING SOURCES
INSURER RANKINGS
BROKER RANKINGS
CONSULTANT RANKING

⊙ LOOK-UP TABLES

WTC FLOOR PLAN
WORKERS' COMP LAW
STATE INS. LAWS
INTERNATIONAL INS. LAWS
CAPTIVE DOMICILE LAWS
FED BENEFIT LAWS
FED EMPLOY LAWS
FED ENVIRON LAWS
FED INSURANCE LAWS
FED INTELL PROP LAWS
FED SAFETY LAWS
FED SECURITIES LAWS

FIG. 25B

SEARCH WITHIN

- ⦿ ADVISEN
- ○ MY PROFILE
- ○ COMPANY LOOK-UP
- ○ CONTEXT OF A TEMPLATE

[     ] [GO]

ADVANCED SEARCH
ADVANCED COMPANY SEARCH
PROSPECTING COMPANIES

⊙ SEARCH HELP

▽ EXPERT SEARCHES
TROPIC STORM CHANTEL
INS MARKET TREND
INSURANCE e-BUSINESS
>>LIST

▽ TOP CONCEPTS

▽ RELATED LINKS

▷ SAVED SEARCHES

▷ BOOKMARKS

▷ RESOURCES

| NEWS | PROJECTS | REFERENCE |

TOPIC  [ NAME OF STATUTE(S) ▽ ]

[SUBMIT]

| LOCATION | RESULTS |
|---|---|
| BAHAMAS | INSURANCE ACT OF 1969 AND EXTERNAL INSURANCE ACT OF 1963 |
| BARBADOS | BARBADOS EXEMPT INSURANCE ACT OF 1983 |
| BERMUDA | INSURANCE ACT OF 1978, RELATED REGULATIONS COMPANIES ACT OF 1981 |
| BRITISH COLUMBIA | THE INSURANCE (CAPTIVE COMPANY) ACT OF 1986; THE FINANCIAL INSTITUTIONS ACT. |
| BVI-BRITISH VIRGIN ISLANDS | INTERNATIONAL BUSINESS COMPANIES ACT OF 1984; INSURANCE ACT OF 1994; INSURANCE REGUALATIONS OF 1995. |
| CAYMAN ISLANDS | CAYMAN ISLANDS INSURANCE LAW (#24) OF 1979;COMPANIES LAW OF 1969 |

| | |
|---|---|
| COLORADO | COLORADO REVISED STATUTES, SECTION 10-6-101 ET SEQ., COLORADO INSURANCE REGULATIONS 2-3-1. |
| CURACAO | SPECIAL INSURANCE LICENSE DECREE. |
| DELAWARE | TITLE 18, CHAPTER 69 (1984) AND ITS 1990 AMENDMENTS. |
| DUBLIN | |
| GEORGIA | GEORGIA CAPTIVE INSURANCE COMPANY ACT, TITLE 33, CHAPTER 41; GEORGIA INSURANCE CODE SB 635/UCSFA. |
| GIBRALTAR | THE INSURANCE COMPANIES ORDINANCE 1987 AND SUPPORTING REGULATIONS. |
| GUAM | 22 GUAM CODE ANNOTATED, CHAPTER 23. |
| GUERNSEY | THE INSURANCE LAW OF 1986. |
| HAWAII | HAWAII REVISED STATUTES, CAPTIVE INSURANCE LAW 431, ARTICLE 19, AND AMENDMENTS OF 1999 |
| ILLINOIS | INSURANCE CODE, ARTICLES VIIB, VIIC, XII; STATUTES CHAPTER 7311, BILL H.B. 2437. |
| ISLE OF MAN | INSURANCE ACT OF 1986; INSURANCE ACT OF 1995. |
| JERSEY | |
| LONDON (LLOYD'S) | NONE. |

| | |
|---|---|
| LUXEMBOURG | |
| MAINE | MAINE INSURANCE CODE, CHAPTER 83; PUBLIC LAW 1997, CHAPTER 435. |
| MALTA | INSURANCE BUSINESS ACT OF 1998. |
| NEVADA | NEVADA REVISED STATUTES, CHAPTER 694C. |
| NEW YORK | ARTICLE 70 OF THE NEW YORK INSURANCE LAW. |
| PANAMA | CAPTIVE INSURANCE COMPANY ACT OF 1996; LAW 60. |
| RHODE ISLAND | TITLE 27, CHAPTER 43; TITLE 7, CHAPTER 1.1. |
| SINGAPORE | INSURANCE ACT, CHAPTER 142, 1994 EDITION. |
| SOUTH CAROLINA | CODE OF LAWS OF SOUTH CAROLINA, CHAPTER 90. |
| ST. LUCIA | |
| SWITZERLAND | SUPERVISION OF PRIVATE INSTITUTIONS ACT OF 1978. |
| TENNESSEE | TENNESSEE CAPTIVE INSURANCE COMPANY ACT OF 1978; TENNESSEE DEPT. OF INS. RULES, CHAPTER 0780-1-41. |
| TURKS AND CAICOS | INSURANCE ORDINANCE OF 1989; INSURANCE REGULATIONS OF 1989. |

FIG. 26C

SYSTEM AND METHOD FOR PROVIDING GLOBAL INFORMATION ON RISKS AND RELATED HEDGING STRATEGIES

RELATED APPLICATIONS

This application is a continuation-in-part application of U.S. patent application Ser. No. 10/949,112, filed on Sep. 24, 2004 now abandoned, which is a continuation of U.S. patent application Ser. No. 09/969,493, filed on Oct. 1, 2001 now abandoned, which in turn claims the benefit of priority from U.S. Provisional Patent Application No. 60/242,483, filed on Sep. 30, 2000, and which present application also claims the benefit of priority from U.S. Provision Patent Application No. 60/532,780, filed on Dec. 24, 2003, the entirety of which are incorporated herein by reference.

FIELD OF THE INVENTION

This invention relates to a system for retrieving and processing information related to a specified industry so as to provide subject specific information and analytical tools, for example to the insurance industry.

BACKGROUND OF THE INVENTION

Although, the technology underlying information gathering has drastically advanced within the past decade, there are many industries that have not benefited from such advances. In the fields of insurance and risk management, and in the related fields of information gathering for insurance and risk management, there are currently no systems in place today that provide all of the necessary information, services and tools necessary for the insurance industry. There are many sources of information available to members of the insurance industry, however, these sources are not well integrated, nor are they organized so as to provide a comprehensive tool risk management officers. Furthermore, there are also many sources of invaluable information that up to now have not been available to the members of the insurance industry.

Survey data confirms that clients are dissatisfied with the current level of service and information that they receive from agents, brokers, and underwriters. Various publications have also documented client's desire for new services.

The current products available to the industry suffer from low service quality, low client workspace enhancements, no standardization and no automation. Furthermore, these systems also suffer from lack of standardization, and high costs. Recently, some on-line products have become available. However, they also suffer for failure to support complex insurance products, and lack of capability to intelligently gather relevant information and process it in accordance with clients' needs.

Various members of the industry including but not limited to risk managers, benefits managers, brokers, insurers and other insurance professionals require information resources, knowledge management tools, and analytical models to increase their value and productivity. Advisory services via the world-wide-web are needed to inform customers of current industry trends, events and financial alternatives. Additionally, up-to-date portfolio evaluations, greater exposures details and wider access to the risk environment permits more exactly priced and newer products for insurance companies to provide to their clients. Thus, there is a need for an improved system that provides comprehensive information and analytical and administrative tools to professionals, specifically those involved in the insurance industry.

SUMMARY OF THE INVENTION

The present invention looks to provide advantages over the currently available services by integrating into a single system, the ability to access all of the available information on risk management in any given field by providing a data-base which stores and analyzes risk management data from a large quantity of sources.

The present invention provides a system and method for information and data aggregation and analysis which provides risk managers, benefits managers, brokers, insurers and other insurance professional to have access to information resources, knowledge management tools, and powerful analytical models needed to increase their value and productivity. The system provides a means for insurance industry professionals, to access current industry trends, financial alternatives and advisory services. The system also provides a means for accessing up-to-date portfolio valuations, exposure details and access to the risk environments. This system and method provides users with a novel full spectrum of administrative, information, and knowledge tools.

In accordance with one embodiment of the invention, the system and method provided is designed for information and data aggregation that allows for the compilation of data for mining and categorization by a knowledge management system, which stores all retrieved information in accordance with categories provided by a categorization engine referred to as a Taxonomy module.

In accordance with another embodiment of the invention, the process of gathering information extends beyond, traditional on-line sources. Thus, the system is configured to access private and semi-private databases to gather relevant information from various organizational resources.

The stored information can be retrieved in accordance with various embodiments of the invention. Therefore, in accordance with one embodiment of the invention, a contextualization module is configured to retrieve relevant information, based on various factors, among other things, including the user's profile, and the user's particular task at any time the system is employed. As such, the system dynamically provides relevant information as the user interacts and conducts various tasks.

The stored information is also analyzed by a concept clustering module, so that various concepts relating to a particular topic can be uncovered and stored. The concept clustering module is configured to analyze specific word patterns to uncover concepts that originally were not known to have a relationship with the underlying user's search. These uncovered concepts can be employed to enhance the taxonomy module as the system continues to adapt by increased usage.

In accordance with another embodiment of the invention, the system provides for various analytical tools that allow users to carry on with highly complex analysis of insurance related topics. The range of available analytical tool dynamically varies based on the user's needs and research topics.

In accordance with yet another embodiment of the invention, the system provides for a unique interactive workspace that combines the features explained above in a logical manner. To this end, the system interface provides for various job templates, so as to enable the user's to carry various projects by a template driven task assignments. As the user navigates through the workspace, the range of available information to the user changes, based on the user's profile and navigation pattern.

BRIEF DESCRIPTION OF THE DRAWINGS

FIG. 3a illustrates a query definition table used by the taxonomy module that defines a query related to a category in accordance with one embodiment of the invention.

FIGS. 7a and 7b illustrate the steps in the workflow provided in response to a user selecting a claims and loss analysis template in accordance with one embodiment of the invention.

FIGS. 9a and 9b illustrate the steps in the workflow provided in response to a user selecting a renewal of insurance template, in accordance with one embodiment of the invention.

FIG. 17 is a wireframe for a benchmarking session benchmarking entry as managed by a property and casualty benchmarking module, in accordance with one embodiment of the present invention;

FIG. 24 illustrates the format that user policy data input module collects insurance information from the user, and the format that illustrates the graphic displays in accordance with one embodiment of the invention.

DETAILED DESCRIPTION OF THE DRAWINGS

Figure 1A:
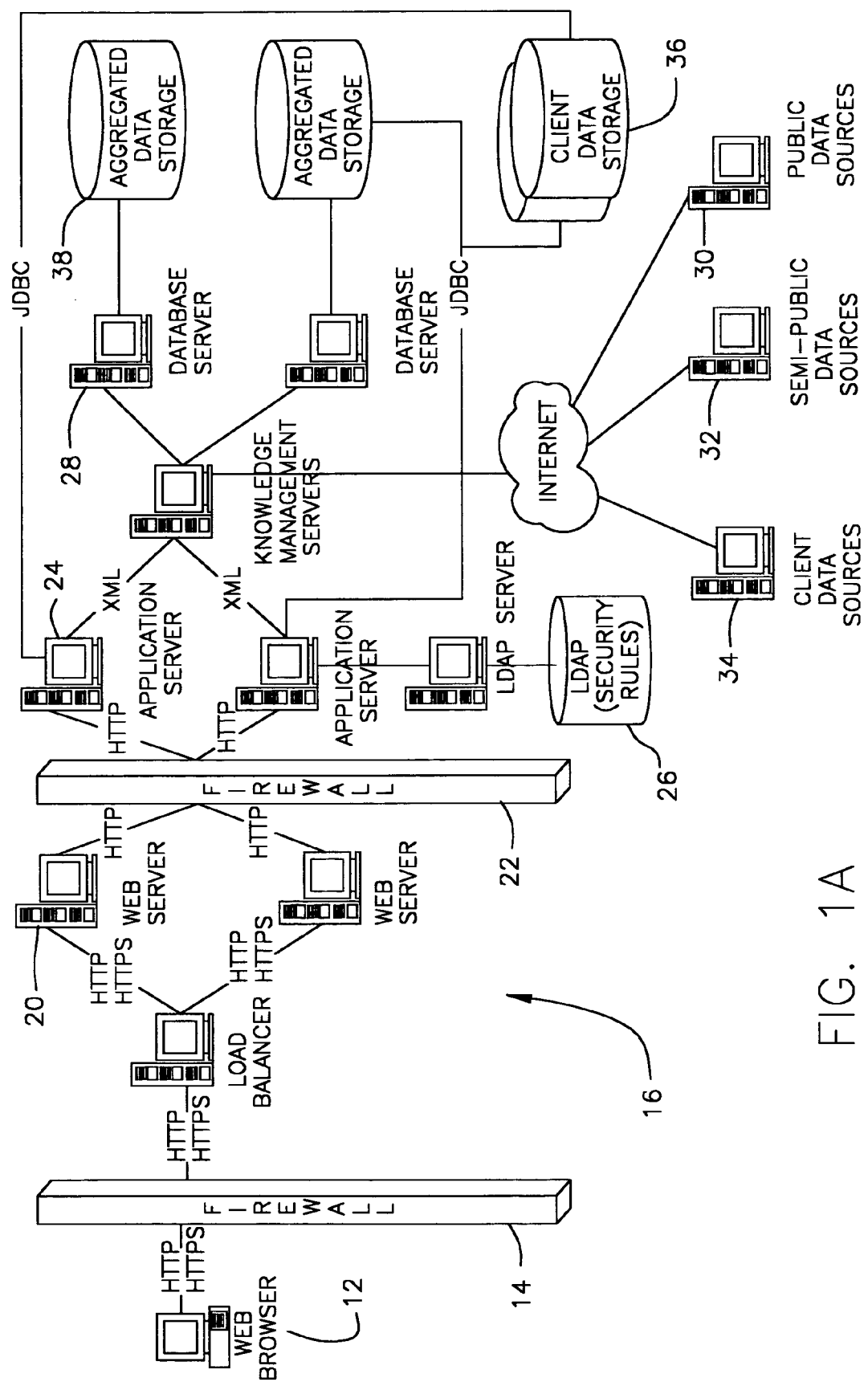
FIG. 1a illustrates a block diagram of an information management system in accordance with one embodiment of the invention.

In accordance with one embodiment of the invention, as illustrated in FIG. 1a, an information management system 10 enables users to collect and access all data necessary for their business from a centralized location. As such users can perform searches and conduct research. System 10 also enables users to employ additional analytical tools, based on the research they are conducting. System 10 also enables users to employ administrative tools to automate their entire insurance processes.

Also, system 10 provides an information and data aggregation capability that allows for the compilation of the data for mining and categorization by a knowledge management module. The combination of these services in conjunction with the formed partnerships with current on-line service offerings make the present invention a unique and novel approach to the providing of full spectrum administrative, information and knowledge tools.

In one embodiment of the present invention, as illustrated in FIG. 1a, an overview of the structure of the system includes a user web browser 12 connected to a web server via HTTP or HTTPS connection, through a first fire wall 14. Within the web server area 16 the initial communication is received at a load balancing module 18, which directs web traffic to one of a plurality of web servers 20.

Next, web server 20 directs communications through a second firewall 22 and into the main processing and data storage area of the system. Communications are first received at an application server module 24. An LDAP (Lightweight-Directory-Access-Protocol) server 26 is attached to application server modules 24 to control login applications of the clients. After the communications are processed by application server module 24, the communications are directed to a knowledge management server module 28. Knowledge management server module 28 maintains control over the flow of information into and out of system 10.

In the case of entering new data, knowledge management server module 28 is connected to the Internet and thus to public data sources 30, semi-public data sources 32 and client data sources 34. These data sources provide information via Internet to knowledge management server module 28, so as to store processed information in data storage units 36 and aggregated data storage units 38.

In the case of information retrieval at the request of a user, knowledge management server module 28 connects to a database server module 40, which acts an intermediary between data storage modules 36, 38 and knowledge management server module 28. The database server module 40 searches the appropriate data storage module 36, 38 and retrieves the requested information and sends it to knowledge management server module 28. Although the storage modules appear as single units in FIG. 1a any amount of actual components used to store aggregated data or client data is within the contemplation of the present invention.

In accordance with one embodiment of the present invention system 10 includes a system wide server configuration with conventional storage systems for data storage and access that satisfies the load and bandwidth requirements. Examples of such storage systems include Storage Area Network (SAN) and Network Attached Storage (NAS). NAS refers to the use of a large amount of fiber channel RAIDS (Redundant Array of Independent Disks) on a system and sharing the data either through NSF (Network File System) or database access. The use of either SAN or NAS is within contemplation of this invention. Preferably, the network is organized as RAID 5, to support the transport of and access to the large data sheets.

Furthermore the operating system of system 10 uses any operating system, which meets the system's requirements. In one embodiment of the present invention the operating system is a UNIX operating system.

In one embodiment of the present invention, the implementation language of system 10 is Java, running on a Java 1.2x compliant Java Virtual Machine (JVM). Alternatively, Java 1.1x can be used with the option to upgrade to Java 1.2x. The web content is written in JSP (Java Script Protocol), which contains embedded HTML (Hyper-Text-Markup-Language) text along with JSP scripting commands for populating the page with dynamic content. Oracle's PL/SQL (Programming Language/Structured Query Language) is preferably used for database administration purposes on the database server modules. However, any implementation language, which fulfills the requirements of system 10, is within the contemplation of the present invention.

In the present invention, web server area 16 consists of multiple web servers 20 with the flow of traffic controlled by way of a load-balancing module 18. Web server area 16 is preferably disposed between first and second firewalls 14, 22 such that web server area 16 is separated from outside web traffic by way of first firewall 14, and it also separated from the system hardware by way of second firewall 22. First firewall 14 allows only HTTP, HTTPS, S-HTTP, and FTS (File Transfer Protocol) through to web server area 16. Second firewall 22 allows only IP addresses of web servers 20, possibly routing requests from a single user to same web server 20 to simplify session management. A servlet (not shown) works to interface between web servers 20 and application server modules 24 in JSP (Java Script Protocol).

Application server modules 24 serve two primary functions, session management and connection management. Session management is useful for access control and achieving state in an otherwise stateless environment. Connection management is for keeping a pool of resource connections (such as databases), useful for performance reasons. Application server modules 24 maintain the functions involved in managing the applications maintained by the system and providing the interface between the system and web servers 20.

As illustrated in FIG. 1c, application server 24 is described in more detail. Application server 24 includes presentation services modules 46, business objects module 48, data access layer module 50 in accordance with one embodiment of the invention. Application module 46 is configured to handle presentation services, including: security module, presentation module and the request dispatcher. Business objects module includes: core services, globalization module, connection pool management and session management. Data access layer module 50 includes: database wrapper, workgroup wrapper, knowledge management wrapper, analytical wrappers, transaction service wrappers, and new service wrappers. In addition to these modules the application server modules include direct outside Internet connections to transactional services and news services.

FIG. 1b illustrates a block diagram of a knowledge management system 28 in accordance with one embodiment of the invention, although the invention is not limited in scope in that respect. As mentioned before, knowledge management system 28 is coupled to users 12 and data sources 30 through 34 via the Internet.

System 28 includes a search engine 112 that is configured to search information based on search queries provided to it. Search engine 112 includes a data aggregation module 116, which is configured to access various type of data sources, such as sources 30, 32 and 34.

A taxonomy module 114 is coupled to search engine 112. Taxonomy module 114 is configured to store a list of categories related to the information collected and maintained by knowledge management system 28, as will be explained in more detail in reference with FIG. 3 and Appendix I.

Taxonomy module 114 is coupled to a database 37, which includes aggregated database 38 and client data storage 36. Database 37 stores filtered information as processed via taxonomy module 114.

Figure 4:
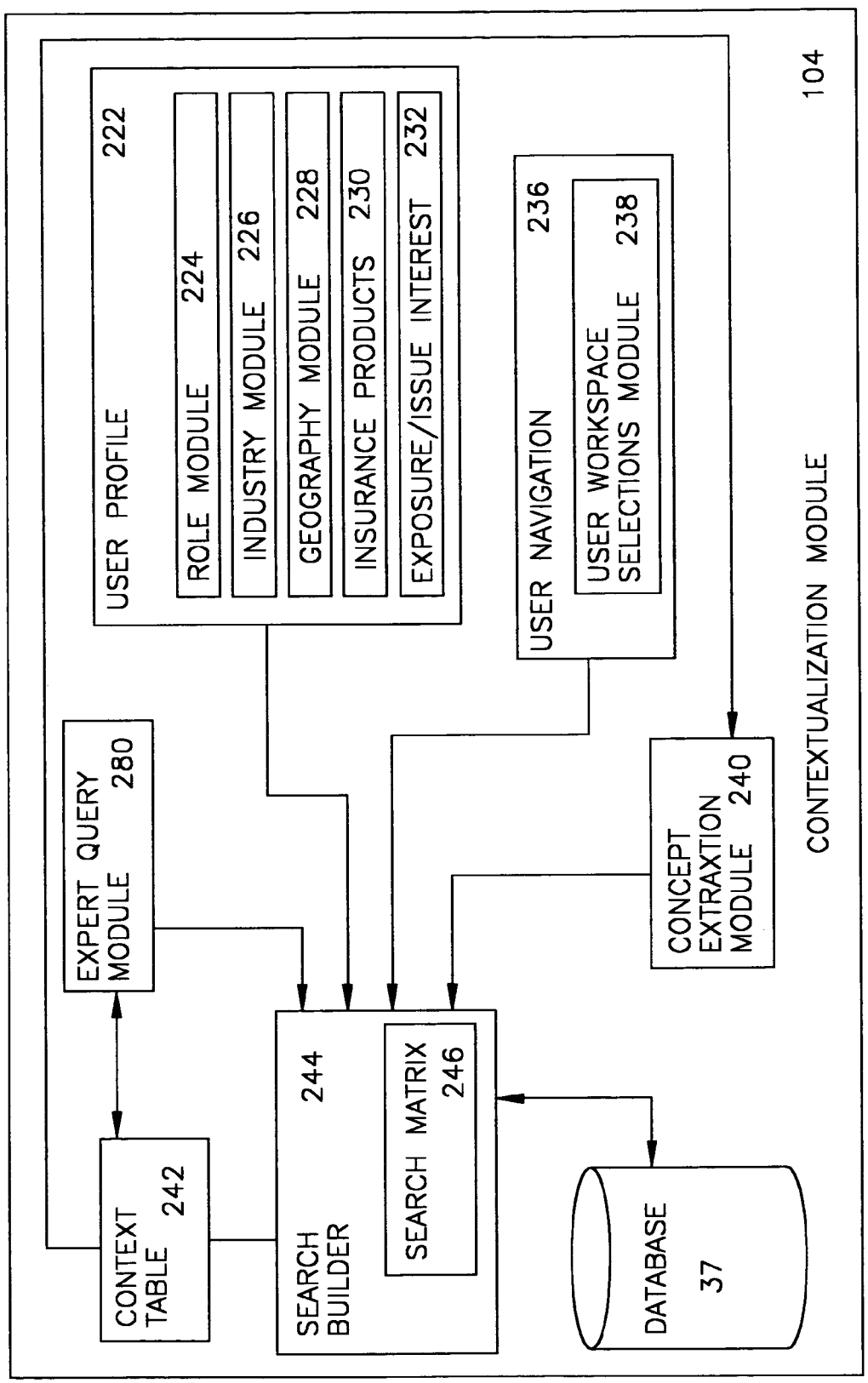
FIG. 4 is a block diagram of a contextualization module in accordance with one embodiment of the present invention.

Knowledge management system 28 also includes a contextualization module 104, which is configured to conduct contextual and role based searches as will be explained in more detail later in reference with FIG. 4. Contextualization module 104 generates search queries corresponding to, among other things, the user's profile and user's navigation through the system, such as the page type that the user is viewing, and the prior page the user was viewing. Contextualization module 104 is configured to store all search queries created dynamically during a user's session with knowledge management system 20.

Knowledge management system 28 also includes a concept—clustering module 106 coupled to database unit 37. Concept clustering module is configured to identify top concepts that are present among a group of documents retrieved during a user's research session. Concept clustering module provides information so as to display a specified number of concepts contained and identified within those documents.

Knowledge management system 28 also includes an analytical module 108, coupled to database unit 37. The analytical module is configured to perform various analytical functions, such as property and casualty benchmarking, company comparisons, insurance financial analysis, league table calculations, risk mapping, risk accounting, claims data, loss triangles, loss development analysis, severity Monte Carlo simulations, financial modeling of cost structure, safety administration reports, engineering reports and financial summary links.

Knowledge management system 28 also includes an administrative efficiency tool module 110, which is also coupled to database unit 37. The administrative efficiency tool module is configured to provide a plurality of chart drawing functionalities that enable the user to asses various insurance programs, as will be explained in more detail in reference with FIG. 15. Module 110 also includes a look-up table processor that enables users to compare various insurance related characteristics in different given jurisdictions. For example, module 110 can provide a look-up chart to a user that desires to compare the rules and regulations relating to captive domiciles arrangements in various jurisdictions, displaying the requirements in each jurisdiction. The look-up processor module is an effective and powerful research tool that provides comparison analysis to users.

Knowledge management system 28 also includes a workspace administration module 102 that is coupled to contextualization module 104, concept clustering module, analytical module 108 and administration efficiency tools module 110. Workspace administration module 102 is configured to control user interface functionalities, including the display of various workspaces on users' terminals, and tracking users' navigation throughout the workspace, dividing the user's terminal into various display portions with corresponding group of interactive commands for users to employ, as will be discussed in more detail.

Figure 2A:
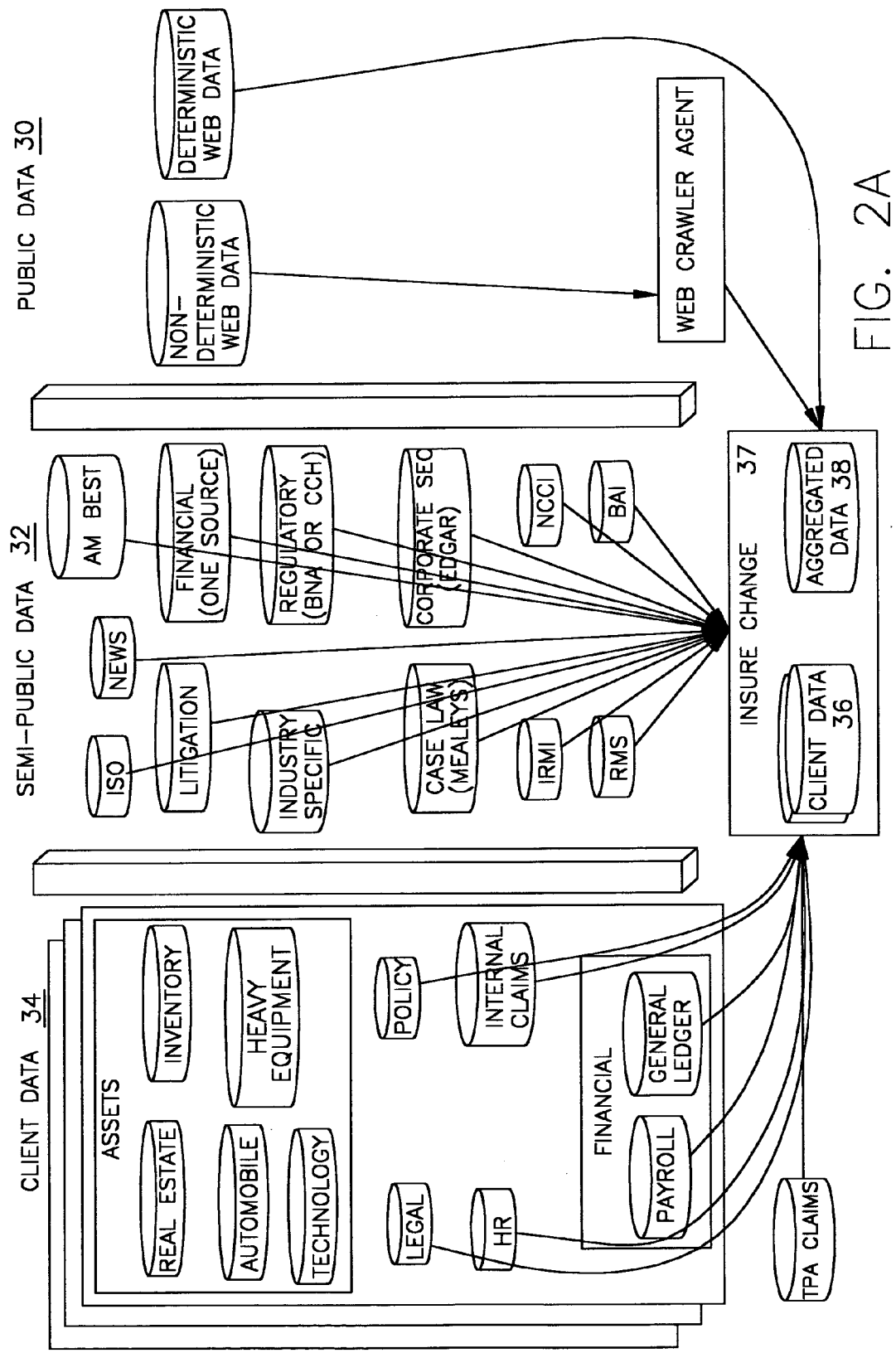
FIGS. 2a-2d illustrate block diagrams of various data sources employed by information management system and different interfacing arrangements in accordance with one embodiment of the invention.

FIG. 2a illustrates a block diagram of various data sources employed by information management system 10. In accordance with one embodiment of the present invention, the data sources are divided into three principal sections, client data 34, semi-public data 32 and public data 30, as illustrated in FIG. 2a.

Client data 34 consists of information derived from the client's own records used to create a client specific database. Information included in this database includes but is not limited to the asset information including: real estate, automotive, inventory, technology and heavy equipment, industry specific material, legal material, policy material, internal claims and human resources information (HR), and financial information including: payroll and general ledger information.

In one embodiment of the present invention, client data 34 is also used to create a collective client information database 36. To increase the amount of source information, system 10 also collects client data not only in a standard client data database, but also it creates a collective database, based on the aggregated data of all clients of the system. To maintain client security and anonymity, the data collective client information database 36 is striped of all client proprietary and confidential material. Therefore database 36 provides an additional source for clients and the system analysts to use for comparisons.

The large client data volume of system 10 provides another useful index for analysis, and as more information is gathered by system 10 the usefulness of collective client information database 36 increases.

Semi-public data 32 includes but is not limited to information consisting of news, AM best, litigation, financial (One-Source), Regulatory, (BNA or CCH) case law, corporate SEC (EDGAR), IRMI, NCCI, RMS, and BAI.

Public data sources 30 include non-deterministic web data and deterministic web data, captured through the use of a commercial web crawler agent.

Although FIG. 2a depicts the client data as being stored in separate modules for each different type of information, it is within the contemplation of the present invention to be compatible with clients with data stored in a single ERP system, which would house all of their information.

Figure 2B:
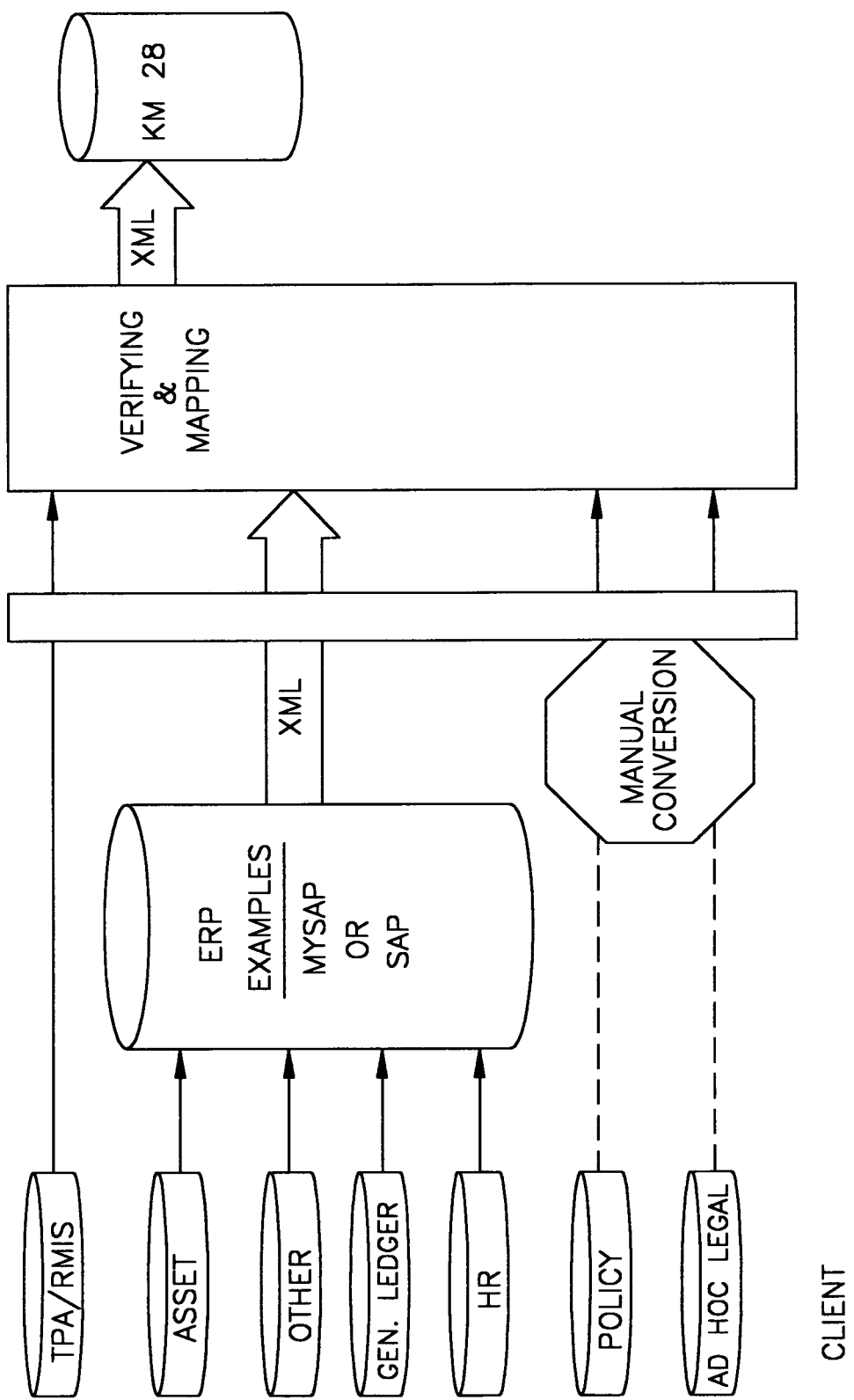

With regard to client data 34, in one embodiment of the present invention, as illustrated in FIG. 2b, the client has an ERP system which internally combines the clients data regarding TPA/RMIS, Assets, General Ledger, HR, and other materials. This allows system 10 to upload this data from a single source, thus requiring only a single interface with that client. Policy and Ad hoc materials are usually manually converted.

Figure 2C:
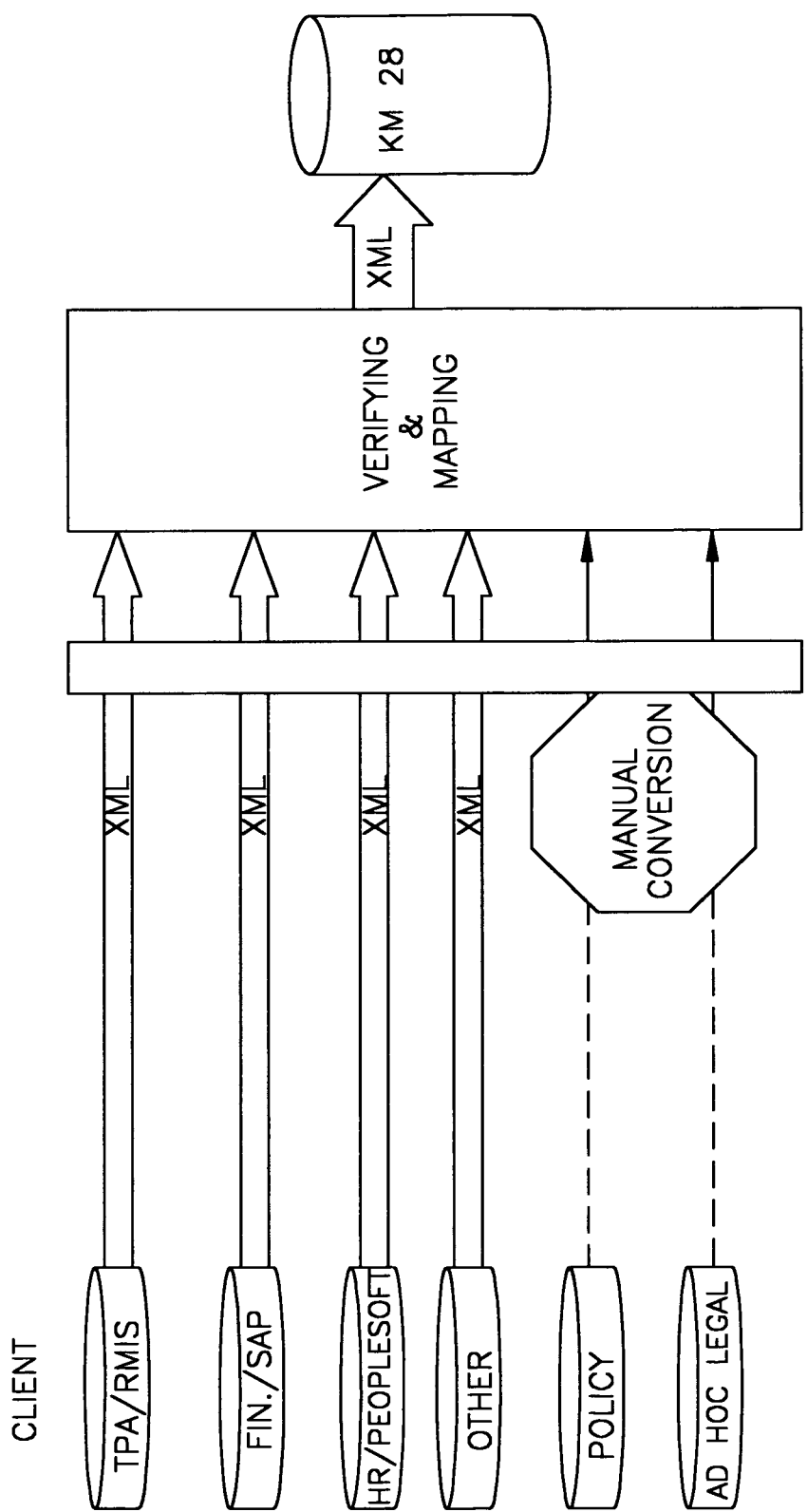

In another embodiment of the present invention, as illustrated in FIG. 2c the client has separate XMLs (extensible Markup Language) for each of its data types. Because the client has not already integrated its own data into a ERP. In this case each XML transfer will require a separate port for data transfer to system 10, and possibly requires mapping and translating from the clients XML to system 10 XML.

Figure 2D:
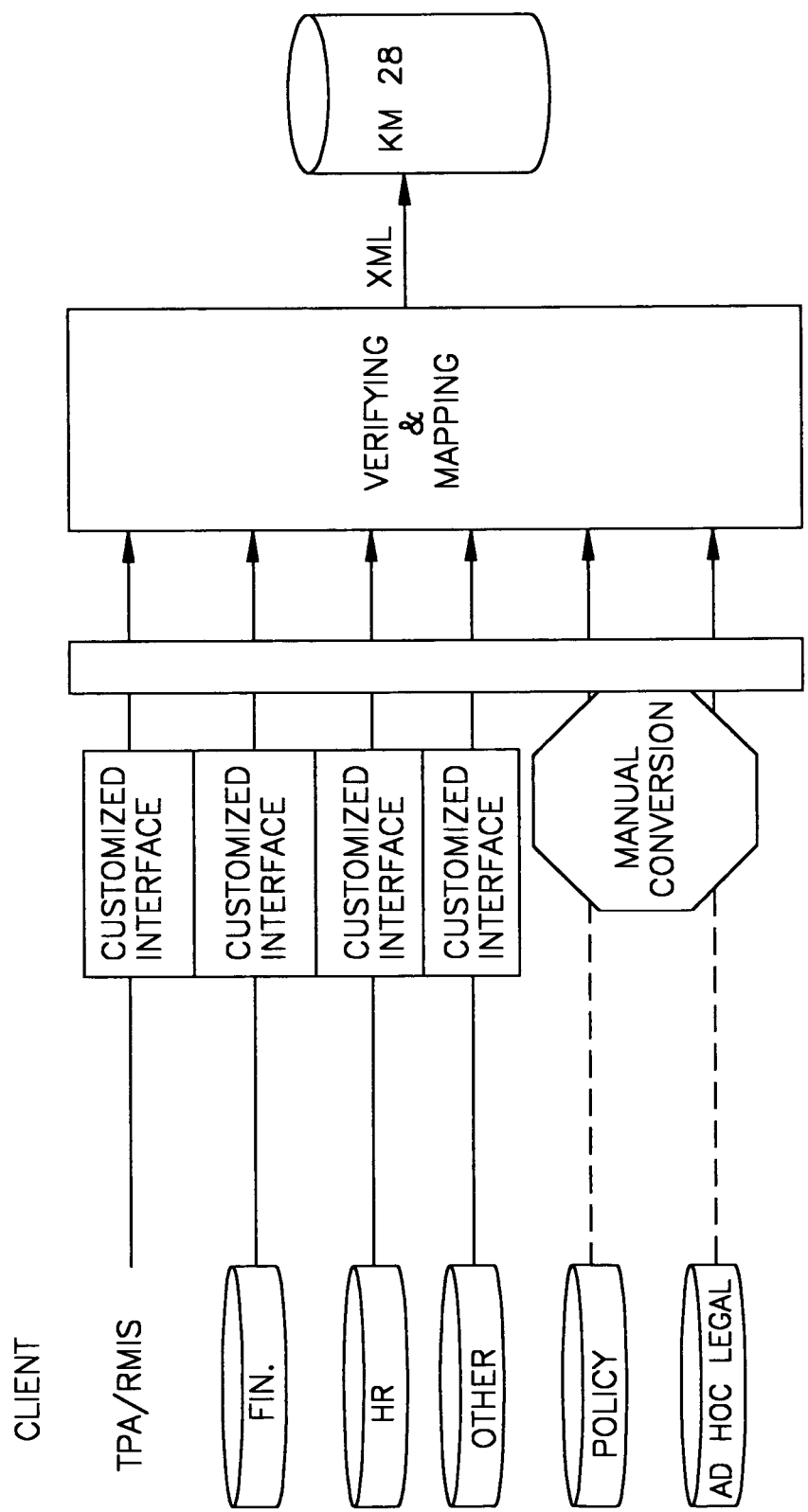

In another embodiment of the present invention, as illustrate in FIG. 2d, the client has neither an ERP system or an XML interface to its own data. In this case, a customized interface is developed that maps and translates the client data from the client's proprietary formats to system 10 XML.

In system 10, the use of a standard XML (Extensible Markup Language) interface that insures continuity in the client data storage modules. An example of an XML that uses standard XML format is the IFX (Interactive Financial Exchange) developed by by ACORD. The EDI (Electronic Data Interchange) specification is called Automation Level 3 (AL3), with mapping between itself and the XML specifications. Other XMLS modules, which can operate in system 10 to properly store client data is within the contemplation of this invention.

In accordance with one embodiment of the invention, system 10 communicates with data storage modules via (JDBC) Java Database Connectivity, as well the use of an object to relational mapping tool for avoiding SQL (Structured Query Language) in the application code.

In one embodiment of the present invention, system 10 provides the ability for users to share data and track tasks. In the insurance industry, data is often shared between client and broker and within the client organization via paper or verbal communication. The present invention provides an electronic medium for more efficient communication through the use of a workgroup/workflow or collaboration software tool 48. System 10 provides the capability for implementing insurance recommendations, to track the recommendation form to its introduction through the client modifications to the impact on risks and insurance. Although the software used for workgroup/workflow software 48 preferably supports Java API (Application Protocol Interface), any such workgroup/workflow software 48 used to facilitate group projects that is found compatible with system 10 is within the contemplation of this invention.

The operation and functionality of knowledge management system 28 is described in more detail hereinafter. It is noted that in accordance with one embodiment of the invention, search engine 112 is configured to locate information on specific topics from web sites on the Internet, and other semi-public and private sources as explained before. In accordance with one embodiment of the invention, system 28 employs search engine 112 to search all available resources for any topic related to the insurance industry. Typical search engines include those provided by Inktomi, WebRefiner and Google.

Once data is loaded into system 28 via search engine 112, data aggregator module 116 normalizes the data so that it is compatible with database 37 specifications. The data obtained by engine 112 is then processed via taxonomy module 114, which categories each document based on categories contained in the taxonomy module.

The categories in the taxonomy module are related to the types of products that business, organizations and individuals desire to hedge associated risks. These risk, include among other things, hazard risks, such as property and casualty losses; operational risks, such as breakdown in business processes or operations; Financial risks, such as capital market fluctuations, or loan defaults; and strategic risks, such as product marketing failures, or new product development failures.

In accordance with one embodiment of the invention, taxonomy 114 includes approximately 300 insurance-related categories. It is appreciated by those skilled in the art that category definitions in taxonomy 114 may expand over time. Although the taxonomy has more than one level (it is hierarchical, not flat), "categories" are only defined at the lowest level (the "leaves" of the "tree"). Higher levels of the taxonomy are only used for organizational purposes.

Thus, for example, if a taxonomy had a hierarchy:

| Level 1 | Level 2 | Level 3 |
| --- | --- | --- |
| Sports | Baseball | Minor League Baseball |
|  |  | Major League Baseball |
|  | Football | College Football |
|  |  | Professional Football |

Then only the categories at level 3 are true "categories" that require a definition. The other levels would simply be used for organizational purposes.

Further, the information in taxonomy module 114 is overlapping, not orthogonal. Thus, a low-level category could fit into more than one place in the hierarchy. For example, the taxonomy could include the following high-level categories: "Sports" and "Education," and "College Football" would fall into both categories (either directly or indirectly).

As documents are fed into system 28 via search engine 112, they are analyzed and classified into one or more of the categories in the taxonomy. For each category a corresponding rule is created in accordance with one embodiment of the invention. (These are referred to as "rule-based queries.") For example, a simple rule could be (in lay terms): "If the word 'environmental' appears in the same sentence as the word 'contamination' in a document, classify the document in the Environmental_Contamination category.

Because the taxonomy module in accordance with one embodiment is focused solely on insurance, a category may bear a close relationship to other categories (for example, long-term disability insurance and short-term disability insurance). For this reason, when developing rules, it is necessary to clearly differentiate each of the categories, in order to minimize potential overlaps.

In accordance with another embodiment of the invention, insurance domain experts develop the substantive foundation for the creation of rule-based queries. As described above, the ultimate format of these queries are used to automatically categorize documents in the applicable insurance categories.

It is noted that various embodiments of the invention have various approaches to automating the categorization of documents. However, in accordance with one embodiment, preferably a rule-based query arrangement is employed. Rule-based queries utilize a Boolean like structure and proprietary grammar, which "define" which documents should be classified in which categories.

Generally speaking, a rule states that if a document contains certain words or phrases then it should be included in a given category. This simple concept—categorizing documents based on the existence of certain terms—is reinforced through the use of modifiers and operators, in which the system examines a number of additional features of search terms and how they appear in a document. These features include:

how often a term appears in a document
whether all of the terms appear
whether any of the terms, or one or more of the terms, appears
how close the terms are to each other
whether the terms appear in a certain order
whether the case of the search terms matches the case of the terms found in the document
whether the precise format of the term is found in the document, or, on the other hand, whether a variation or synonym of the term is found
whether certain terms appear that would cause the document to be excluded from a given category Further, the ranking of documents must also be considered. Because only a limited number of all of the matching documents are returned to a user (for example, there may be thousands of documents of all of the documents stored by system 28 that contain the words "environmental" and "contamination" in the same sentence, but only 250 will be returned to the user), and because a typical user will only look at the first fraction of all of the returned documents, the documents need to be ranked based on how well they match the category. Thus, each query includes a method for ranking documents by giving each document a numeric confidence rating. This ranking method may include giving greater (or lesser) weight to the existence of certain terms and phrases, and also giving greater weight to the number of appearances each term and phrase makes in a document. This may be coupled with the use of a numeric threshold, which only permits a document to be returned to the user if the document's confidence rating exceeds the threshold.

Other, more generalized considerations also must be taken into account, which varies from category to category. For example, it may be preferable to risk returning many "irrelevant" documents in order to ensure that as many "relevant" documents as possible are returned (this is known as "recall"). Alternatively, it may be preferable to risk not returning many "relevant" documents so that minimum number of "irrelevant" documents are returned (this is known as "precision").

In accordance with one embodiment of the invention, Verity Query Language (VQL) is the language that is used to create the rule-based queries that are utilized by taxonomy module 114, to analyze and classify documents.

FIG. 3a illustrates a query definition table 160 used by taxonomy module 114 that defines a query related to a category. As illustrated each field in the table relates to a definition of rules that generate a query. As such, each query definition includes a filed that defines the category prefix. Another field of the query definition includes the name of experts who were involved in developing the category and its related search query. A third and forth field define the original category name, and an updated category name correspondingly. Other fields include original category definition and updated category definitions.

Query definition table 160 also includes an item section, which contains all the keyterms and phrases relevant to a category. For each item, a field is provided that identifies the category number. Another field specifies whether a term should be used in its exact format. Yet another field specifies whether the term is case sensitive. Another term specifies whether multiple incidents of the same term exist in the document. Another field specifies the weight associated with a document because of presence of a corresponding term. Another field defines the terms.

Query definition table 160 also includes a parts section, which divides the items into logical parts, each part defining a relationship among its member items.

Finally, query definition table 160 includes a structure section that defines a rule governing the relationship of the parts defined in the part section.

Each query may be composed of the following:
a name for the rule (optional)
a weight (optional)
one or more operators (at least one is required)
one or more modifiers (optional)
the search terms, which can be a word or a sub-rule (at least one is required)

A rule (including a sub-rule) returns a score for every document in every category. The score will be between 0.01 and 1.00 (with 1.00 the highest). If a rule scores a document as 0.00 for a given category, it will be ignored. For a simple rule, a document that satisfies the rule will return a score of 1.00. This score can be adjusted by applying a weight to the search terms or by using the MANY modifier, as described below. For purposes of the example of FIG. 3a, as described below, VQL contains the following classes of operators and modifiers (the use of word in the descriptions below could mean any search term: a word, phrase or sub-rule).

Evidence Operators
WORD word—The WORD operator checks whether the document contains an exact match for word.
STEM word—The STEM operator checks whether the document contains word and its variations (such as plurals, different verb tenses, etc.).
WILDCARD word*—The WILDCARD operator checks whether the document contains word as well as any word which has word as its prefix, such as "disab*", which would match "disability," "disabled", etc. (Other wildcards are permitted, such as ?, which allows a variation for any single character, etc.)
THESAURUS word—The THESAURUS operator checks whether the document contains word as well as certain predefined synonyms of word.

Proximity Operators
NEAR [word1, word2 . . . ]—The NEAR operator checks whether the document contains both word1 and word2 (and any other listed words). If all search terms are located, a score is returned based on how close together in the document the listed words are (the closer together, the higher the score).
NEAR/N [word1, word2 . . . ]—The NEAR/N operator is similar to NEAR, except the listed words must be within N words of each other for the document to match. As for NEAR, if all search terms are located (within N words of each other), a score is returned based on how close together in the document the listed words are.
PARAGRAPH [word1, word2 . . . ]—The PARAGRAPH operator checks whether the document contains both word1 and word2 (and any other listed words) in the same paragraph. Due to limitations on the format of the documents being fed into our system, a paragraph is simply a certain number of words and not a true paragraph.
SENTENCE [word1, word2 . . . ]—The SENTENCE operator checks whether the document contains both word1 and word2 (and any other listed words) in the same sentence.
PHRASE [word1, word2 . . . ]—The PHRASE operator checks whether the document contains both word1 and word2 (and any other listed words) in the same phrase, meaning one directly after the other.

Concept Operators
Intersection Type
ALL [word1, word2 . . . ]—The ALL operator checks whether the document contains both word1 and word2 (and any other listed words). If all of the words are found, a score of 1.00 is returned.
AND [word1, word2 . . . ]—The AND operator checks whether the document contains both word1 and word2 (and any other listed words). Unlike ALL, the score returned by AND may be adjusted based on the weight given certain search terms and the number of times (using MANY) certain search terms are found in the document.

Union Type
ANY [word1, word2 . . . ]—The ANY operator checks whether the document contains either word1 or word2 (and any other listed words). If any of the words are found, a score of 1.00 is returned.
OR [word1, word2 . . . ]—The OR operator checks whether the document contains either word1 or word2 (and any other listed words). Unlike ANY, the score returned by OR may be adjusted based on the weight given certain search terms and the number of times (using MANY) certain search terms are found in the document.
ACCRUE [word1, word2 . . . ]—The ACCRUE operator checks whether the document contains either word1 or word2 (and any other listed words). Unlike ANY, the score returned by ACCRUE may be adjusted based on the weight given certain search terms and the number of times (using MANY) certain search terms are found in the document. Unlike OR, the score returned by ACCRUE is further adjusted by the number of terms on the list that appear. Thus, if three words are searched for, documents containing all three words will score higher than documents containing less than three, although documents that contain any of the terms will always return a score above 0.00.

Modifiers
MANY word—The MANY modifier checks whether the document contains word and, if so, returns a score based on the density of that word in the document (i.e., the number of times the word appears divided by the length of the document). Thus, the more times a word appears, the higher the score. If two documents contain word the same number of times, the shorter document will get a higher score, because the word density is greater.

CASE word—The CASE modifier will only match word against a word in the document with the exact case.
NOT word/operator—The NOT modifier will exclude a document if it contains word or the search operator that follows.
ORDER [word1, word2 . . . ]—The ORDER modifier checks whether the document contains both word1 and word2 (and any other listed words) in the order provided, although not necessarily one right next to the other. This is typically used with a proximity operator, to ensure both that a certain order is followed and that the words appear near each other.

Weights

A weight can be applied to sub-parts of a rule to affect the overall score given a document. The weight can be any number between 0.01 and 1.00. By default, the weight of most items is 1.00, but the elements searched for by ACCRUE have a default weight of 0.5.

Example of a Simple Rule

Figure 3B:
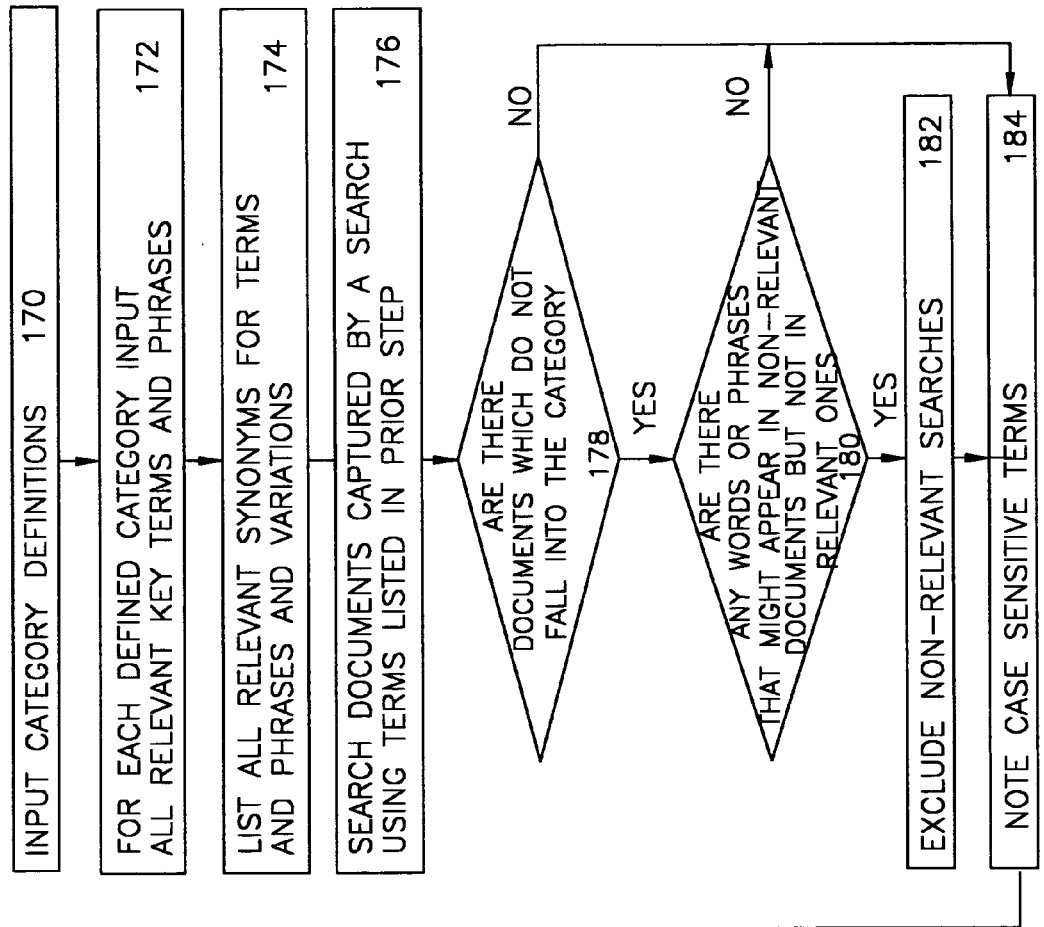
FIG. 3b illustrates a flow chart that defines the guidelines for defining a search query for a given category in accordance with one embodiment of the invention.

FIGS. 3a and 3b describe a simple rule that looks for documents that discuss gambling in Reno, Nev., in accordance with one embodiment of the invention. The rule has been named "Reno_Gambling." Table 3a can be described in accordance to VQL as follows, although the invention is not limited in scope in that respect.

```
    Reno_Gambling <AND>
(1)         <SENTENCE>
                <CASE><WORD> Reno
                <ANY>
                    <CASE><WORD> Nevada
                    <CASE><WORD> NV
(2)         <ACCRUE>
                0.80 <MANY><THESAURUS> gambling
                0.80 <MANY><THESAURUS> casino
                <WORD> blackjack
                <WORD> poker
                <WORD> craps
                <WILDCARD> slot*
                <PHRASE>
                    <WORD> slot
                    <STEM> machine
(3)         <NOT><ORDER><SENTENCE>
                <ANY>
                    <CASE><WORD> Janet
                    <PHRASE>
                        <CASE><WORD> Attorney
                        <CASE><WORD> General
                    <CASE><WORD> Reno
```

Translated, here is what it is happening: By using the AND operator, the rule is looking to match any document that includes all of (1), (2) and (3). It does not matter how close to each other these three search items are.

Search term (1) is a sentence that includes the word "Reno" with initial cap and either the word "Nevada" with initial cap or "NV" in all caps.

Search term (2) contains a list of gambling terms. We have provided greater weight to terms such as "gambling" and "casino" (the default weight is 0.50, we have provided a weight of 0.80) over more specific forms of gambling. Also, documents that mention "gambling" or "casino" more often will be given a greater weight than those that mention it less often, through the MANY modifier. Notice that we have used the THESAURUS operator for "gambling" and "casino," so that we pick up synonyms of these terms. For "slot" we have used a WILDCARD, so that words like "slots", "slotmachine" and "slot-machine" will be caught. We have separately asked to look for the PHRASE "slot machine." The term "machine" has been STEM-med so that plurals of this term are also retrieved. Also the use of the ACCRUE operator is noted.

Documents that contain more of the terms on the list: gambling, casino, blackjack, poker, craps, slot*, and slot machine, will rank higher than documents that only refer to one or a fewer terms on this list.

Finally, the query definition would not include any documents that actually concern Janet Reno, such as might discuss a crackdown on illegal gambling by the Justice Department. Thus, search term (3) specifies that documents not only need to contain gambling terms and a reference to Reno, Nev., but they may not contain a reference to the word "Janet" with initial cap or the phrase "Attorney General" with initial caps, followed by the word "Reno" with initial cap, with both in the same sentence.

FIG. 3b illustrates a flow chart that defines the guidelines for defining a search query for a given category. Thus, a rule for each category can be written in a search language such as VQL based on the guidelines provided and illustrated in FIG. 3b.

Initially a team of experts are provided with a file, such as Excel containing worksheet templates in the form of table 160 (FIG. 3a) for the categories for which they are responsible. Each worksheet is named with the Category_Prefix for the category, and contains a template that is completed so that it may be later converted into a an appropriate language such as VQL. The template already has certain information filled in, such as the definition of each category from the categories listed in taxonomy module 114.

Taxonomy module 114 begins at step 170 to receive a category name from taxonomy category definitions. For each category, the following steps are taken.

In accordance with one embodiment of the invention during the phase of developing category terms, designers of system 28 consider sample articles and documents that relate to the category. Doing so helps the designers to prepare a substantially complete list of the key words and phrases (and their synonyms) that are found in documents about the category, and gives them more insight into the structure of these documents, such as how often words and phrases are repeated, how close to each other they are found, etc. This process also helps the designers to identify documents that do not fit within the category but that may be found in a key word search.

In accordance with one embodiment of the invention, at step 172, all relevant key terms and phrases are provided. Various ways to locate relevant articles includes the step of performing a search for documents on the Web, each using a different general-purpose search engine (such as Yahoo and Northern Light), or by going to an insurance news Web site (such as www.AIGonline.com, www.insurancenewsnet.com, www.riskandinsurance.com, www.newsre.com, www.ltc-newsandcomment.com, www.disabilitynews.com, www.insurancejrnl.com, www.claimsmag.com, www.propertyandcasualty.com, www.re-world.com, etc.), based on the defined key terms and phrases. It is noted that certain categories are general purpose, not insurance related, such as "Earthquakes," and do not require articles with an insurance slant. In accordance with one embodiment of the invention retrieving around five unique articles about each category, provides a sufficient basis for building rules.

Furthermore a list of all relevant synonyms for the defined terms and phrases are created at step 174. Variations of the key terms that are not readily apparent (different verb endings for verbs, plurals for nouns, and adjectival and adverbial formats of nouns are all considered to be apparent) are also noted at step 174.

Next, at step 176 all documents based on terms generated at step 174 are retrieved. At step 178, those documents, which do not fall into the category are considered. The documents are analyzed to determine whether there are any words or phrases that might appear in such "irrelevant" documents (but not in "relevant" documents), which would provide a basis for excluding such documents from the category. For example, a search for documents about Reno, Nev. could search just for the initially capitalized word "Reno," but this would likely also include documents about Janet Reno. Thus, the search could be enhanced to exclude any documents that contain the word "Janet" or the phrase "Attorney General" in the same sentence as the word "Reno" as illustrated in steps 180 and 182.

Next key terms, which should be searched for in a case sensitive manner are preferably considered at step 184. This would include proper nouns (company names, place names, people) and abbreviations.

Next, words or phrases that need to be searched for in the exact spelling format are considered (for example, no plurals for nouns) at step 186. If exact spelling is not specified then a STEM, THESAURUS or WILDCARD search will be performed on the item.

Next, at step 188, whether a document should be ranked higher is considered, because certain words or search terms appear multiple times in the document. Also whether any words or search terms should be given a higher (or lower) weight than others is noted. For example, if a document would match if it includes any of four gambling words, such as "poker," "slots," "blackjack," and "roulette," the word "slots" may be given less weight, because "slots" can have a meaning besides a gambling device or game. If terms appearing at the same "part" in a search should be given different weights, then a weight for each of these terms on a scale of 1 (lowest) to 10 (highest) is provided. Thus, poker, blackjack and roulette might each get a 10, and slots 5. If weights for items in a part of a search are not important, the "Weight" value remains blank.

Next, at step 190, if necessary, the items are consolidated into parts, identifying each group with a letter. This may only be necessary for a search with many sub-parts. For simpler searches, each item is treated as a part. For example, many items are synonyms for each other. These items are put in a part indicating that "any" of them would be useful, and as such are noted by a number. If certain terms must appear in proximity to each other, a part and a corresponding proximity criteria is noted (such as the maximum number of words that should separate the items, that they should be in the same sentence or paragraph, or simply that the closer the terms are in a document, the better). Also whether the order of the terms is important and the order itself is indicated.

In the Structure section, the relationship of the parts to each other is noted at step 192. Parts that must appear in conjunction with other parts are noted (for example, "Reno, Nev." must appear with "gambling"). If a conjunction is required, whether the proximity of these parts matter is noted. Also, whether the order of the parts matter is noted. Furthermore, whether the existence of a part in a document indicates that the document should be excluded from the search is noted. The Structure section should contain a single sentence explaining the high level structure of the rule.

Next, at step 196, each rule is considered so as to whether the search terms should be broken up for greater accuracy. Thus, two (or more) completely unrelated search terms can be employed to classify documents in the same category. Because separate rules can be joined together with an ANY operator, such a structure is allowed and would be easier to understand and maintain in accordance with one embodiment of the invention.

FIG. 3c illustrates a taxonomy table 210, with categories defined in accordance with query definitions explained in reference with FIGS. 3a and 3b. Generally, taxonomy table 210 has a field that defines the types of risks the documents retrieved by search module 112 are related. As explained before, such risk types include, among other things, hazard risks, operational risks, financial risks, enterprise risks, and strategic risks. A second field defines the insurance types, such as property, casualty and benefits. A third field relate to various insurance groups. Another field relates to category name and category prefix as described above in reference with FIGS. 3a and 3b. The last field includes the category definitions for collection of documents. In accordance with one embodiment of the invention, this last field relates to the query rules developed in accordance with the steps described in accordance with FIG. 3b.

Thus, each document retrieved by search engine 112 is filtered in accordance with the category rules defined in taxonomy module 114. As such each document is also tagged in accordance with the query rules, for further research and retrievals by the users of knowledge management system 28. Appendix I, discloses a list of all categories defined in accordance with the best mode embodiment of the present invention.

The operation of contextualization module 104 is described in more detail hereinafter in reference with FIG. 4. As mentioned earlier, contextualization module 104 is configured to provide relevant research information as a user navigates through various screens provided by knowledge management system 28 via its workspace administrator module 102. Contextualizatoin module 104 dynamically builds search queries that retrieve relevant information.

Contextualization module 104 includes a user profile module 222 that is configured to retrieve the profile of the user navigating through various pages provided by knowledge management system 28. User profile module 222 in accordance with one embodiment of the invention is a table containing various fields relating to the profile. For example these fields in accordance with one embodiment of the invention include, the user's role field 224 that stores the role of the user within the insurance industry, for example, an insurance administrator, a broker or an underwriter. Industry field 226 defines the industry within which the user operates, for example, high technology, construction, real estate, etc. Geography field 228 contains the location of the user, or the location within which the user is active. Insurance products 230 field contains the information representing the insurance products that the user is interested. Finally, exposure/issues of interest field 232 contains the information relating to the types of risk exposures and insurance related issues that the user is interested.

Contextualization module 104, also includes a user navigation table 236, which is configured to track the navigation of the user within the workspace provided by knowledge management system 28. As such, user navigation module 104 includes a field or a buffer user workspace selections 238 that is configured to store every location within the workspace navigated by the user. As such, contextualization module 104 has access to information relating to the current and prior location of the user's navigation.

Contextualization module 104, also includes a concept extraction module 240, which is configured to identify top concepts relating to the documents retrieved in connection with a user's research. Concept extraction module 240 operates such that various concepts relating to a particular topic are uncovered and stored. Concept extraction module 240 analyzes the text or document that is being viewed by the user to extract the top concepts within it.

The concept extraction module is configured to analyze specific word patterns to uncover concepts that originally were not known to have a relationship with the underlying user's search.

Contextualization module 104 also includes an expert query module 220, which is configured to store search queries that are considered timely or news breaking and have not been defined within taxonomy module 114 yet. Expert query module 220 is periodically and constantly updated in accordance with one embodiment of the invention. Furthermore, expert query module may be maintained with various experts on each related topic, who are constantly recent topics and ground breaking news and define new categories and associated rules to update expert query module 220. These categories and associated query rules are provided in accordance with the same steps explained in reference with FIG. 3b.

Contextualization module 104 also includes a context table 242 coupled to expert query module 220, and concept extraction module 240, which is configured to provide the appropriate expert queries based on the context of the user's research.

Contextualization module 104 also includes a search builder module 244, which is coupled to context table 242, expert query module 220, user profile module 222, user navigation module 236 and concept extraction module 240. Search builder module is also coupled to database 37. Search builder module 244 is configured to provide search queries corresponding to the type of a research a user desires. To this end, search builder 244 includes a search matrix 246, which is configured to provide search queries within the context of a user's research.

Thus, based on the information provided by user profile module 222, user navigation module 236, expert query module 220, concept extraction module 240, search matrix 246 generates a query string that can be used to obtain relevant information from database 37. It is noted that the query string provided by search matrix 246 includes the categories defined in taxonomy module 114. To this end the searches conducted by search builder 244 employ the same query search rules defined in taxonomy module 114 as explained in reference with FIG. 3b.

In accordance with one embodiment of the invention, context table 242 receives the appropriate context of the user from user profile module 222 and user navigation module 236 via a search builder module 244.

Figure 5A:
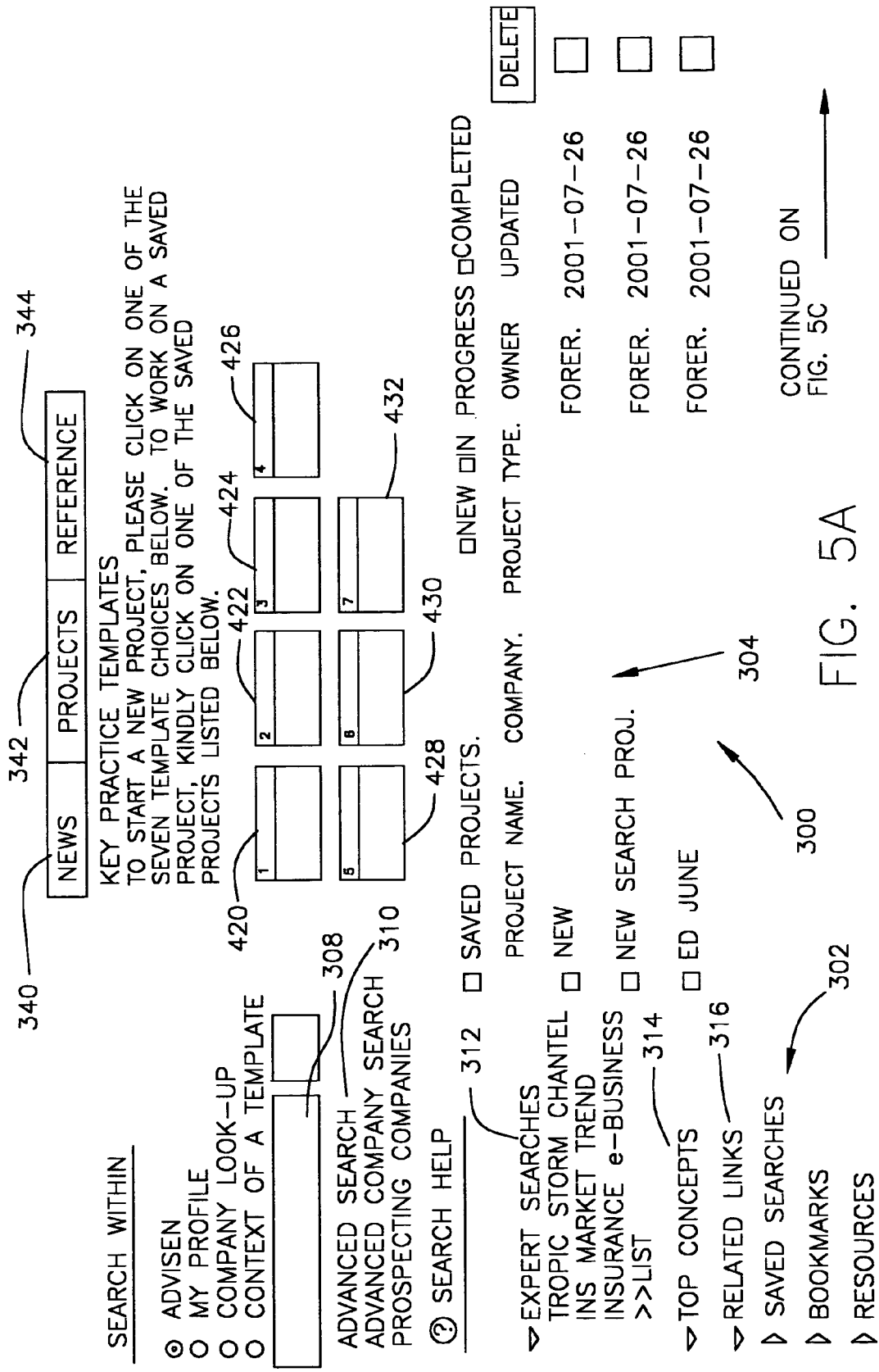
FIG. 5a illustrates a user graphical interface as displayed by the knowledge management system in accordance with one embodiment of the present invention.
Figures 5C, 5D:
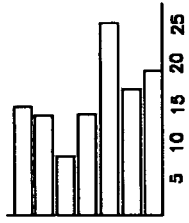
FIG. 5b illustrates an advanced search page in accordance with one embodiment of the invention.
Figure 5D:
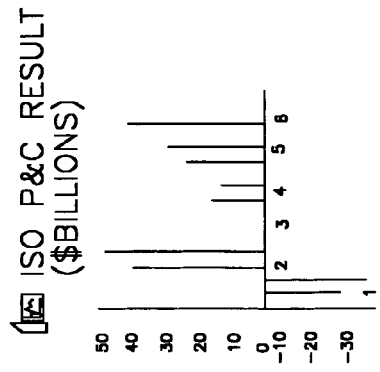

The operation of contextualization module 104 is explained in more detail in reference with FIG. 5a, which illustrates a sample workspace generated by workspace administrator 102 (FIG. 1b). As illustrated workspace 300 is displayed to a user who has visited a site provided by knowledge management system 28. In accordance with one embodiment of the invention, workspace 300 is divided into three separate portions, including a search portion 302, a key practice portion 304 and an analytical tool portion 306. It is noted that these portions may change depending on the page the user is visiting within the knowledge management system.

The functions provided within search portion 302 are governed among other things, by contextualization module 104. Accordingly, the "search within" field includes "advisen" field, "my profile" field, "company look-up" field and "context of a template" field. Below these fields, there is a search box field 308 that enables users to provide their own key words and phrases and to conduct desired searches within a specified field.

To this end, a user after entering the desired key words in search box field 308, selects one of the available fields. If the user selects a search within advisen, search builder 244 retrieves the key words and conducts a search of all available data with database system 37.

If the user selects a search within "my profile" field, search builder 244 obtains the profile information from user profile 222, so as to generate a search query in response to the profile information and the desired keywords provided by the user. Thus, the search is conducted within the documents that are not only related to the desired keywords but also the categories that are related to the user's profile.

If the user selects a search within "company look-up" field, search builder 244 generates a search query relating to the company name provided by the user in box 308.

If the user selects a search within "context of a template" field, search builder 244 obtains information from user navigation module 236 so as to generate a search query relating to one of the key practice templates in the projects section 304 of workspace 300. Thus, the search is conducted within the document that are not only related to the desired keywords, but also categories that are related to the template the user is operating.

The advanced search option 310 responds by providing an interface page as illustrated in FIG. 5b. Advanced search page includes a keywords box 320 that enables the user to enter the terms that best describe the desired search. The keyword box allows for Boolean searches, similar to conventional search engines.

The advanced search page also includes an "exact phrase match" option 322, so as to enable a user to treat all of the words entered in the keyword box as a phrase. Sources field option 324, allows the user to specify the information sources that can be used for conduction the search specified in the keyword box.

Similarly, data range field 326 allows the user to restrict the search results to documents published within a certain time frame. By default, the system searches for documents published within the previous 30 days. Industry field 328 allows the user to restrict the search results to documents that concern a particular industry by selecting an industry from a pull-down menu. Only one industry at a time may be selected. If the user does not select an industry, the search includes all industries. The list of 30 industry categories, corresponds to the RIMS (Risk and Insurance Management Society) industry categories, making them useful for insurance professionals.

Geographic region field 330 allows the user to retrieve only those documents that refer to a particular geographic region by selecting a region from a pull-down menu. Only one region may be selected at a time. If no region is selected, the search will include all regions.

Finally category field 332 allows the user to search for information based on the categories defined within taxonomy module 114. The user may restrict the results of a search by taking advantage of these pre-defined categories. By default, the system searches for documents in every category. To restrict a search to a subset of categories, the user can select the option of "select up to 25 categories" radio button. Next, the user clicks on the category for which the search is restricted. Otherwise, the search can be restrict to a set of the available categories or to all of them.

Referring back to FIG. 5a, search portion 302 also includes in-context preformatted searches as provided by contextualization module 104. Thus, when a user selects expert searches field 312, search builder module 244 retrieves the categories defined and stored in expert query module 220, so as to generate a pre-formatted search query, based on recent topics and issues.

In accordance with another embodiment of the invention, context table 242 provides the user's context information to expert query module 220. This information includes the user's profile and/or user's navigation within the workspace. In response, expert query module 220 generates only the categories that are relevant to the user's information, among all the categories available within expert query module 220.

When a user selects top concepts field 314, search builder module 244 retrieves the categories provided by concept extraction module 240. Concept extraction module 240 provides the top concepts that are identified in-context. To this end, all documents relating to the user's profile and navigation are first obtained based on the query generated by search builder 244. Afterwards, concept extraction module identifies top concepts within those retrieved documents and makes those concepts available for further research by the user. As such, those additional concepts are presented in the form of additional new categories, against which database 37 could be searched.

When a user selects related links field 316, search builder module 244 generates a group of links related to the user's research work. Clicking on a suggested link takes the user to the specific web page where the relevant information is. The links are presented "in context" based on the user's profile and the user's navigation information, such as the products/industries/exposures on which the user is working, and the location of the user in the system.

Contextualization module 104 is an effective search tool that enables the user to retrieve documents that are related to the context of the research being handled and to the profile of the user who is conducting the research. To this end, module 104 dynamically generates a list of categories obtained from taxonomy module 114 that are relevant to the context of the research.

Figure 6:
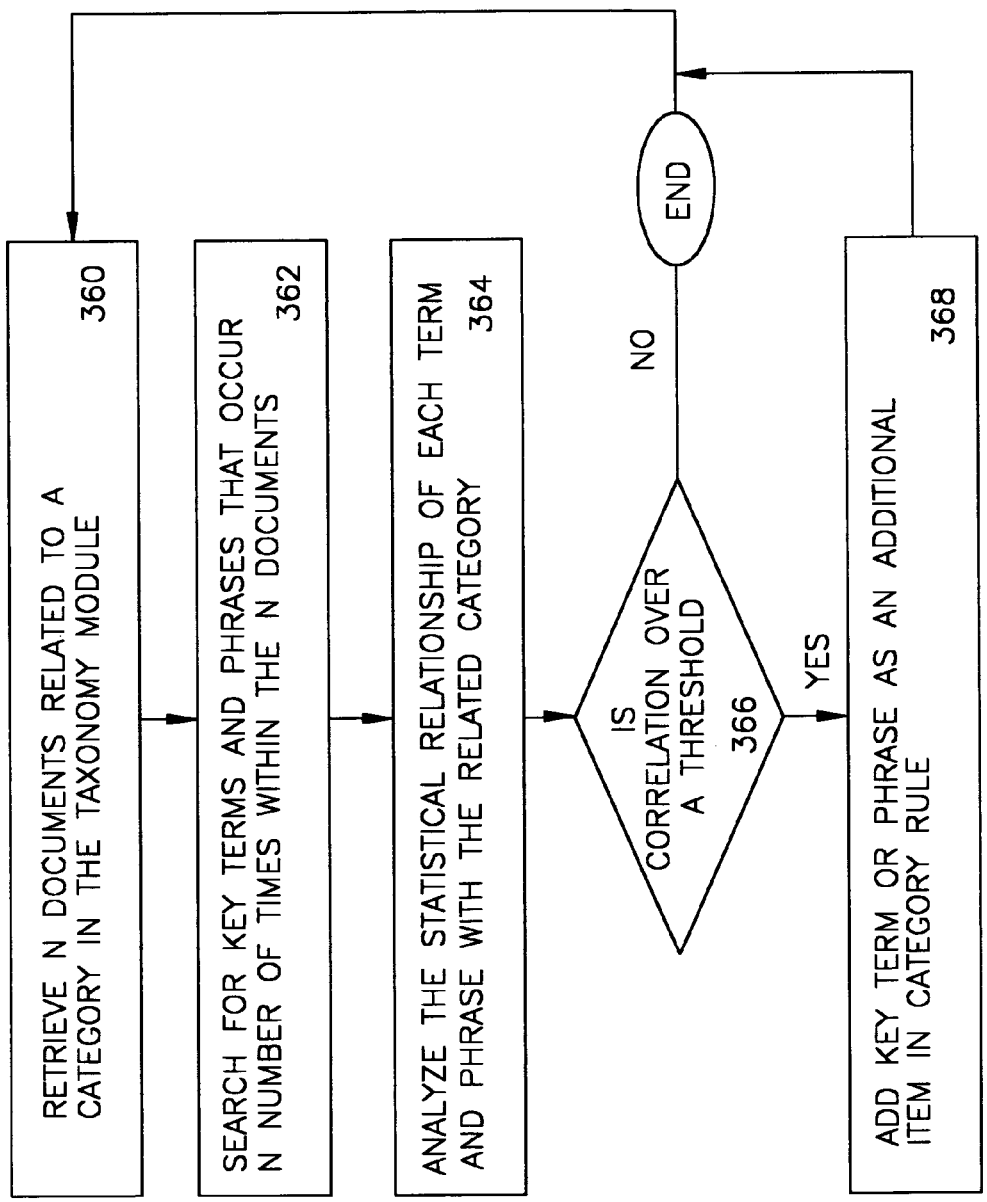
FIG. 6 illustrates a concept clustering process in accordance with one embodiment of the invention.

The operation of concept clustering module 106 of FIG. 1b is now described in more detail in reference with FIG. 6. Generally, concept clustering module 106 is configured to find terms or phrases that are related to a category defined in taxonomy module 114, which have not been previously identified as a related item, within the item list illustrated in table 160 in reference with discussion of FIG. 3a.

To this end, "concept clustering" module 106 at step 360 retrieves n number of documents related to a selected category defined in taxonomy module 114, where n is a sufficiently reliable integer. In accordance with one embodiment of the invention, n is about 20 documents.

At step 362, concept clustering module 106 searches for key terms and phrases that occur m number of times within the retrieved documents, where m is a sufficiently reliable integer.

At step 364, concept clustering module 106 analyzes each of the key terms and phrases and determines the statistical correlation between the key terms and phrases with the selected category.

At step 366, module 106 determines whether the correlation between the key terms and phrases are larger than a specified threshold. If so, module 106 provides the key term and phrases to taxonomy module 114 as additional items in category rule table 160 of FIG. 3a.

Referring back to FIG. 5a, key practice portion 304 is described in more detail. In accordance with one embodiment of the invention, knowledge management system 28, and specifically work space administrator 102 (FIG. 1), includes options for various predefined projects that are employed by those involved in the insurance industry.

Figure 1D:
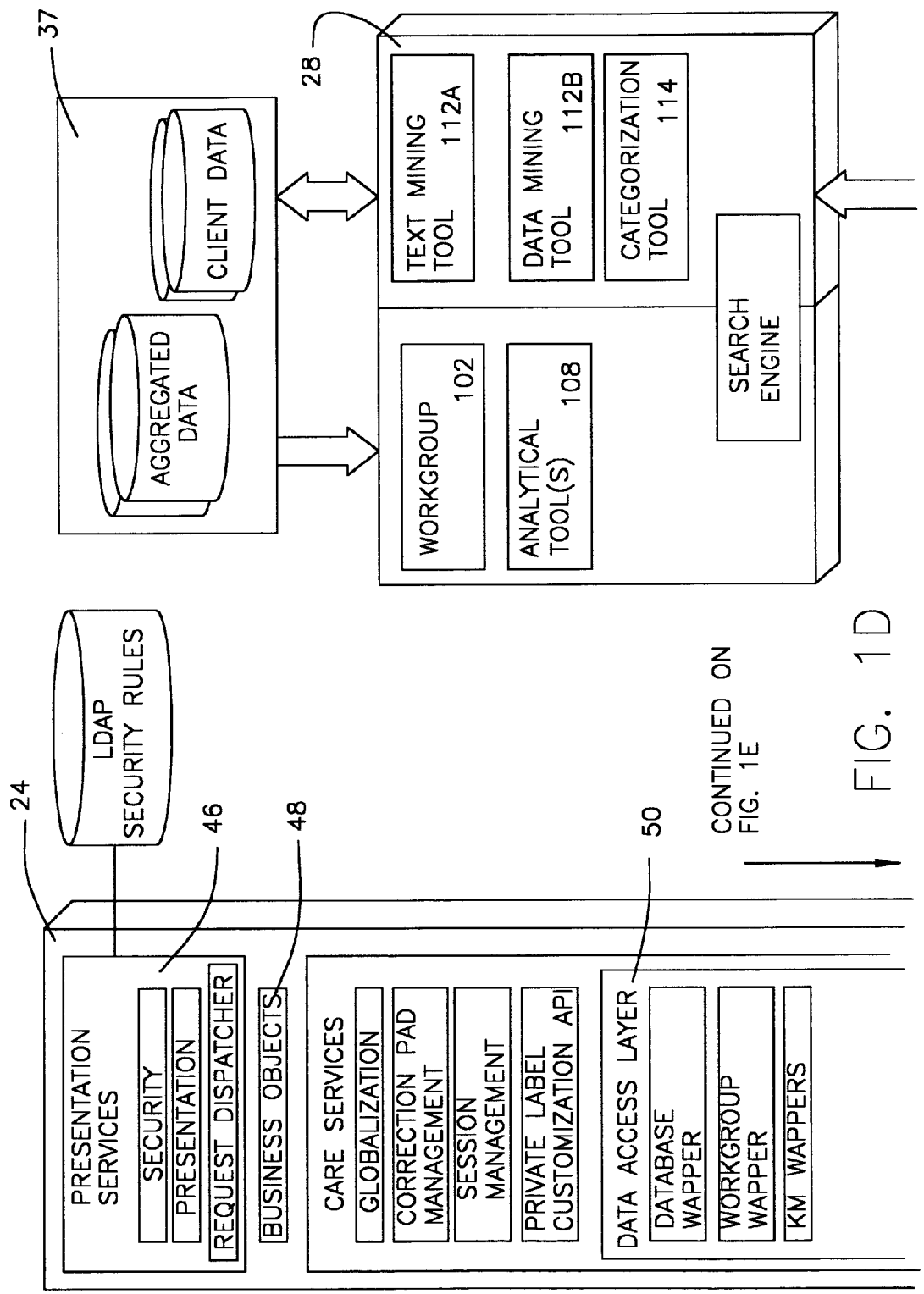
FIG. 1b illustrates a block diagram of various components of a knowledge management module in accordance with one embodiment of the invention.
FIG. 1c illustrates a block diagram of an information management system in accordance with another embodiment of the invention.
Figure 1E:
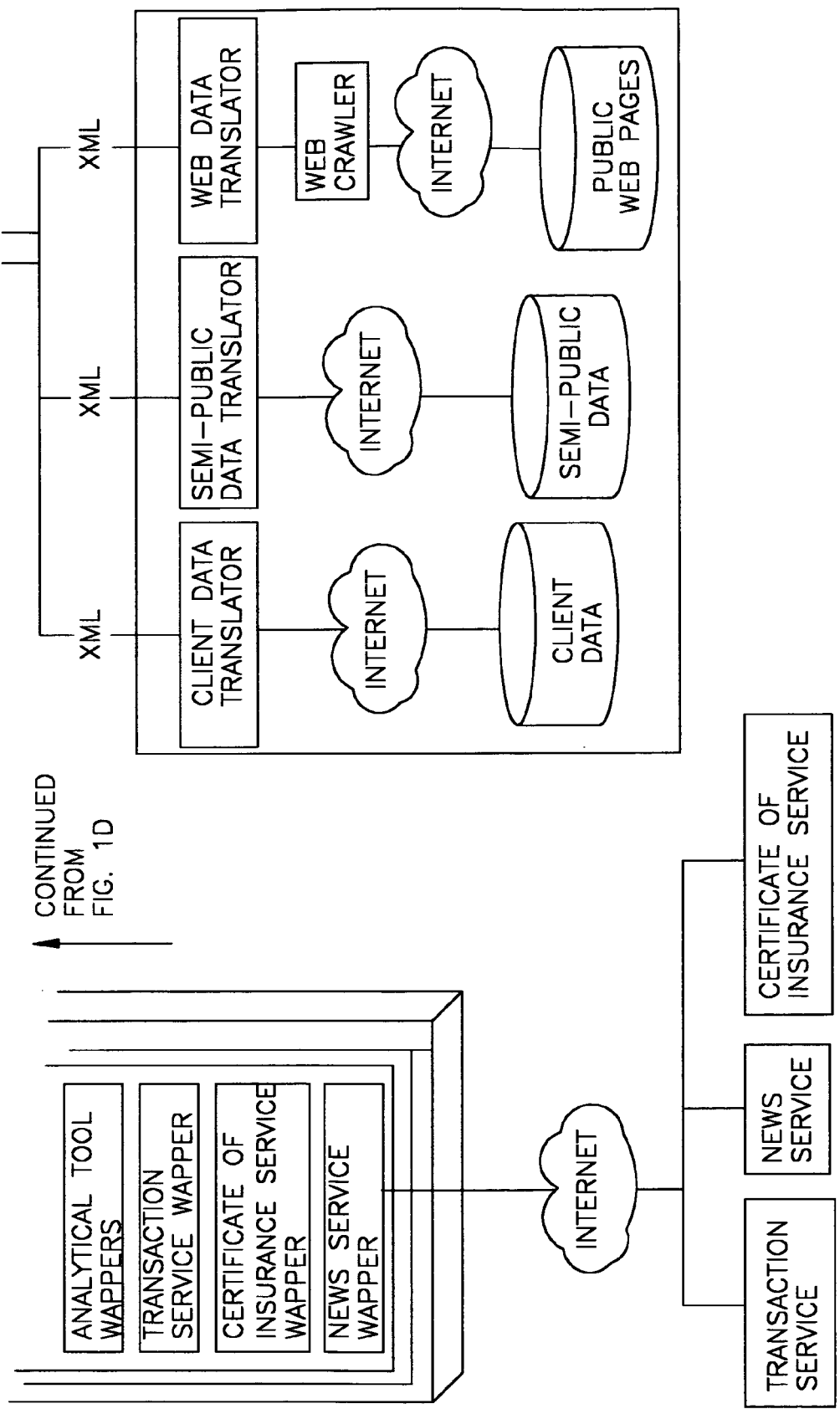

The top section of key practice portion 304, provides three buttons for users to select, such as news button 340, projects button 342 and reference button 344. In response to the selection of the news button, work space administrator 102 retrieves the most recent news form database 37 (FIG. 1). It is noted that in accordance with one embodiment of the invention, the news retrieval function is based on the context, depending on the choice of the search criteria specified by the user as set forth in the search portion 302 of the workspace. Therefore, the news content retrieved may be based on the entire database, or user's profile, or context of a template as described above in reference with FIG. 5a.

In response to the selection of the projects button, workspace administrator 102 displays key practice templates. To this end, key practice portion 304 provides for a choice of various templates, including claims and loss analysis template 420, mergers and acquisitions template 422, renewal of insurance template 424, exposure analysis template 426, insurance administration 428, client research template 430, new product development template 432. For each of these templates, workspace administrator 102 provides a list of actions that a user can follow, similar to a workflow management arrangement.

It is noted that in accordance with another embodiment of the invention, each user is enabled to create a user specific template that defines a desired workflow management, whereby a specific key practice area can be automated.

Figure 7A:
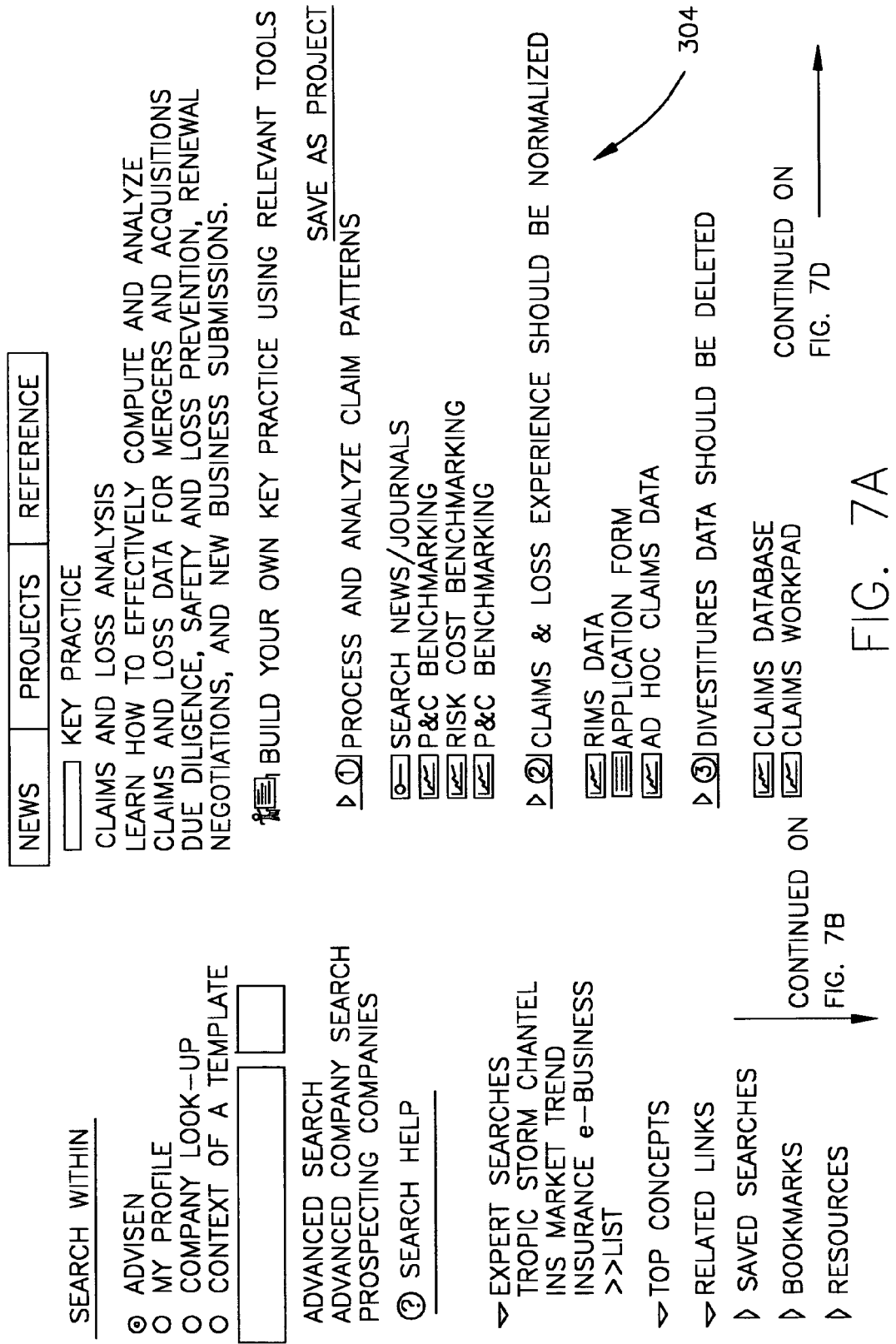

FIGS. 7a and 7b illustrate a workspace and more specifically, a keypractice portion 304, after a user selects claims and loss analysis template in FIG. 5a. As a result, workspace administrator module 102 displays the workflow associated with the claims and loss analysis template. An exemplary workflow as illustrated in FIG. 7a includes the first step of processing and analyzing claim patterns, followed by the step of normalizing claims and loss experiences. The next step includes deleting divestitures data, followed by the step of adding acquisitions data. The next step includes screening out erroneous data from outside entities, followed by compiling claims and loss data from Internet and insurance records. The next step is inclusion of loss data followed by the step of segmenting data by their type. The next step is extending back claims and loss experience up to five years.

FIG. 7b illustrates the remaining steps of establishing a projection module followed by generating summaries of projected costs. The last step refers to loss development factors that permit loss projection of claims.

It is noted that for each of the steps mentioned above, additional sub steps are also defined. Thus, for example, for the first step of processing and analyzing claim patterns, the workflow specifies three steps of searching news and journals, Property and Casualty (P&C) benchmarking, Risk Cost benchmarking. The benchmarking functionalities are provided by analytical module 108 as explained before.

It is further noted that as a user navigates throughout this workflow illustrated in key practice portion, the contextualization module explained above, modifies predefined searches available in the search portion 302.

Figure 8A:
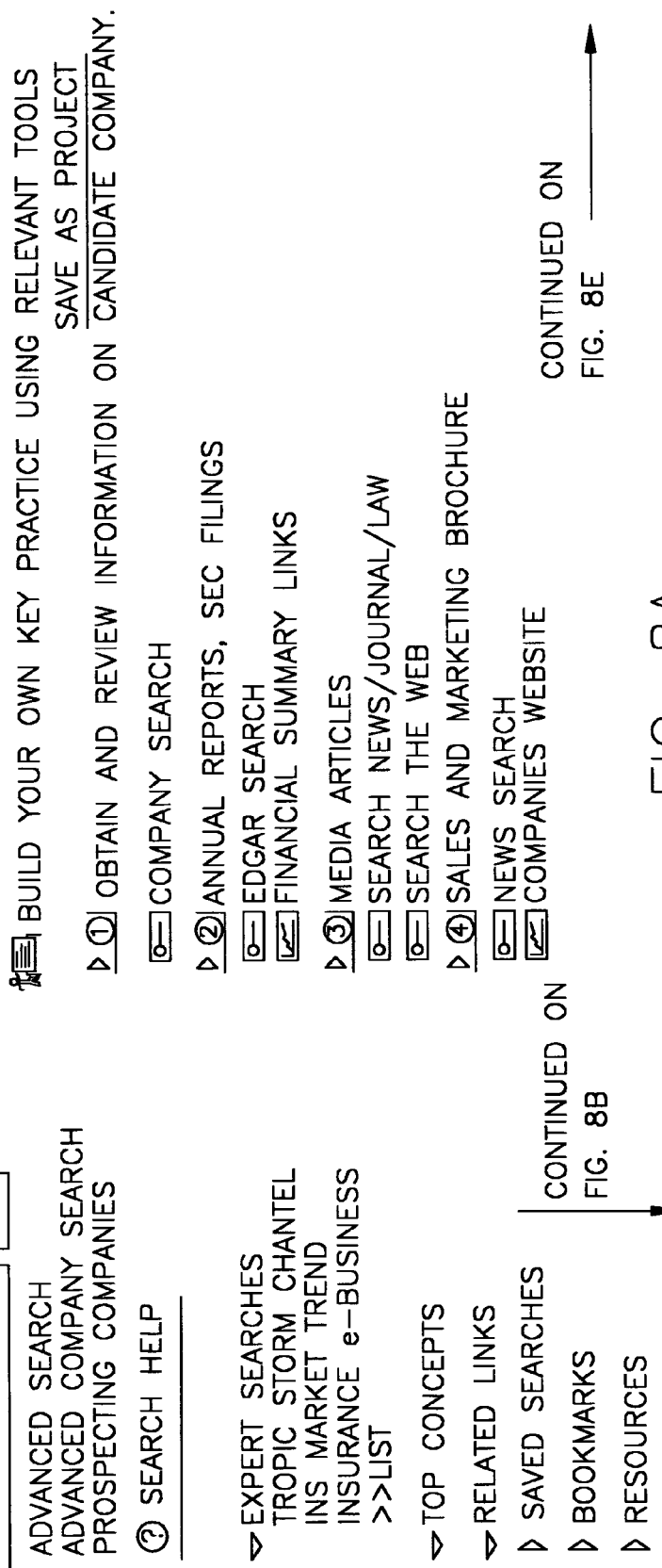
FIGS. 8a and 8b illustrate the steps in the workflow provided in response to a user selecting a mergers and acquisitions template, in accordance with one embodiment of the present invention.
Figure 8B:
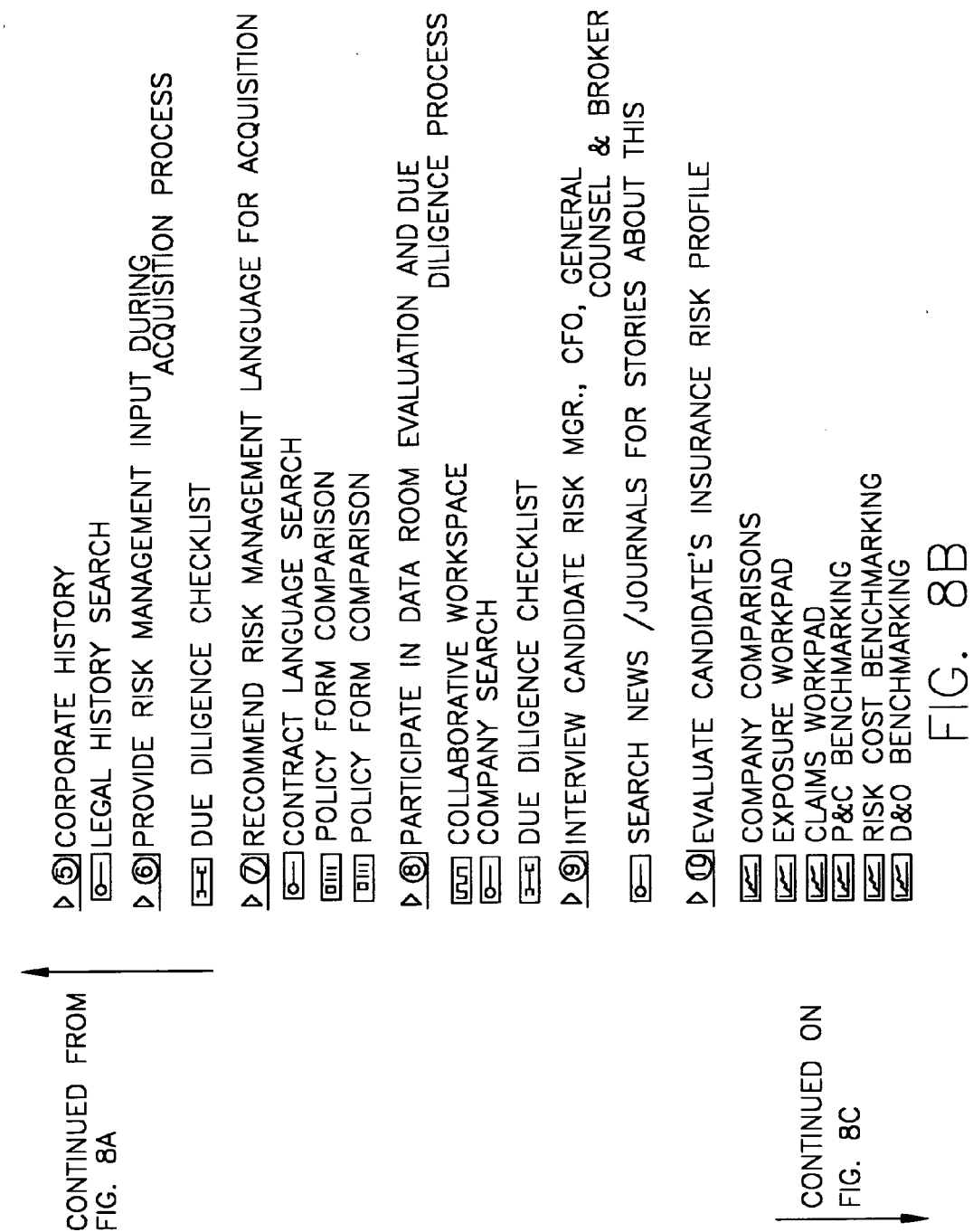
Figure 8C:
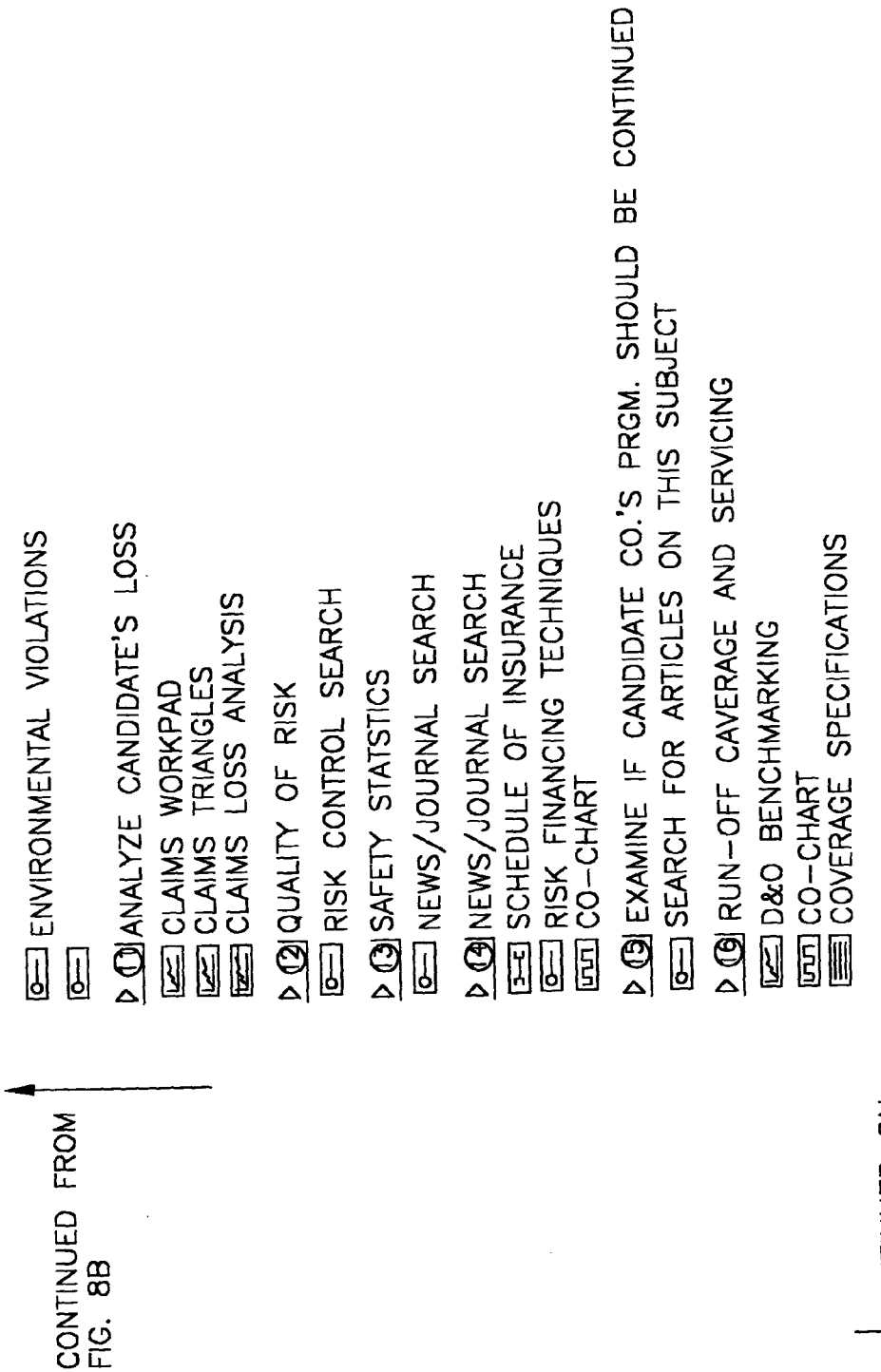
Figure 8F:
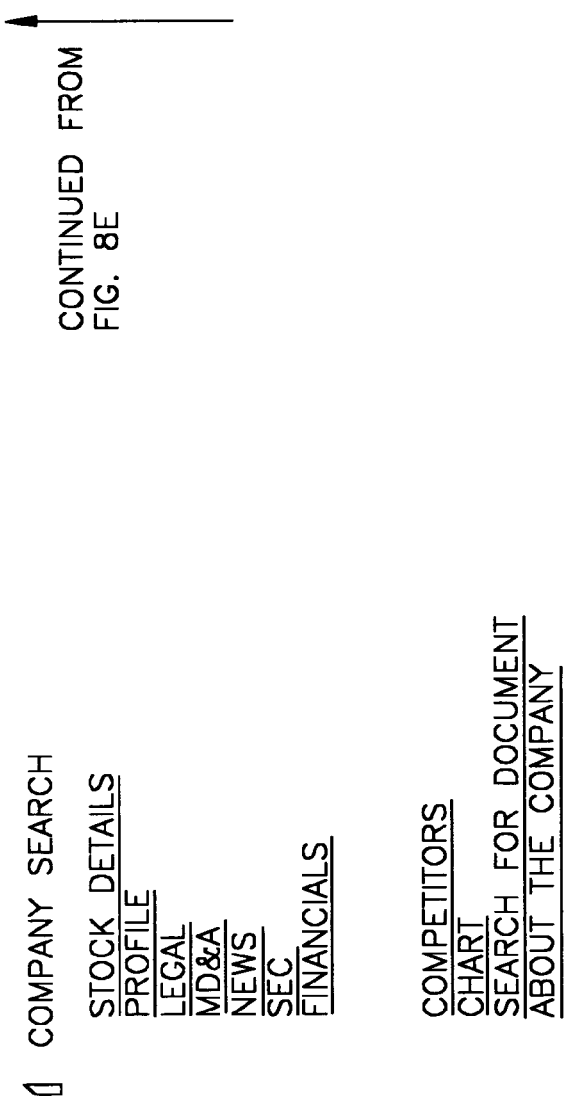

FIGS. 8a and 8b illustrate a workspace and more specifically, a keypractice portion 304, after a user selects mergers and acquisitions template in FIG. 5a. As a result, workspace administrator module 102 displays the workflow associated with the mergers and acquisitions analysis template. An exemplary workflow as illustrated in FIG. 8a includes the first step of obtaining and reviewing information on a candidate company. A sub step corresponding to this step may be the step of performing company research in accordance with one embodiment of the invention.

The first step is followed by the step of obtaining annual reports and SEC filings corresponding to the candidate company, followed by the step of obtaining media articles. The next step includes reviewing sales and marketing brochures, followed by the step of obtaining corporate history. A corresponding sub step here includes obtaining candidate's legal history information.

The next step includes providing risk management input during acquisition process, with a corresponding sub step of completing a due diligence checklist. The next step includes recommending risk management language for acquisition contract. In accordance with one embodiment of the invention this step includes the steps of enabling the user to conduct contract language search and policy form comparisons. To this end, database module 37 (FIG. 1b) stores a plurality of contracts corresponding to various issues that may arise during the user's research employing system 28. Workspace administrator 102 provides access to these contracts, based on for example, contract topics, or contract issues represented in various clauses of the contract. Thus, a user is enabled to review a plurality of clauses of prior contracts that have dealt with a particular topic, in order to research the proper language for crafting a new contract.

The next step in the acquisition and mergers workflow includes participating in data room evaluation and due diligence process. In response, workspace administrator 102 allows various users to collaborate over various documents involved in the project to track the progress of the project and to participate in the most coherent fashion.

The next step includes prompting the user to interview candidate CFO, general counsel and the broker to obtain relevant information. The step is followed by the step of evaluating the candidate's insurance risk profile. This step includes sub steps that employ analytical tools provided by analytical module 108 (FIG. 1b).

FIG. 8b illustrates the remaining steps in the workflow provided in work space 304 in response to a user selecting a mergers and acquisitions template, in accordance with one embodiment of the present invention. The next step includes analyzing the candidate company's losses. Again, this step includes sub steps that enable the user to employ analytical tools to assess the candidate company's insurance losses.

The following steps include analyzing the quality of risk of the candidate company, followed by analyzing the safety statistics and conducting news and journals searches. The workflow then prompts the user to determine whether the candidate company's program should be continued. The next step includes determining run-off coverages and servicing followed by the step of analyzing special exposures and coverages. The workflow then prompts the user to review claims made policies and determine the need for transitional coverages. Furthermore, the workflow prompts the user to acquire binders for coverage after acquisition.

Figure 9A:
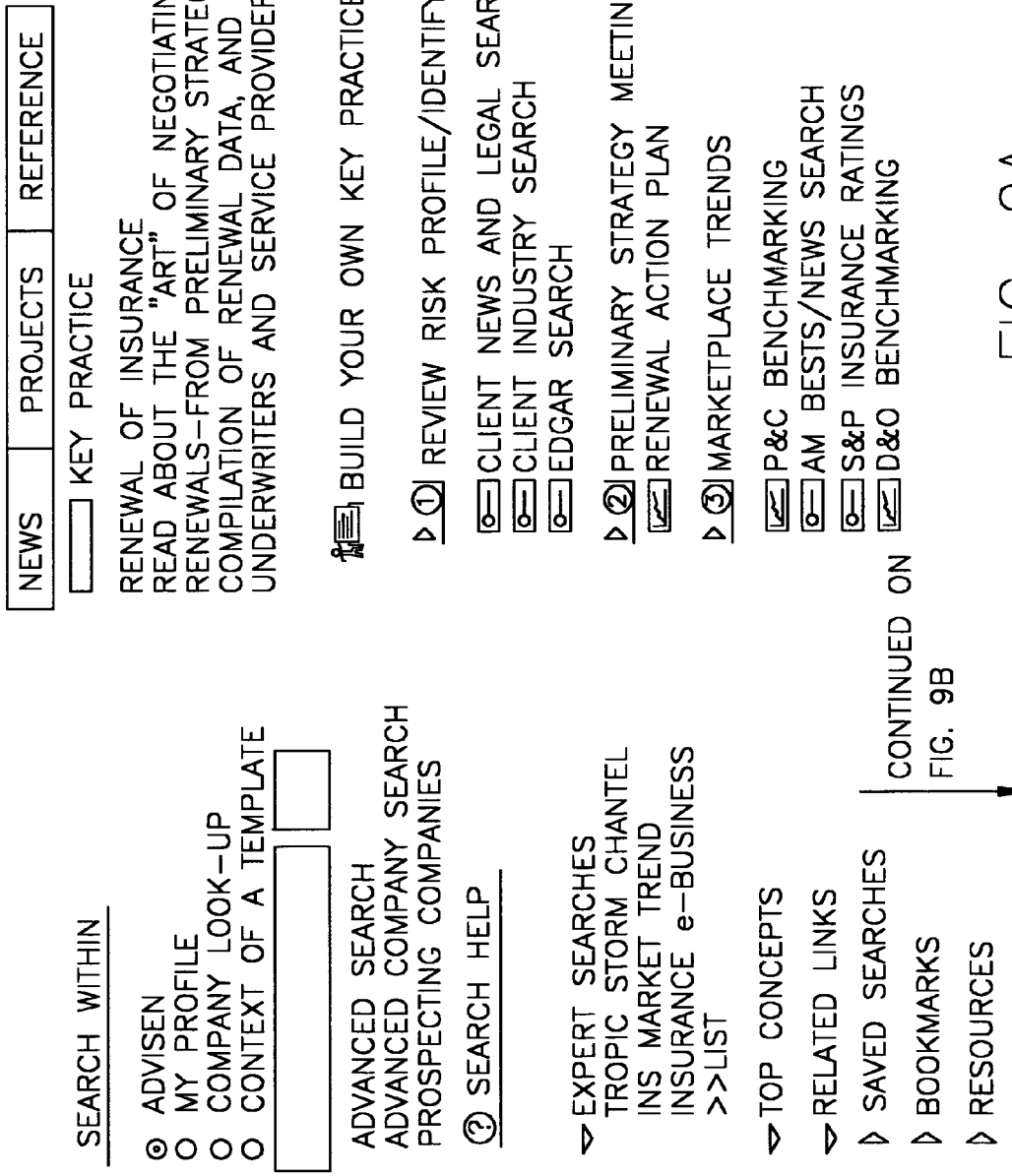

FIGS. 9a and 9b illustrate a workspace and more specifically, a keypractice portion 304, after a user selects renewal of insurance template in FIG. 5a. As a result, workspace administrator module 102 displays the workflow associated with the renewal of insurance template. This workflow enables the user to carry insurance negotiations in a methodical fashion, from preliminary strategy through binding, including compilation of renewal data, and interaction with underwriters and service providers.

An exemplary workflow as illustrated in FIG. 9a includes the first step of reviewing risk profile and identifying and evaluating new risks. This step includes the sub steps of obtaining client news and legal research. To this end, database 37 provides documents that contain recent case law and legal commentaries based on the categories related to the client's specifications as stored in taxonomy module 114. The next sub step includes conducting a client industry research, to identify risk trends developing in the client's industry. Again, database 37 provides relevant documents as specified by taxonomy module 114.

The next step includes meetings with brokers and/or agents followed by the step of conducting marketplace trend analysis. This step provides sub steps for conducting analytical functions such as property and casualty (P&C) benchmarking, A.M. Bests/News Search, S&P Insurance ratings and directors and officers (D&O) benchmarking.

The next step includes compiling and updating and screening underwriting data, which includes the sub steps of conducting the application process, performing risk mapping and risk accounting functions. This step is followed by the step of projecting future losses and conducting catastrophe loss analysis, including the sub step of performing a severity Monte Carlo simulation as provided by analytical module 108 (FIG. 1b).

The next step includes performing loss control and safety program analysis, by obtaining safety administration reports, engineering reports and news searching, followed by the step of developing coverage specifications and issuing requests for proposals. Some of the remaining steps included in the workflow comprise the sub steps of employing league tables, followed by the step of compiling TPA specifications, screening insurers, reinsurers/TPAs, and obtaining pricing and terms. These steps may be followed by the steps of generating a risk philosophy report, followed by analyzing financial ratings of various companies that plan to provide the underwriting, followed by analyzing their reputations. The next step includes negotiations workflow, followed by coverage and financial considerations followed by specifying terms of relationship.

Figure 10A:
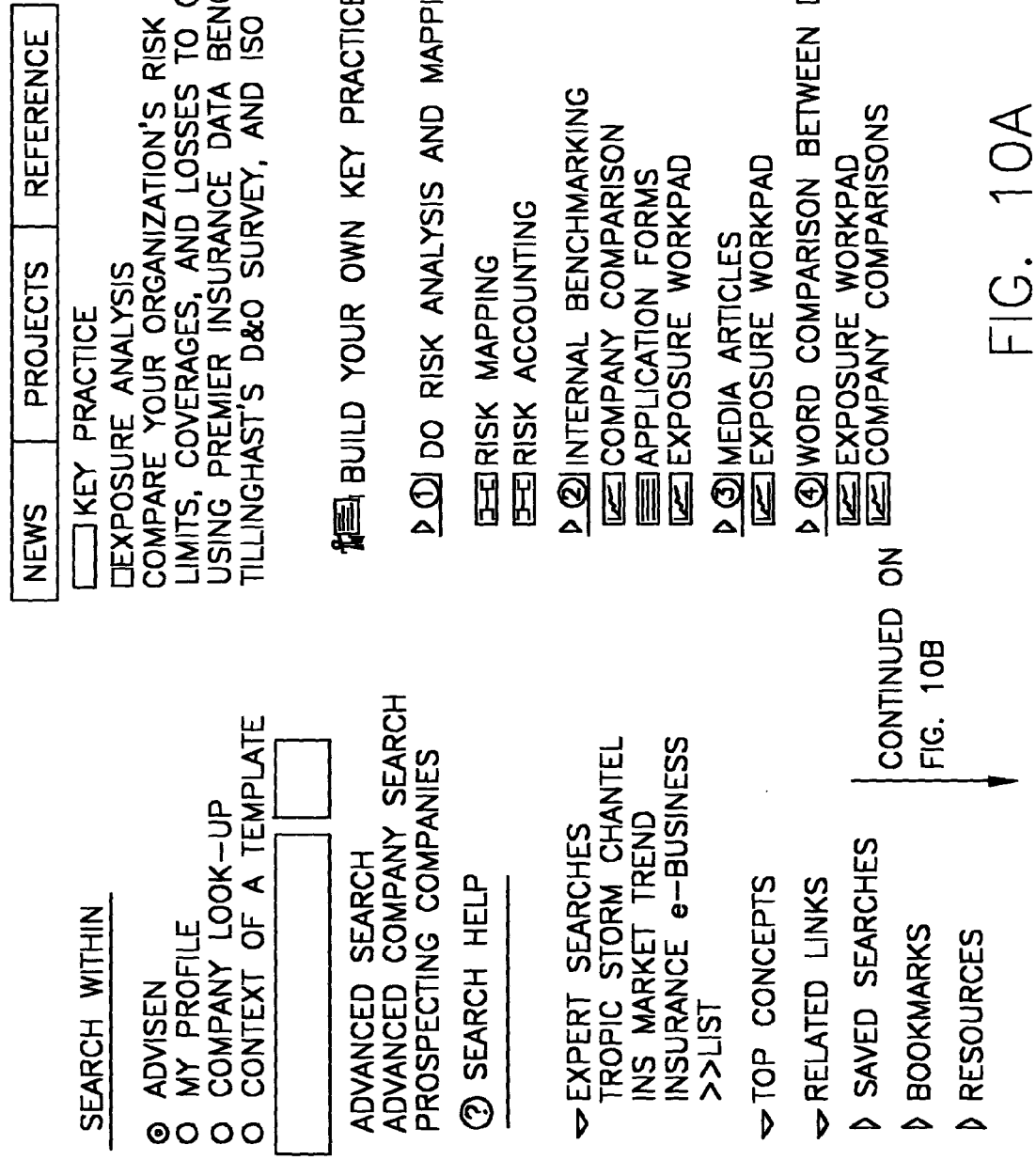
FIGS. 10a and 10b illustrate a workspace and more specifically, a key practice portion 304, after a user selects exposure analysis template in FIG. 5a, in accordance with one embodiment of the invention.
Figure 10B:
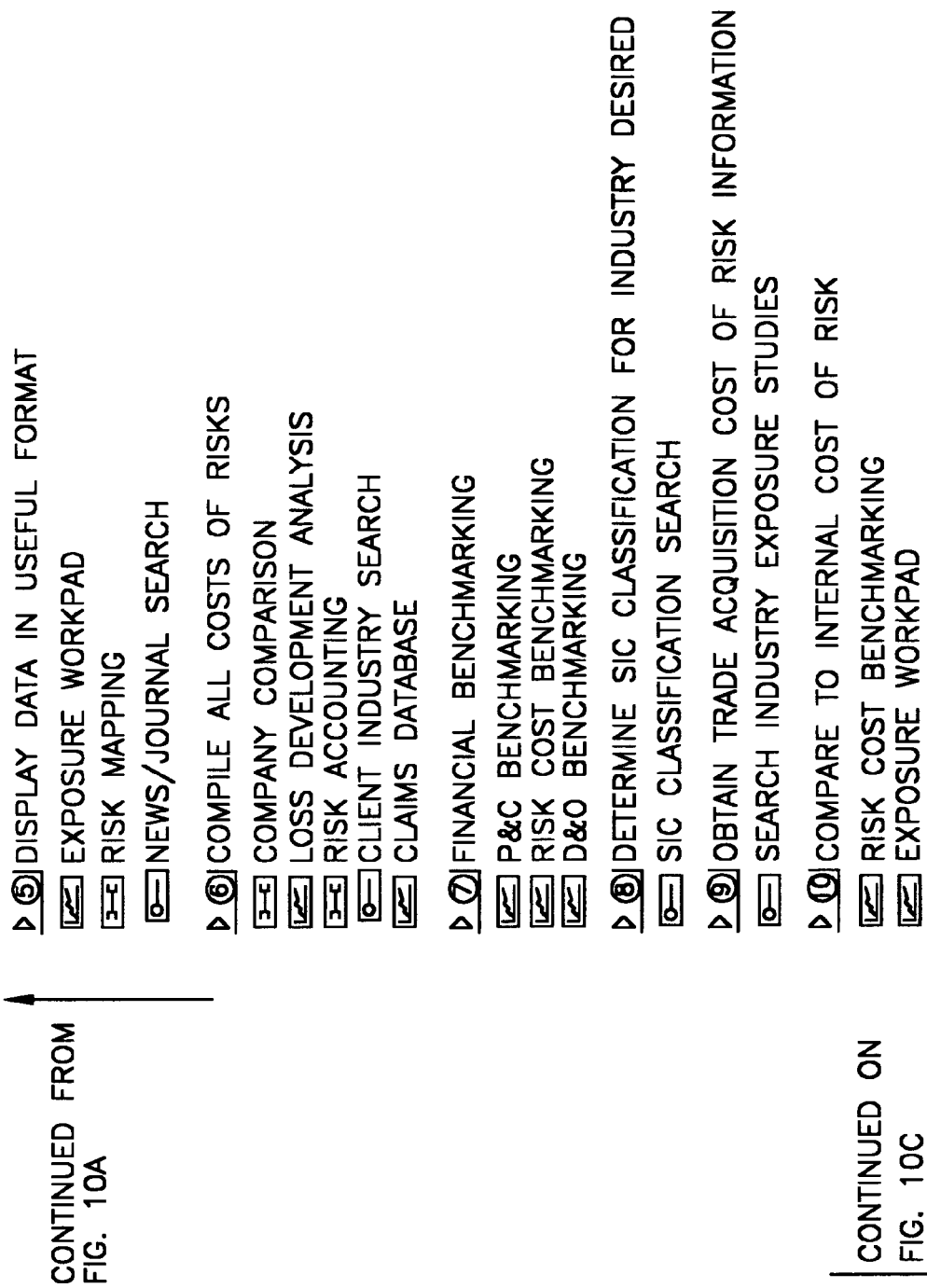
Figure 10C:
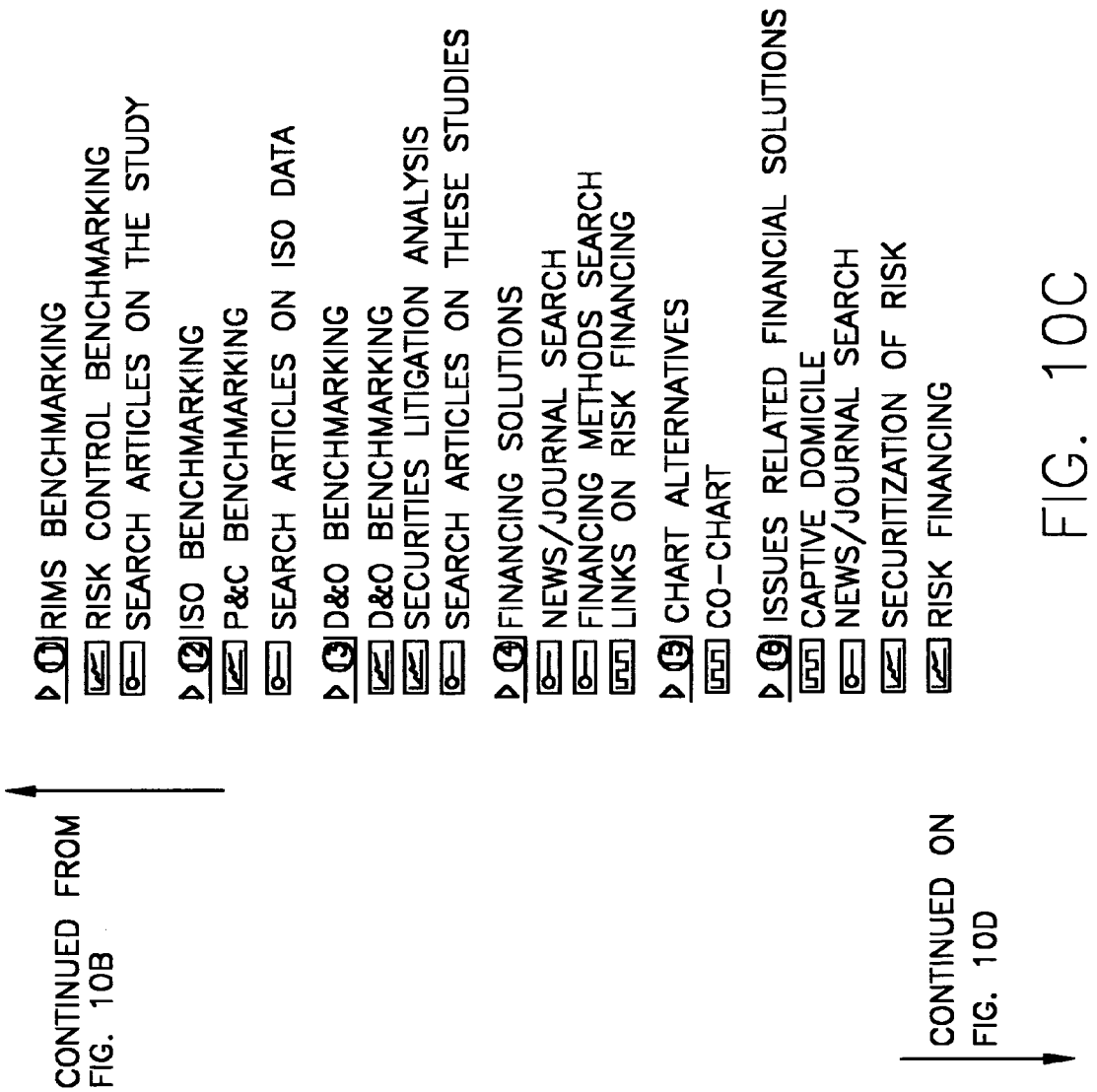

FIGS. 10a and 10b illustrate a workspace and more specifically, a keypractice portion 304, after a user selects exposure analysis template in FIG. 5a. As a result, workspace administrator module 102 displays the workflow associated with the exposure analysis template. This workflow enables the user to compare its organizational risk management costs, policy limits, coverages and losses to others in the industry using insurance data benchmarks from various sources, such as RIMS, Tillinghast's D&O survey, and ISO statistics.

The steps provided in the exposure analysis template include risk analysis and mapping followed by internal benchmarking, followed by identifying and separating internal divisions of the organization. These steps are followed by the steps of compiling costs of risk and conducting and external benchmarking. These steps are followed by the steps of determining SIC classifications for the desired industry, obtaining trade association costs of risk information, comparing to internal cost of risk, RIMS benchmarking, ISO benchmarking, D&O benchmarking, displaying results in charts, obtaining various financial solutions for financing the risk, and identifying suppliers of insurance for alternative solutions.

Figure 11A:
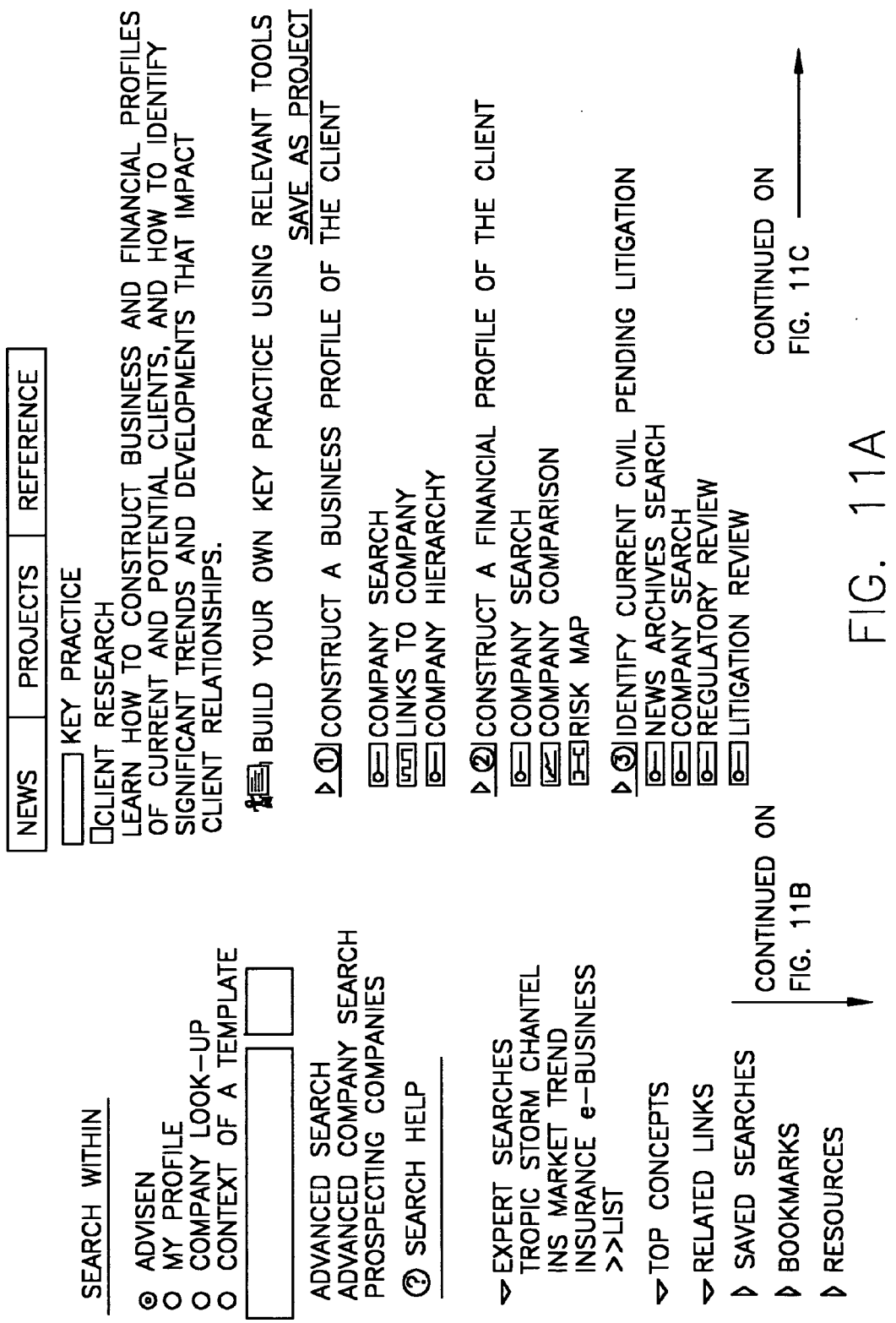
FIG. 11 illustrates a workspace and more specifically, a key practice portion 304, after a user selects client research template in FIG. 5a in accordance with one embodiment of the invention.

FIG. 11 illustrates a workspace and more specifically, a keypractice portion 304, after a user selects client research template in FIG. 5a. As a result, workspace administrator module 102 displays the workflow associated with the client research template. This workflow enables the user to learn how to construct business and financial profiles of current and potential clients, and how to identify significant trends and developments that impact client relationships. The steps included in this workflow include constructing profiles of the client with sub steps of conducting company research, obtaining links to the company and obtaining company hierarchy. This step is followed by the step of constructing a financial profile of the client, and identifying current and prior litigation, so as to asses the company's exposure to various risks, followed by the step of identifying significant trends and developments relating to that company.

Figure 12A:
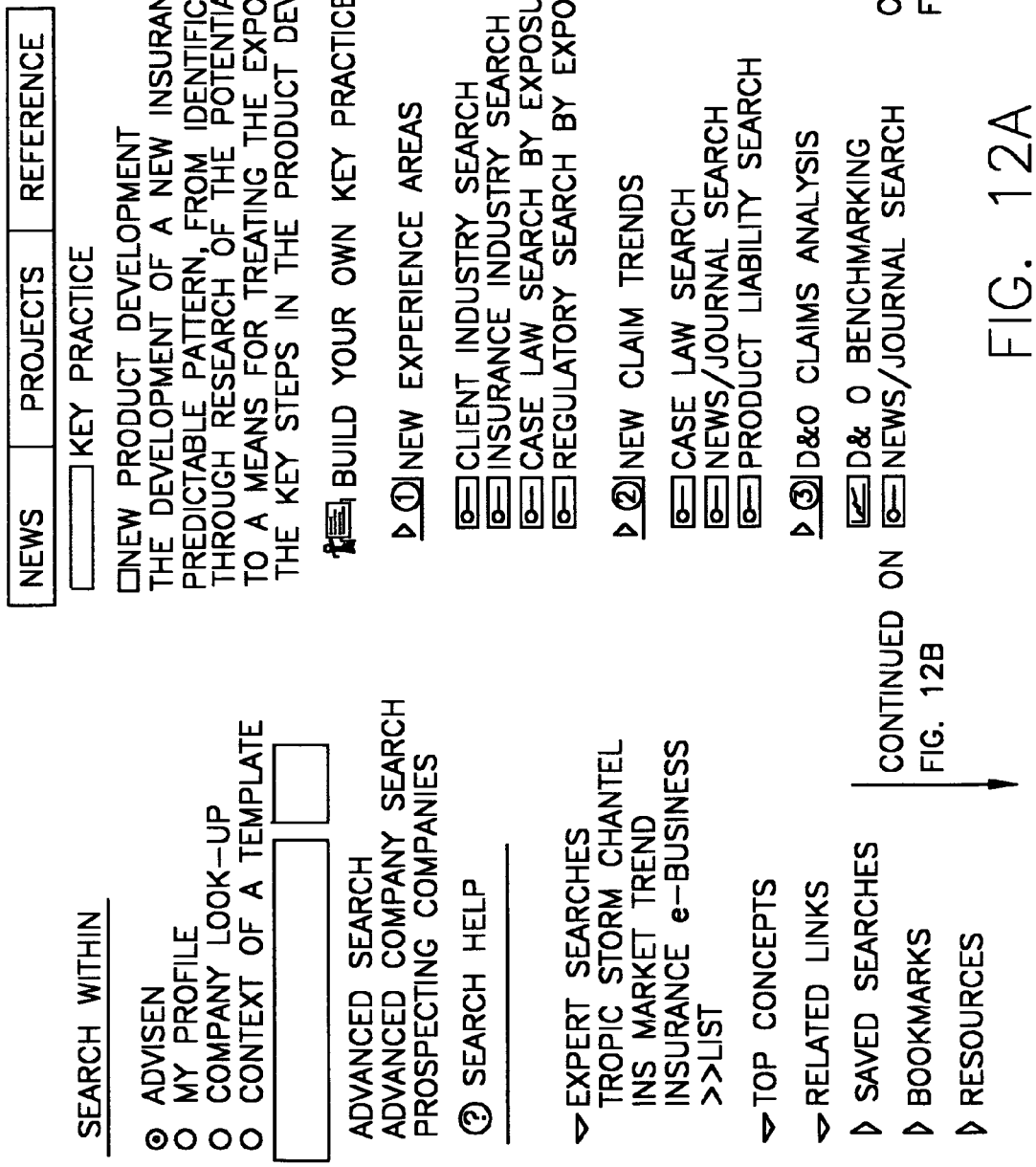
FIG. 12 illustrates a workspace and more specifically, a key practice portion 304, after a user selects new product development template in FIG. 5a, in accordance with one embodiment of the invention.

FIG. 12 illustrates a workspace and more specifically, a key practice portion 304, after a user selects new product development template in FIG. 5a. As a result, workspace administrator module 102 displays the workflow associated with the new product development template. This workflow enables the user to identify the pattern for developing a new insurance product, from identification of the new exposure through research of the potential market, and finally to a means for treating the exposure.

The steps illustrated in the workflow of FIG. 12 includes the step of identifying new exposure and loss by employing the sub steps of conducting client industry searches, insurance industry searches, case law searches by exposure and regulatory searches by exposure. This step is followed by researching new claim trends, D&O claims analysis, risk research in news and journals, client industry information for rating, identification of likely clients and size of the market, identifying insurance industry likely candidates, listing of potential experts, and determining financial solutions to provide the risk mitigation products.

Figure 13A:
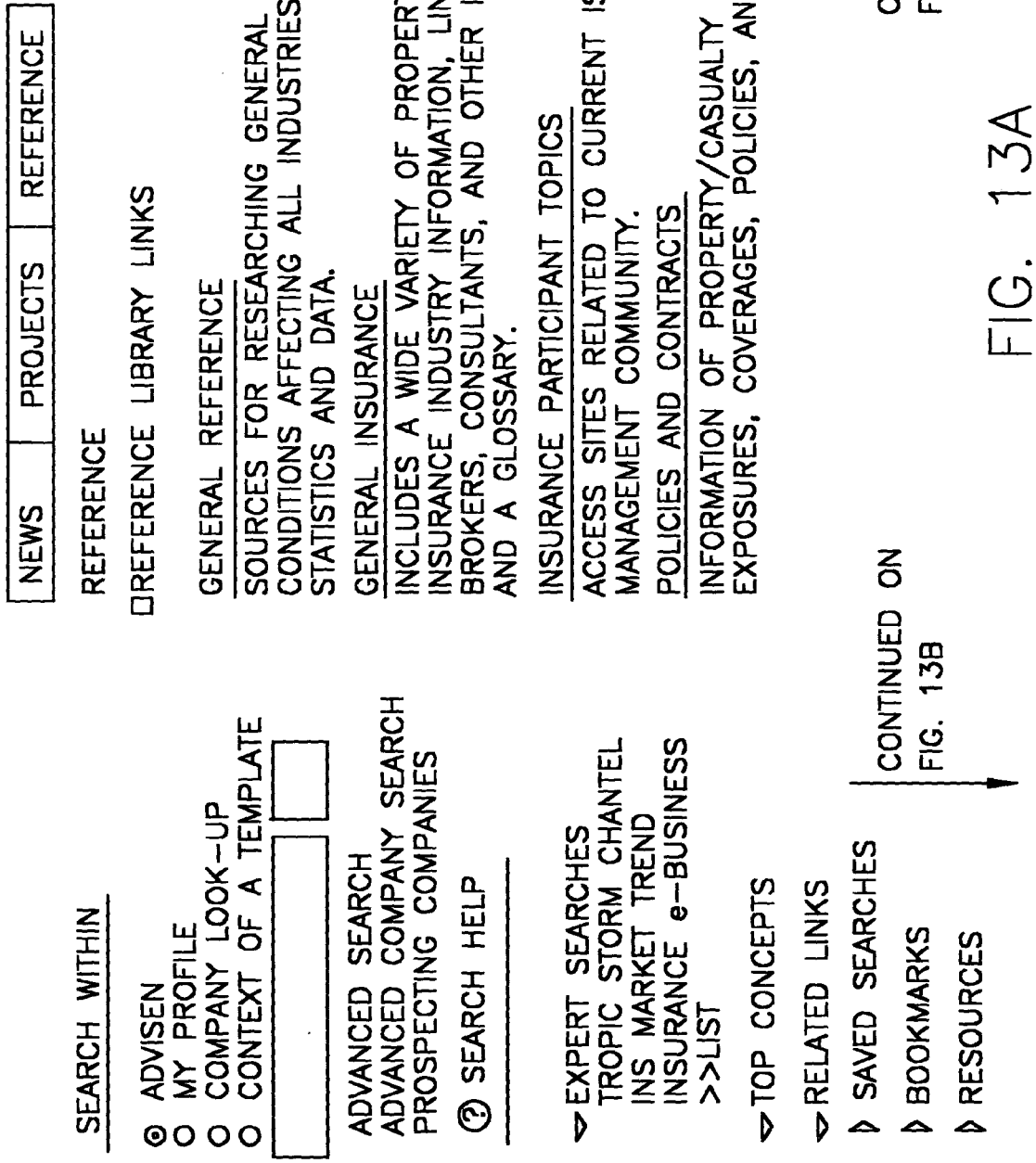
FIG. 13 illustrates a workspace and more specifically, a key practice portion 304, after a user selects the reference button of FIG. 5a, in accordance with one embodiment of the invention.

FIG. 13 illustrates a workspace and more specifically, a key practice portion 304, after a user selects the reference button of FIG. 5a. In response, workspace administrator module 102 displays a list of all references contained in or tracked by database 37. This enables the user to access various references in a centralized format.

It is noted that the key practice portions described in the preceding figs are for illustrative purposes only, and the invention is not limited in scope in that respect. Knowledge management system 28 can be configured in accordance to other embodiments of the invention so as to generate and display other key practice templates relating to other desired workflows. This can be handled either by the user itself or by a system administrator who plans to distribute the system to other users.

Figure 14:
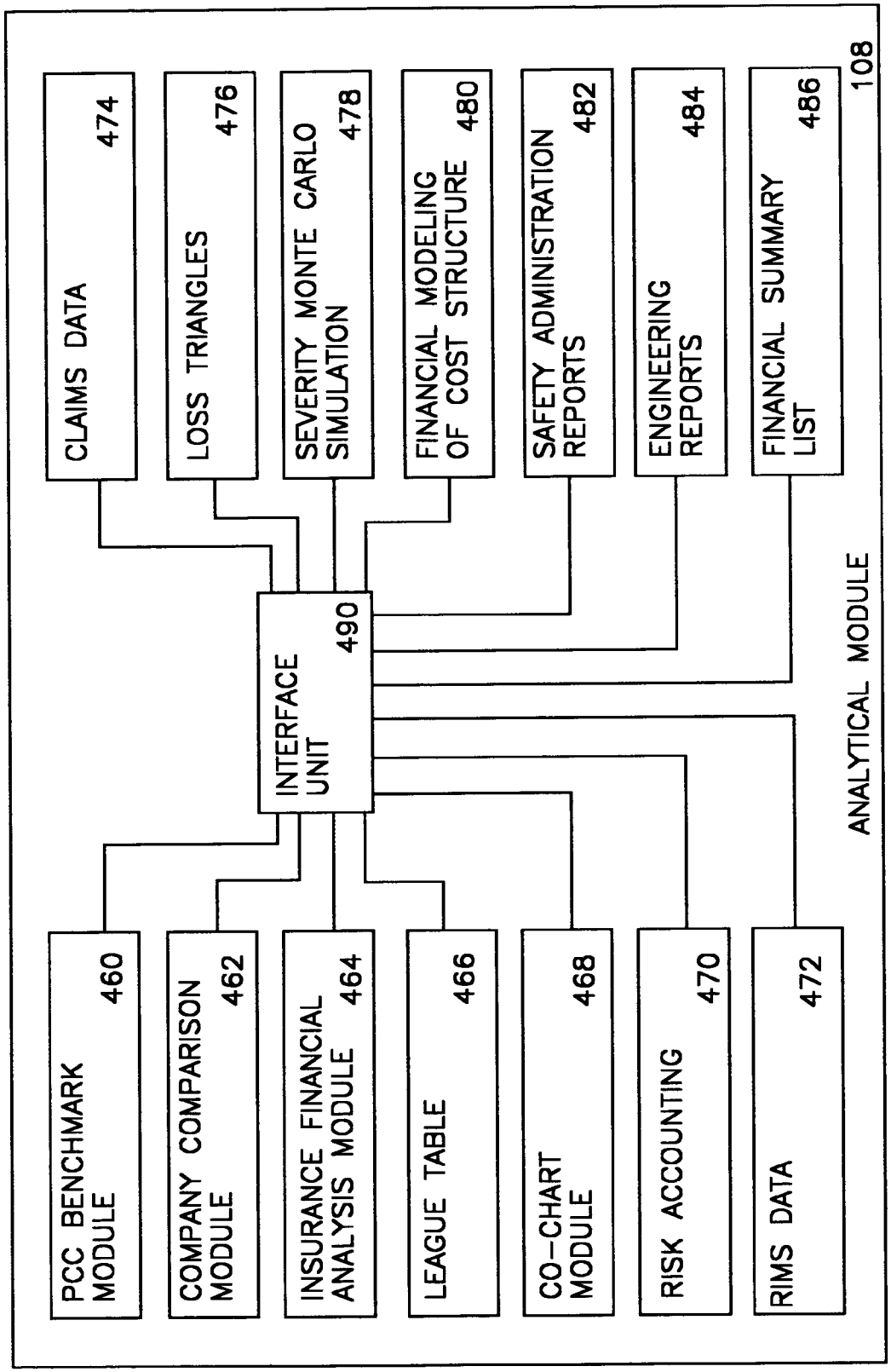
FIG. 14 is a block diagram of various components of an analytical module in accordance with one embodiment of the invention.

Referring now to FIG. 14, a block diagram of analytical module 108 is described in more detail. Analytical module 108 includes analytical tools that can be employed by the users when conducting research or performing the workflows specified in key practice portions 304. To this end, analytical module 108 includes an interface unit 490 that is configured to receive data from various tool modules within module 108 and provide that data to workspace administrator 102 (FIG. 1) for display to the user. Analytical module 108 includes an P&C benchmarking module 460, which is configured to perform property and casualty (P&C) benchmarking as understood by those skilled in the art.

It is noted that benchmarking as it is generally understood in the insurance industry refers to comparisons between a company being analyzed and the industry wide average premiums being paid by those other companies in the same industry.

Figure 15A:
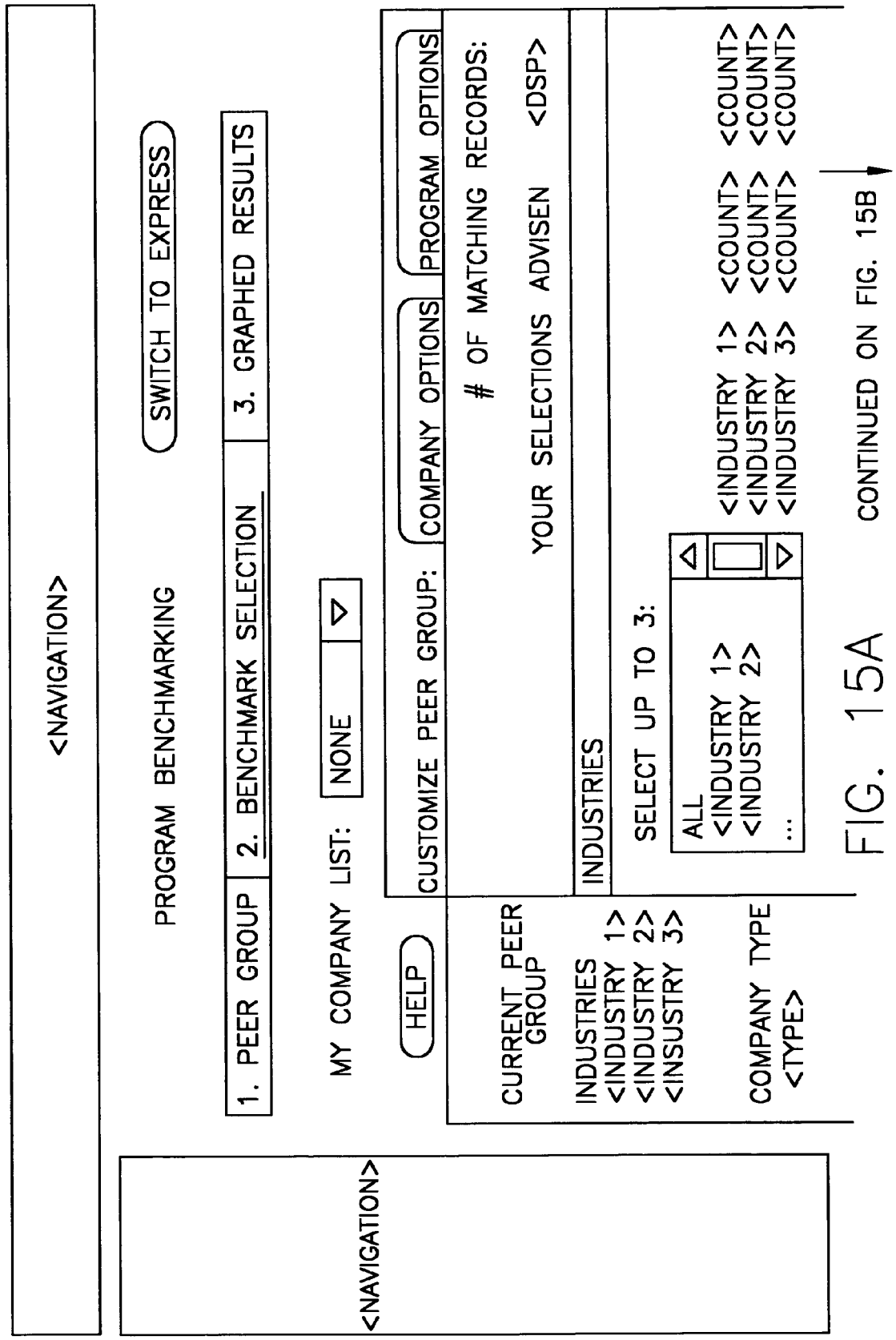
FIG. 15 is a wireframe for a peer group benchmarking entry as managed by a property and casualty benchmarking module, in accordance with one embodiment of the present invention.
Figure 15C:
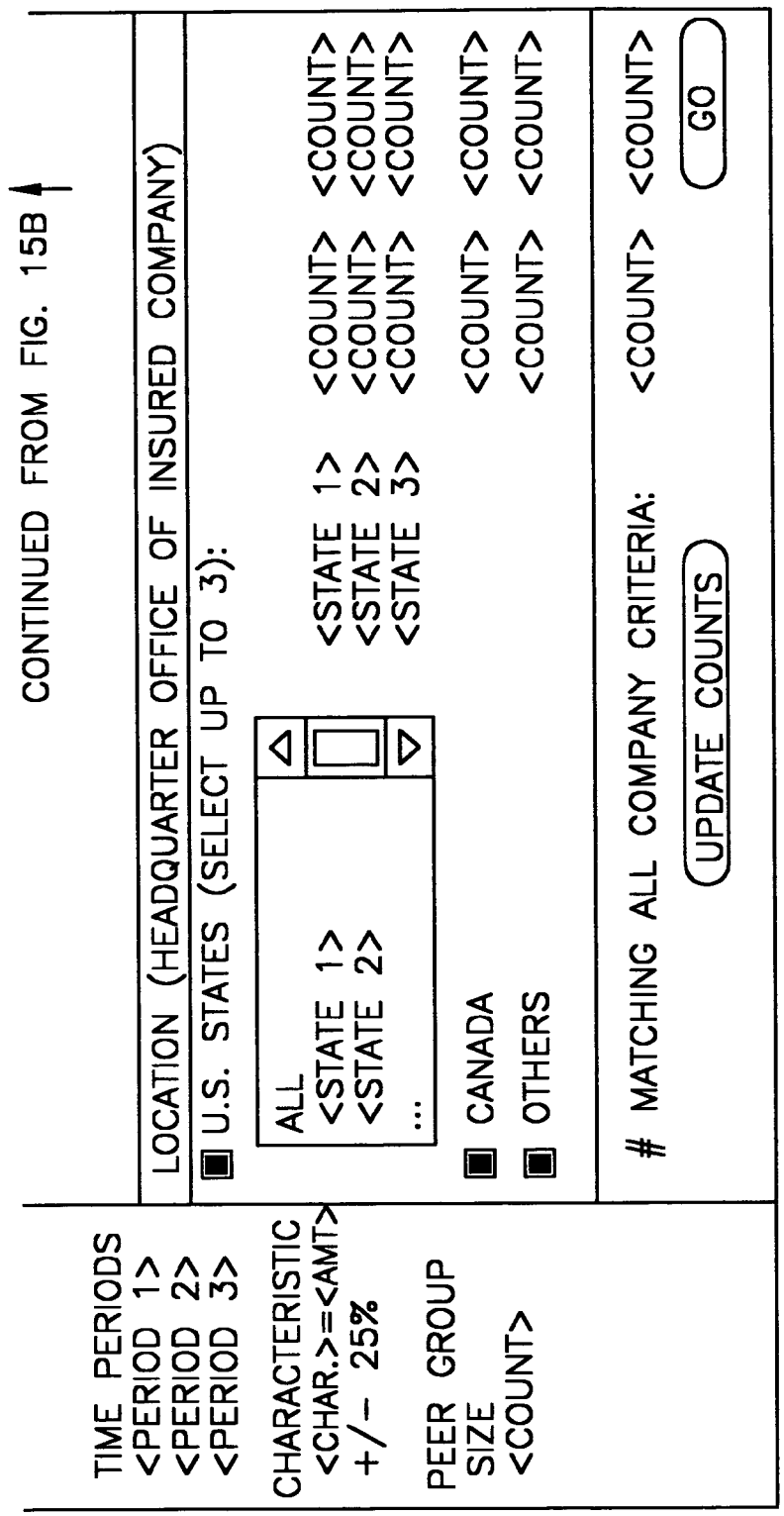

As illustrated in wireframe FIG. 15, a user first selects the peer group selection section and then selects the company upon which to perform the benchmarking analysis. For example, a broker, working with a number of clients may represent a number of different companies. Peer group selection wireframe 15 allows the user to select the company to be analyzed.

It is understood that the option "none" may chosen. In such an instance, rather than compare the aggregated data against a known client company, the resulting data will simply produce an abstract benchmark for the industry according to the below selected criteria.

When performing a benchmarking analysis, the data set to be compared against is preferably drawn from similarly situated companies. For example, the data set is preferably drawn from companies of the same size, in the same location, in the same industry. Furthermore, the data set must be drawn from data on the proper coverage type and further may be tailored to the particular lines of business. This data set is referred to as a peer group and is used as the basis for the benchmarking analysis.

The first operation in setting the peer group is to select the industry to be compared to. In basic situations, the user simply sets the industry selection to the industry of the selected company, or if no company is selected, the industry to be reviewed.

In one embodiment of the present invention, as shown in wireframe 15, the present invention allows the user to set the peer group select from a number of different industries. A number of companies now operate within several areas, deriving revenue from a number of sources that are typically identified as being within different industries. As such, benchmarking against a single industry field may not produce the most useful or even accurate results. In accordance with one embodiment of the present invention, benchmarking module 460 of the present invention allows a user to produce a benchmarking analysis against multiple industries simultaneously.

For example, if the selected company determines that they derive a substantial portion of revenue from manufacturing, but also from banking and real estate transactions, the user can select to benchmark their company against all three industries, so that the peer group data set used for the benchmarking is derived from all three industries, rather than from any one of the three separately. A peergroup wireframe produced by benchmarking module 460, illustrated in FIG. 15, illustrates the user's ability to indicate the benchmarking to be performed against multiple industries.

Furthermore, benchmarking module 460 may preferably facilitate the ability for a user to benchmark not only against multiple industry data but also to select percentages, assigned to each of the industries according to particulars of the user's company. For example, using the above company which derives revenue from manufacturing, banking and real estate transactions, the user may further indicate that the revenue split is 70% manufacturing, 10% banking and 20% real estate. In such an instance, a user using benchmarking module 460 would be allowed to benchmark the premiums against data weighted from all three industries, where the data used for the premium benchmarking is further weighted to corresponding percentages.

After the industries to be compared to are selected, the user selects whether the peer group data set to be benchmarked against is to be derived from public sources only, private sources only or all data sources. After selecting, as illustrated in peergroup wireframe illustrated in FIG. 15, the user then enters which financial metric dimensions are to be used in the benchmarking search. Examples of such metrics dimensions include but are not limited to revenues (default), market cap, assets, employees, net worth, profits or deposits.

These metrics dimensions allow the peer group data set, used to by benchmarking module 460 to be limited not only to the same industry(s) as the companying being analyzed but also allows the data set to be drawn from other companies in the industry fields that are in the same size range with respect to the above selected criteria. These financial metrics dimensions can be set according to predefined sizes/ranges or they can be set manually by the user.

Once the peer group data set for comparison selections are made according to the above description, the counts entry on the peergroup wireframe, show in FIG. 15, indicates the number of companies in the peer group data set that match the above selected criteria and from which the data set will be drawn. A current peer group panel shows all of the selected and calculated information on the left side of the peergroup wireframe for easy review.

Figure 16A:
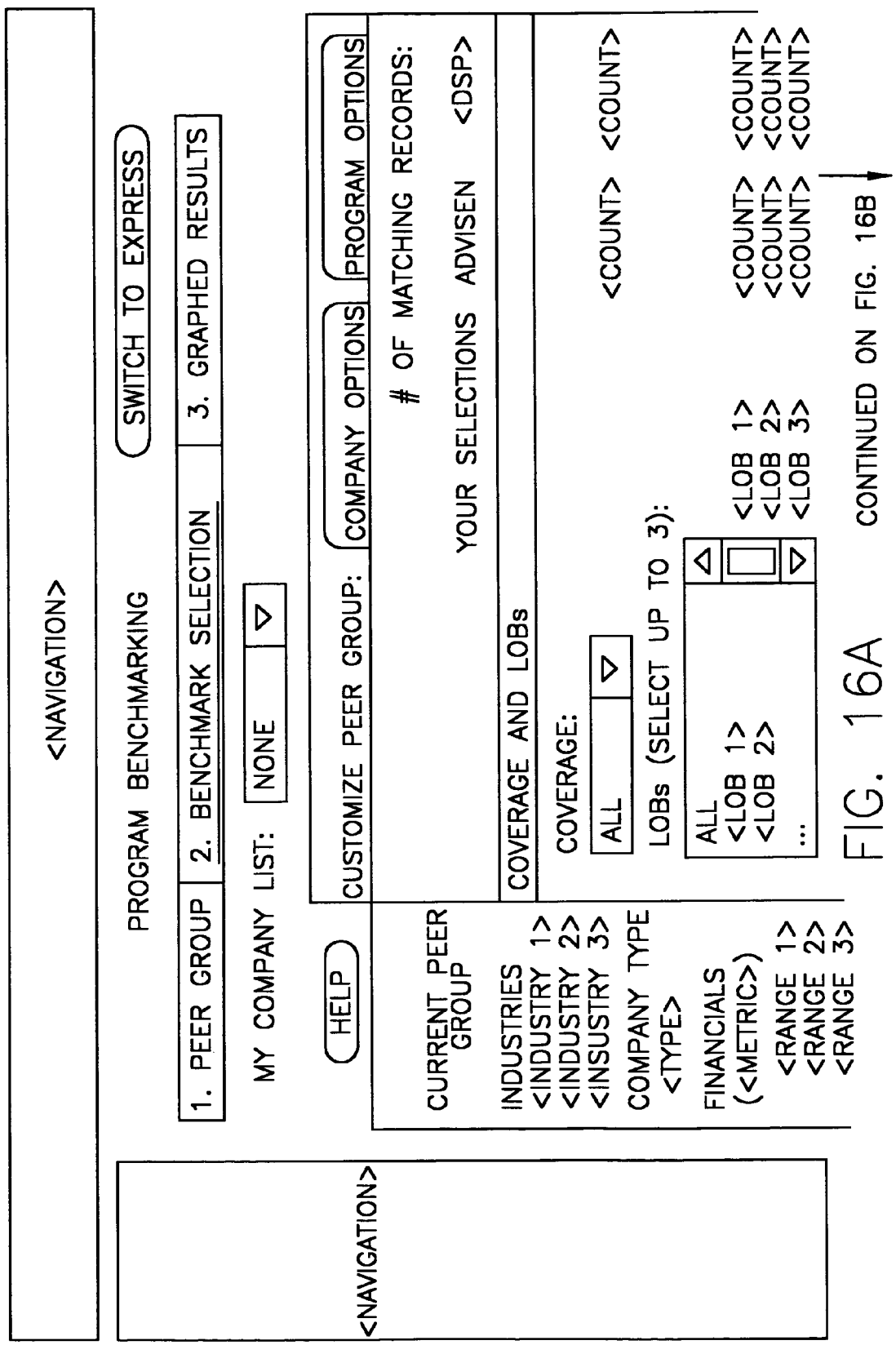
FIG. 16 is another wireframe for a peer group benchmarking entry as managed by a property and casualty benchmarking module, in accordance with one embodiment of the present invention.

Once the peergroup wireframe, illustrated in FIG. 15, is complete, the user selects to progress to the next peergroup wireframe, shown in FIG. 16, in order to select the program criteria for benchmarking module 460. Here the user is prompted with more detailed record of the count of records that match the selected criteria and that will be used as the basis for the data set in the benchmarking process.

The user first is prompted to select the type of coverage to be compared, such as premiums (insurance premium costs), limits (casualty limits) revenue, and retention (The net amount of risk retained by an insurance company for its own account or that of specified others.)

After selecting the type of coverage, held by the members of the peer group to be compared to, the user may also select which Lines of Business (LOBs) that will be used in the benchmark analysis, either all of the selected lines of business or only some of the LOBs. By selecting a particular line of business, the user is able to limit the benchmarking peer group data set to the most relevant members, so that the aggregated data the company is compared are better matched with one another.

The time period, allows the user to determine what time frame the data set should be drawn from for he benchmarking process, allowing the analysis to be used for benchmarking against current types of coverage or to determine how the coverage differs from the historic industry average.

Lastly, the user can set the specific characteristics to limit the size of the peer group data set. Here the characteristics are defined by the coverage types that form the peer group as selected above. But for each characteristics, a limiting range can be set such that the only data is within the range will be included in the peer group data set. For example, if a policy limit comparison is being done, a user may select that the peer group data set be limited to policies with limits of 60 million, +/−25%. In such an instance the peer group data set will be limited to policies with limits of 45 million to 70 million dollars.

It is noted that when benchmarking module 460 of system 10 is used for larger corporations, certain conglomerates have revenue obtained from a number of subsidiaries, in diverse industries, making the assigning of a benchmarking peer group industry impossible. Conglomerates of comparable revenue generally do not have the same industry mix, while companies in the representative industries commonly have significantly less revenue.

In such instances, benchmarking module 460 of system 10 preferably offers users a model that uses policy level data from companies in the representative industries as input into algorithms that simulate the size, risk diversification features, and buying characteristics of conglomerates. Thus, if the conglomerate is vastly large than the rest of the industry the peer group data set can either be aggregated and then scaled up by the model, or alternatively, the data can be scaled up by the model and then aggregated. The model may also employ Monte Carlo simulations to generate an industry peer group of synthetic policies, from which quartiles can be calculated.

Figure 17B:
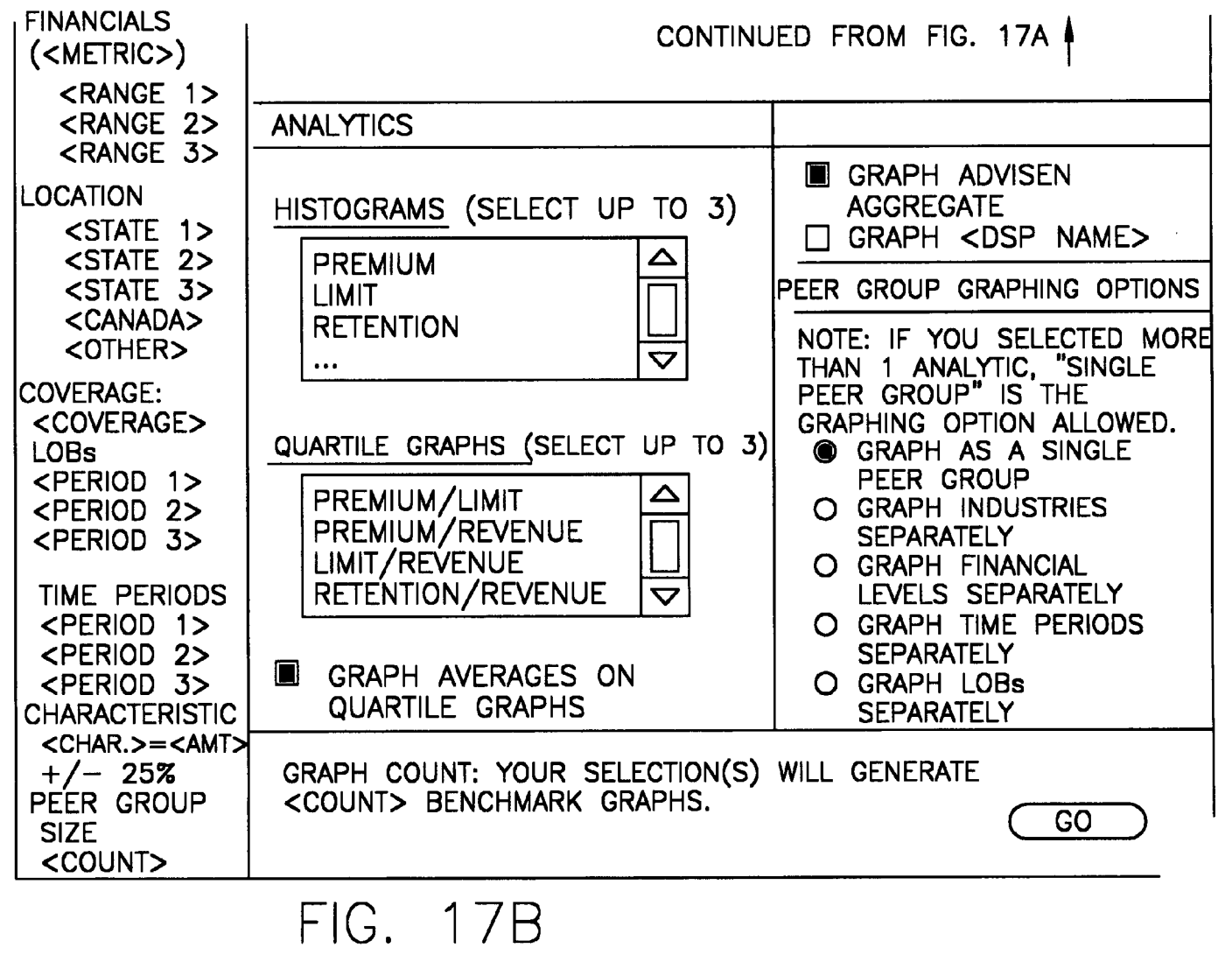

Once the peer group selection is completed and the company to be benchmarked is selected, the user then may progress to the benchmarking selection wireframe, illustrated in FIG. 17. Here, if the user selected a company they may limit the benchmarking result to a particular program and/or coverage for that company.

In an analytics section, also shown in FIG. 17, the user selects the information to be shown in the benchmark results, such as premiums, limits, retention, revenue etc. . . . These selections taken from the above selected characteristics from the previous wireframe in FIG. 16, and may be separated according to graph types on which they are more appropriately displayed. The user is also allowed to select from a number of additional graph options. Once all of the selected criteria are set, the user then instructs benchmarking module 460 to produce the graph results.

Figure 18A:
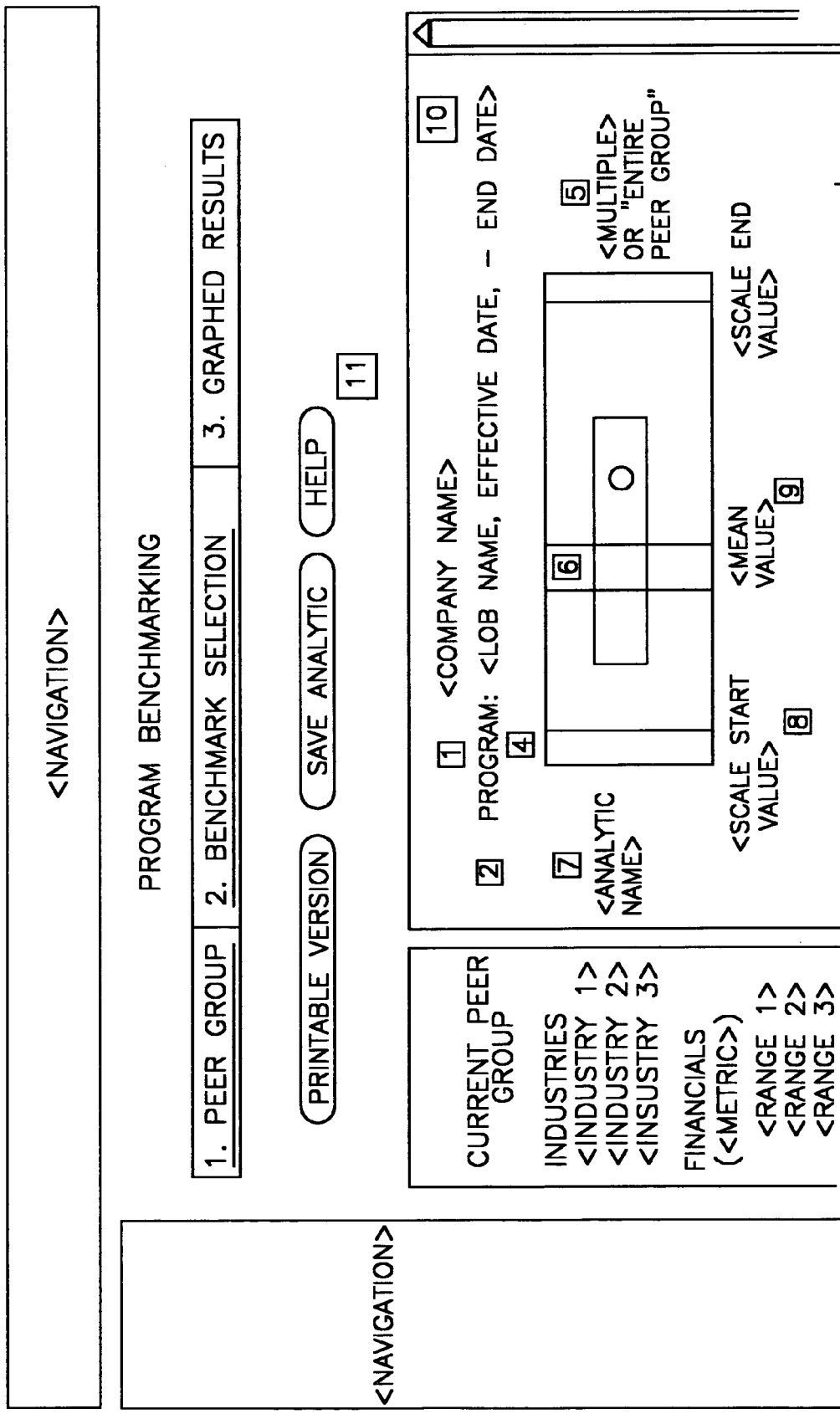
FIG. 18 is a wireframe for a quartile graph benchmarking entry as managed by a property and casualty benchmarking module, in accordance with one embodiment of the present invention.
Figure 18B:
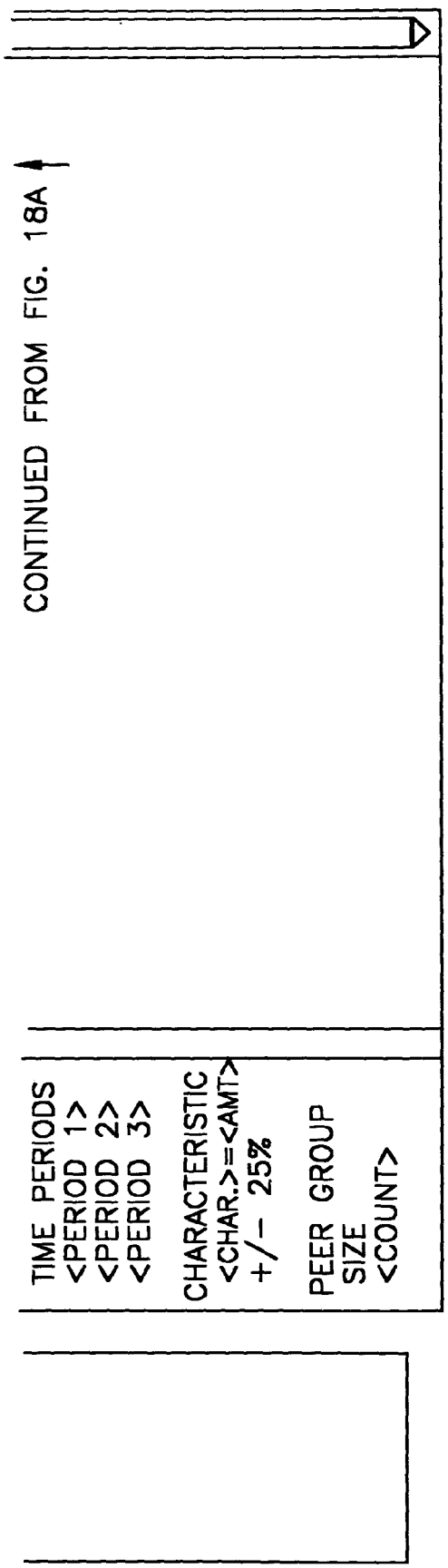

A first type of graph result is a quartile graph output wireframe, shown in FIG. 18. The graph output contains the company of being analyzed as well as a label containing a number of the selected benchmarking criteria that are reflected on the graph, such as LOB, effective dates, and end dates. The results show the scale, mean value for the data set, and where the analyzed company lies with respect to the aggregated data. In certain situations, where multiple LOBs were selected, benchmarking module 460 may produce multiple quartile graphs as necessary.

It is noted that if the user selected a number of industries to be compared against, benchmarking module 460 of system 10 may generate a separate graph for each industry or it can generate a single graph showing the comparison of the company against the peer group data set aggregated across all of the selected industries.

Figure 19B:
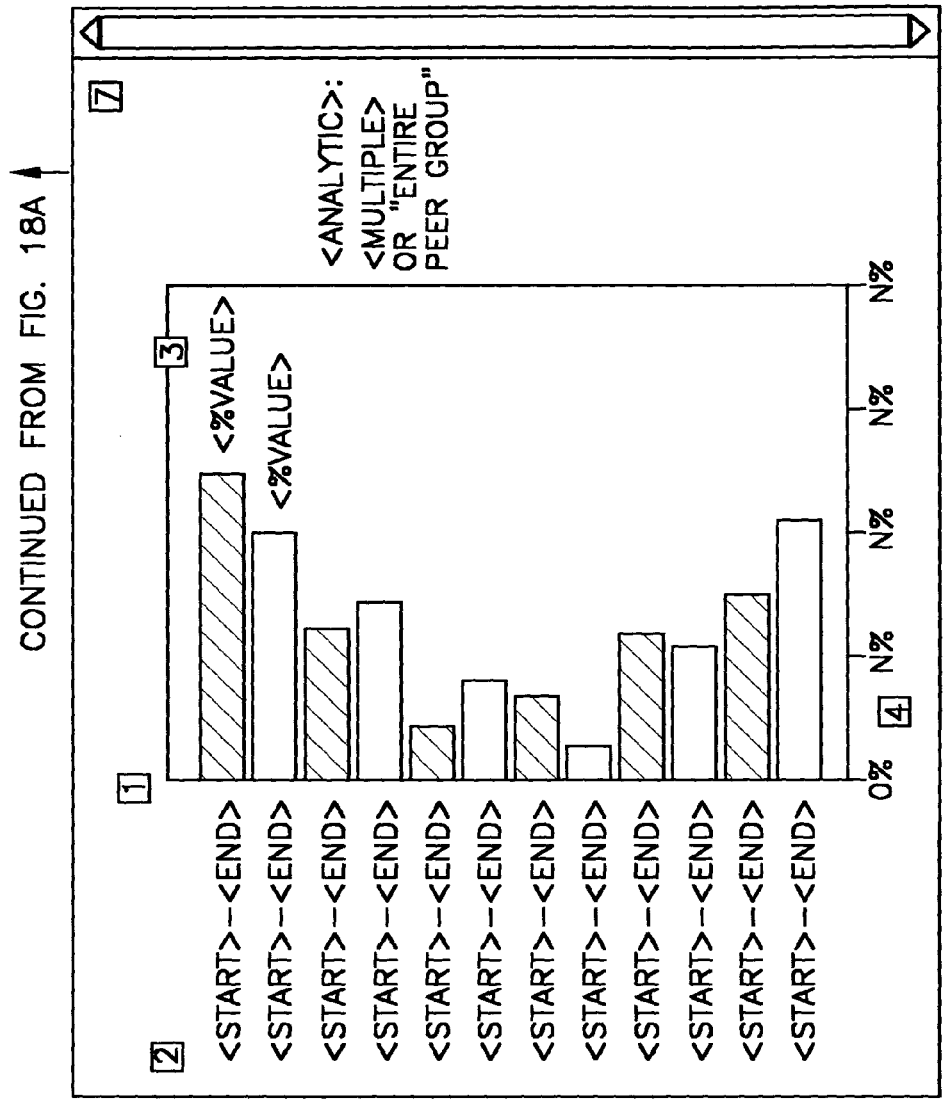
FIG. 19 is a wireframe for a histogram graph benchmarking entry as managed by a property and casualty benchmarking module, in accordance with one embodiment of the present invention.

If the user selected that the results be provided as a histogram, illustrated FIG. 19, the graphic out put again shows in the title the company being analyzed, the LOB being graphed, the effective dates and end dates. The histogram is usually used when a number of time periods are being benchmarked so that fluctuations against the industry(s) average over time can be easily viewed. The results for each time period compare the company's amount (for the selected criteria being benchmarked, such as premiums) as a percentage of the selected industry(s) aggregated data, for each of the selected time frames.

It is understood that the above description of the functions of benchmarking module 460 are intended only as an example of one manner of performing benchmarking analysis within system 10. Any similar benchmarking operation, that includes the same essential features to perform benchmarking analysis within a similar system 2 is also within the contemplation of the present invention.

Also, the graphing selections shown are intended as only one possible example of graphic output and are not intended in any way to limit the scope of the present invention. Any graphic output from a similar benchmarking module, using a similarly formed peer group data set is within the contemplation of the present invention.

Module 108 also includes a company comparison module 462 that is configured to perform comparison of key information of companies specified by the user.

Analytical module 108 also includes a league table module 46, which is configured to generate league tables. Module 108 also includes a co-charting module 468, which is configured to generate various charts as necessary. Module 108, also includes a risk accounting module 470, which is configured to conduct risk accounting as understood by those skilled in the art. RIMS data module 472 is configured to provide data developed by the Risk and Insurance Management Society industry, for research purposes of the user. Claims data module 474 is configured to provide the claims data related to a company specified by the user. Loss triangle module 476 is configured to perform loss triangle analysis.

The Loss Triangles feature enables policyholders to create a customized electronic loss history up to and including for example five years of data—aggregated in real-time on an annual basis—providing users with an integrated picture of how losses for Worker's Compensation, Automobile and General Liability and other coverages have developed over time.

The information can be tabulated by Loss Paid or Total Incurred and can also compare the worker's compensation results against industry averages using the latest National Council on Compensation Insurance (NCCI) statistics.

The Loss Triangle feature also provides the user with Loss Development Factors (LDF)—based on a company's specific loss experience—which, collectively can be strategically used to forecast future loss development or determine the effectiveness of specific risk management programs.

For example, a Loss Triangle report can be utilized to analyze the effectiveness of "back-to-work" initiatives-programs, which are traditionally implemented by many companies to limit Worker's Compensation losses. In addition, Loss Triangle reports can be used to measure the claims handling efficiency of Third Party Administrators (TPA).

Severity Monte Carlo Simulation module 478 provides the user with the tools necessary to perform that simulation, for actuarial and other calculations. Module 480 provides analysis for financial modeling of cost structures as desired by the user. Safety administration report module 482 generates reports relating to safety issues for mitigating risks related to an organization. Similarly engineering report module 484 is configured to generate engineering reports relates to various risks a specified organization is exposed. Finally, financial summary module 486, provides information related to the financials of the organization being researched by the user.

Figure 20:
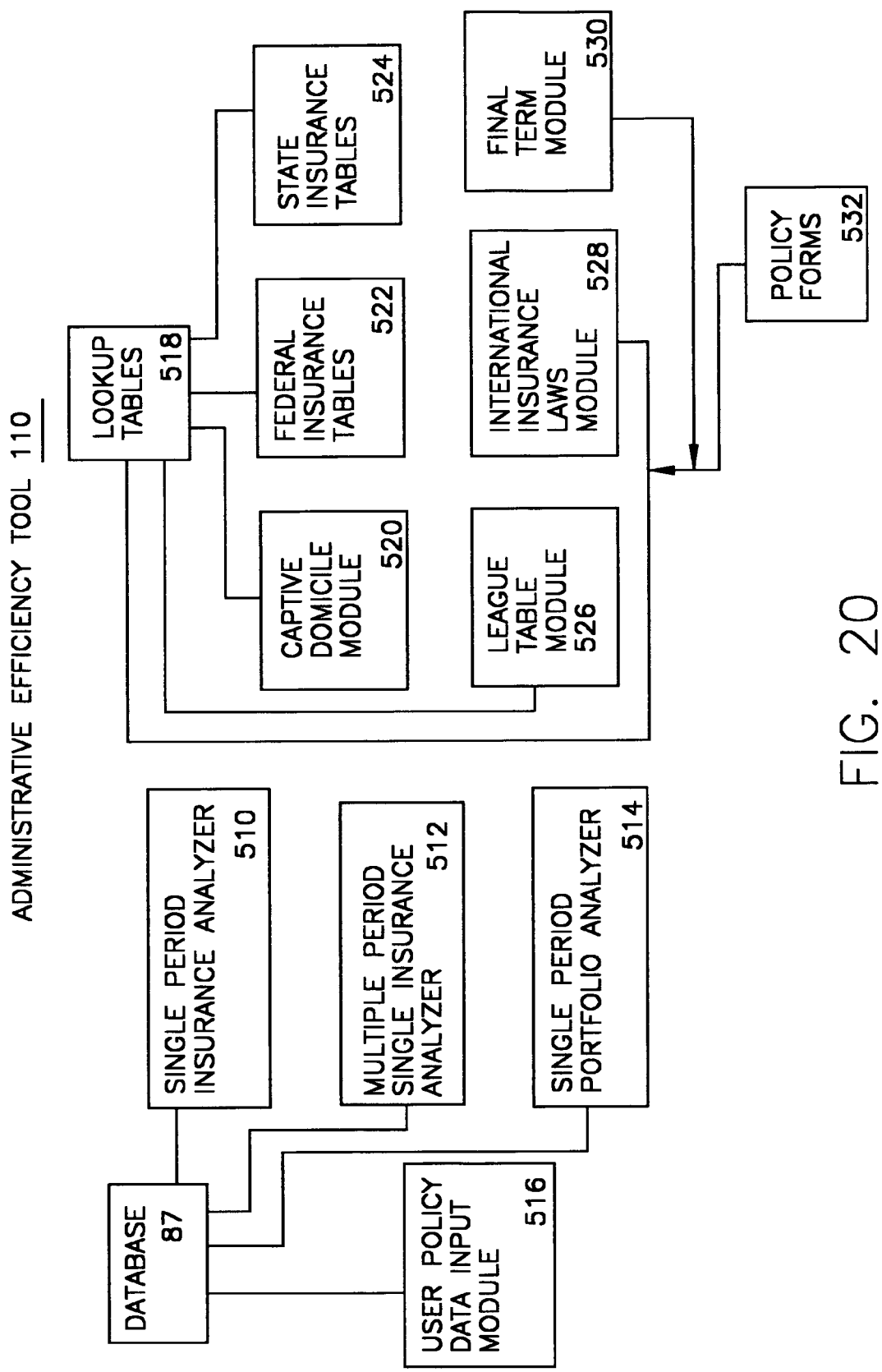
FIG. 20 is a block diagram of various components of administrative efficiency tool module, in accordance with one embodiment of the invention.

FIG. 20 is a block diagram of various components of administrative efficiency tool module 110, in accordance with one embodiment of the invention. Administrative efficiency tool module 110 is configured to provide a plurality of chart drawing functionalities that enable the user to asses various insurance programs. To this end module 110 includes a user policy data input module 516, which is configured to receive all relevant information relating to the insurance coverages of an organization as specified by the user. User policy data input module 516 is coupled to database 37 so that information relating to all users can be stored and employed by knowledge management system 28.

Figure 21:
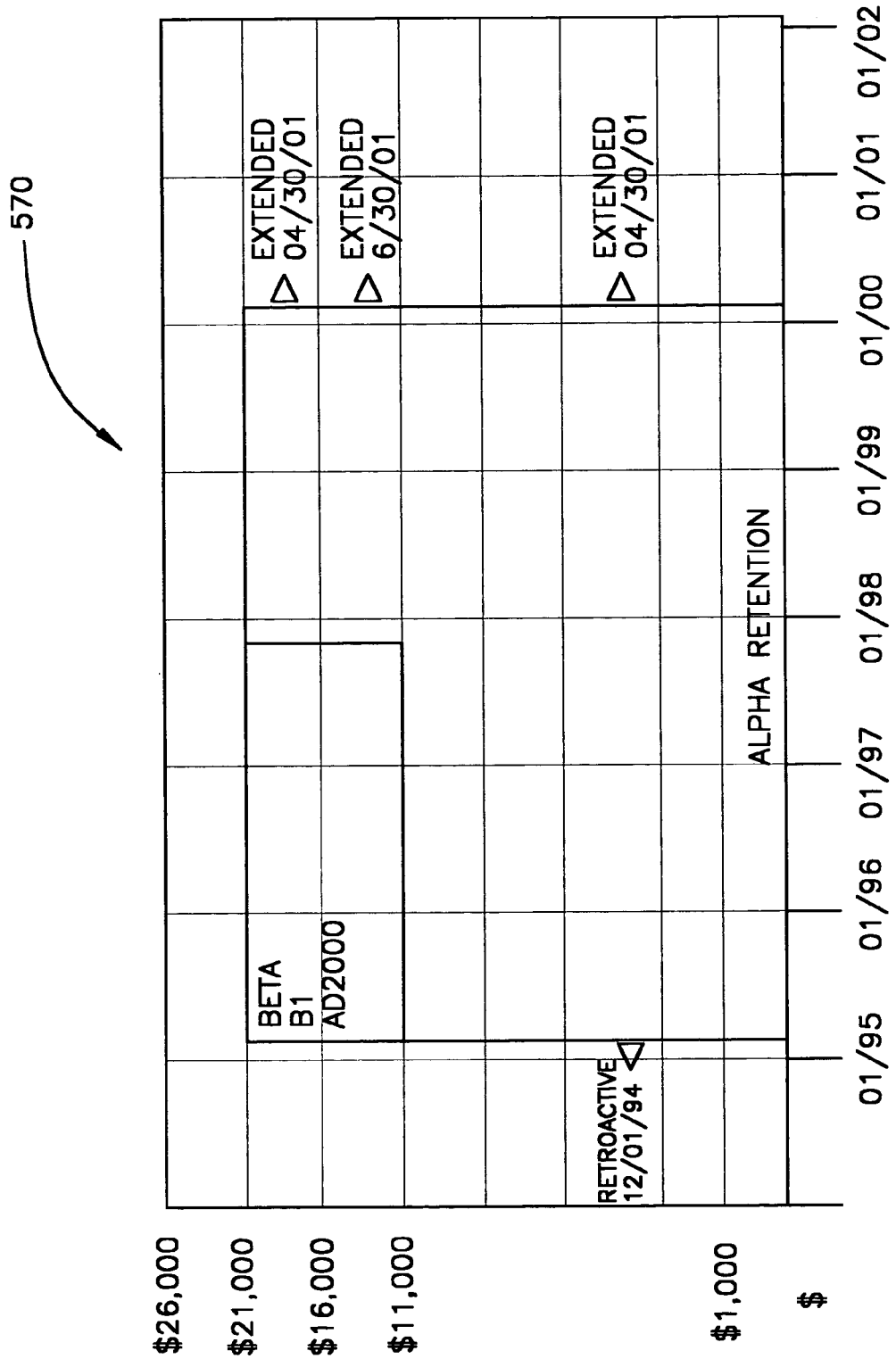
FIG. 21 illustrates an exemplary coverage chart for a single period specified by the user, in accordance with one embodiment of the invention.

Module 15 also includes a single period insurance analyzer that determines and charts a list of a specified insurance policy of an organization extended over a specified period. FIG. 21 illustrates an exemplary coverage chart 570 for a single period specified by the user. The chart includes various portions that identify the type of insurance coverage, the policy amount, its effective dates, and whether they are retroactive and/or extended. Chart 570 provides the user with a visual summary of all pertinent insurance information of a company within a specified period.

Figure 22:
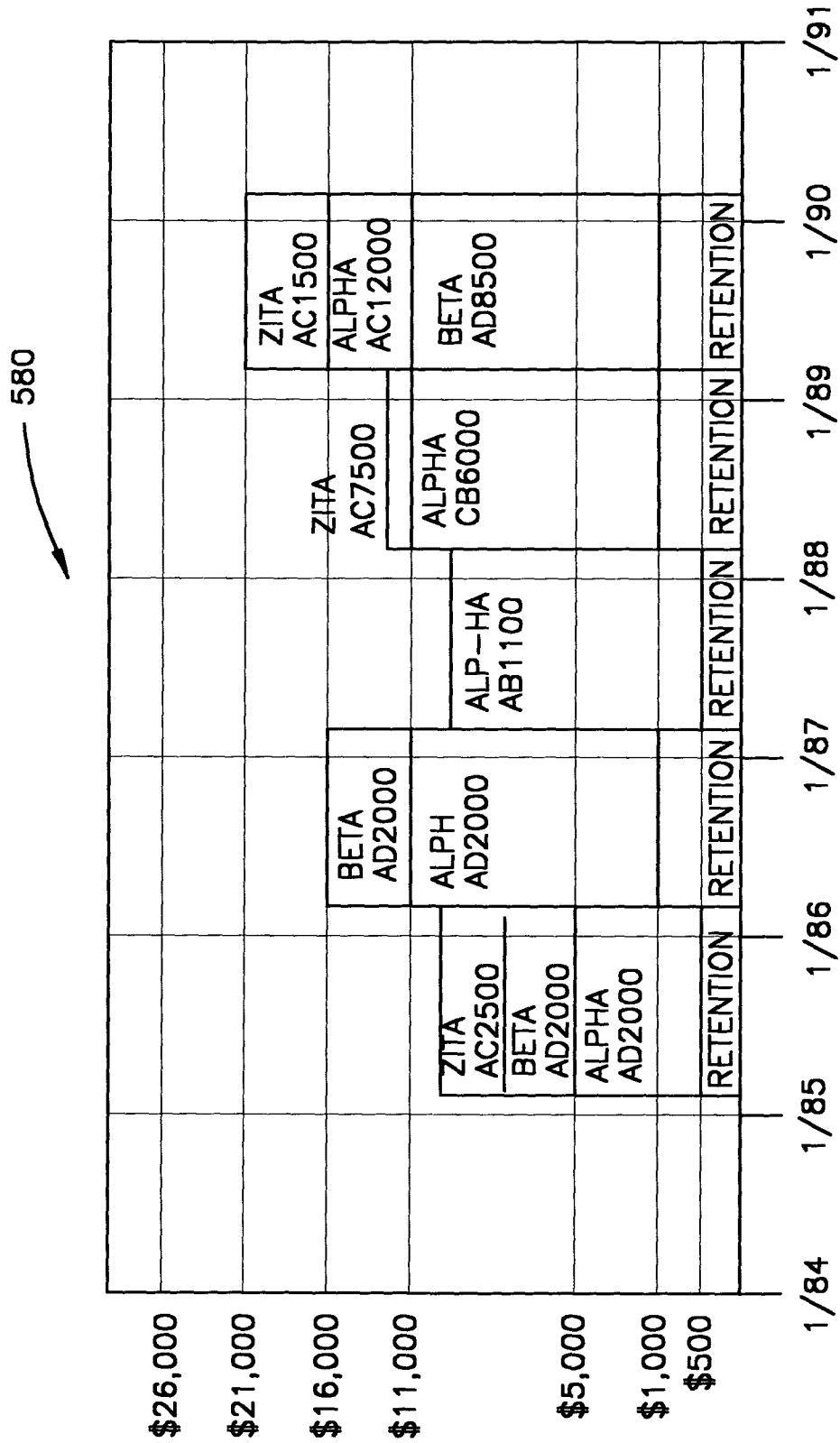
FIG. 22 illustrates an exemplary coverage chart for a multiple period single insurance program specified by the user in accordance with one embodiment of the invention.

Referring back to FIG. 20, administrative efficiency module 110 also includes a multiple period single insurance analyzer 512, which is configured to provide a visual table that summarizes a single insurance program of an organization within multiple periods. FIG. 22 illustrates an exemplary coverage chart 580 for a multiple period single insurance program specified by the user in accordance with one embodiment of the invention. The chart includes various portions that identify the liability converage for each specified period over many periods, for example, on a yearly basis over a period of five years.

Figure 23:
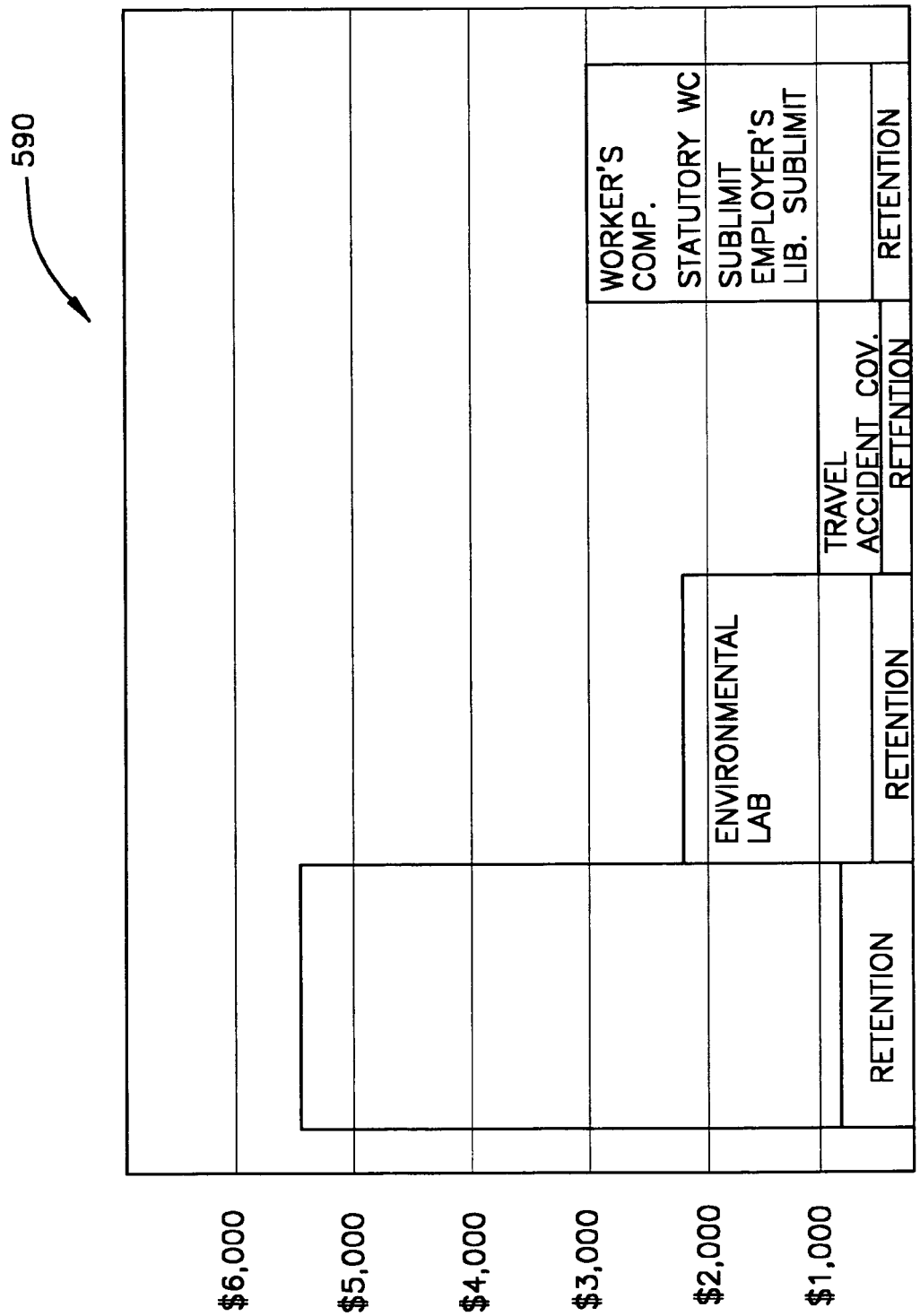
FIG. 23 illustrates an exemplary coverage chart for a single period portfolio insurance view in accordance with one embodiment of the invention.

Referring back to FIG. 20, administrative efficiency module 110 also includes a single period portfolio analyzer 514, which is configured to provide a visual table that summarizes the portfolio of all insurance policies owned by an organization over a specified period. FIG. 23 illustrates an exemplary coverage chart 590 for a single period portfolio insurance view in accordance with one embodiment of the invention. Thus, the chart illustrates that for a specified period, the organization has commercial general liability insurance with various sublimits, an environmental liability insurance, a travel accident coverage and a workers compensation coverage.

Figure 25A:
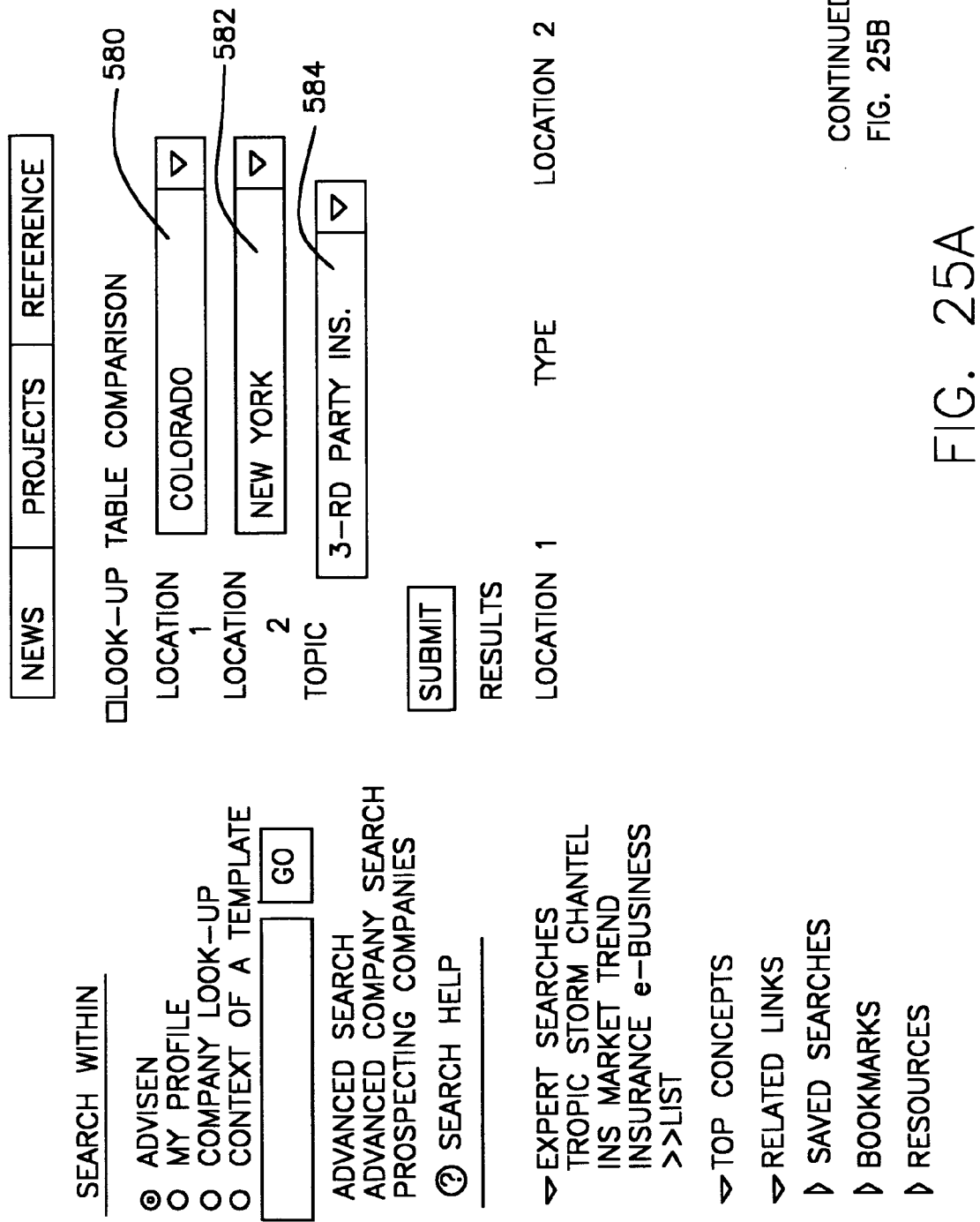
FIG. 25 illustrates a work space for look up table comparison function in accordance with one embodiment of the invention.

FIG. 25 illustrates the format that user policy data input module 516 collects insurance information from the user, and the format that illustrates the graphic displays in accordance with one embodiment of the invention.

Referring back to FIG. 20, a look up module 518 is configured to provide various look up functionalities for the user. As such, administrative efficiency tool module includes a captive domicile module 520 coupled to look up table module 518. Captive insurance refers to a subsidiary corporation established to provide insurance to the parent company and its affiliates. A captive insurance company represents an option for many corporations and groups that want to take financial control and manage risks by underwriting their own insurance rather than paying premiums to third-party insurers.

Figure 26D:
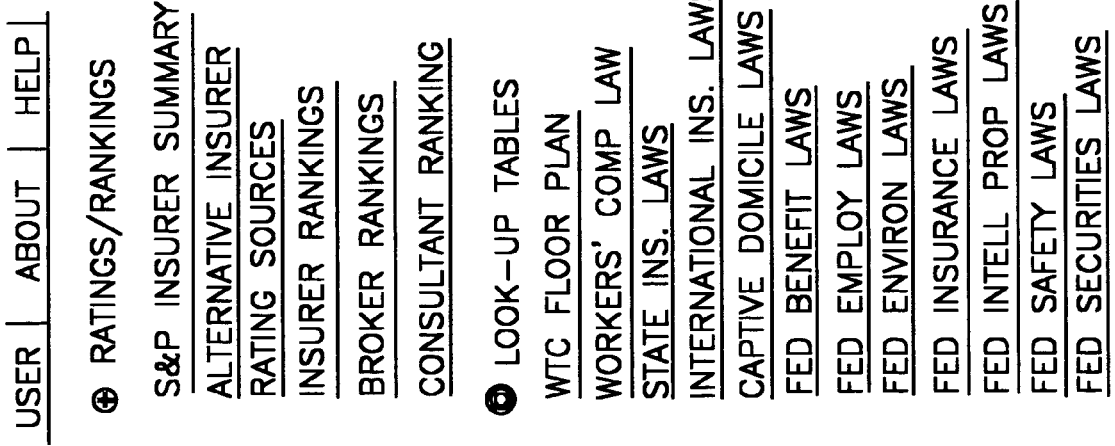
FIG. 26 illustrates an example of a look up table that enables the user to view a treatment of a topic in all available jurisdictions in accordance with one embodiment of the invention.

However, many insurance issues, such as captive domicile are governed by various state and federal regulations that vary in each jurisdiction. Look up table module 518, in accordance with one embodiment of the invention, allows the user to retrieve comparison tables, that set forth various rules relating to an issue so the user can asses the benefits and trade offs between each jurisdiction. To this end, FIG. 26 illustrates a work space 304, for look up table comparison function, wherein field 580 is used to state one jurisdiction (eg. Colorado), while field 582 is used to state another jurisdiction (eg. New York). For field 584, the user selects the topics that are available for comparison. In response look up table 518 prepares a corresponding look up table for the two jurisdictions and retrieves the relevant topics in each jurisdiction for display. This feature enables the user to efficiently retrieve regulations relating to an issue and further to compare their treatment in each jurisdiction.

In accordance with another embodiment of the invention, it is possible to select a topic and in response retrieve all jurisdictions that have corresponding regulations relating to that topic. FIG. 26 illustrates an example of a look up table that enables the user to view a treatment of a topic in all available jurisdictions. Thus, for example, a user can select a topic referred to as the name of statute(s) relating to an issue and request the system to identify the corresponding statute in each of the available jurisdictions, as depicted in FIG. 26.

Referring back to FIG. 20, administrative efficiency tool 110 includes a federal insurance laws module 522, coupled to look up table module 518, which is configured to provide look up comparisons, related to federal insurance law topics. Module 110, also includes a state insurance laws module 524, coupled to look up table module 518, which is configured to provide look up comparisons, related to state insurance law topics. Module 110 also includes an international insurance laws module 528, coupled to look up table module 518, which is configured to provide look up comparisons, related to international law topics.

Two additional modules coupled to look up table 518 include league table module 526, which provides comparison of various insurance ratings and financial term module 530, which is configured to provide financing topics for each jurisdiction.

Finally a policy form 532 module is also coupled to look up table 518. Policy form 532, is configured to provide a table of how various policies have treated a certain topic, by providing examples of prior forms. This enables the user to get an overall impression of coverages, exclusions, definitions for each form and jurisdiction.

It is noted that the present information management system although described in relation to the insurance industry, can be employed in other applications and is not limited in scope in that respect. For example, certain features of the present invention, can be used in any environment that requires substantial research functionality, such as law, medicine and finance. The contextualization and concept clustering modules can be easily configured for example, in a legal research engine, such as those commercially available like LEXIS and Westlaw.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

What is claimed is:

1. A system for providing information on risks and related hedging strategies to a plurality customers, said system comprising:
   a server for receiving communications from said plurality of customers each having client terminals, said server configured to allow said plurality of customers' client terminals to access said system for providing and accessing information corresponding to risks and related hedging strategies;
   a data aggregation module coupled to said server configured to store both financial information and said information corresponding to risks and related hedging strategies provided by a plurality of data sources, said plurality of data sources including private customer data sources and public data sources, wherein said private customer data sources includes aggregated financial and transaction data from said plurality of customers and wherein said information corresponding to risks and related hedging strategies from said private customer data sources is associated with one or more industries to which said transaction data is applicable;
   an analytical module coupled to said data aggregation module, said analytical module configured to perform benchmarking estimates for said plurality of customers using said financial information and said information corresponding to risks and related hedging strategies from both said private customer data sources and public data sources retrieved from said data aggregation module,
   wherein said benchmarking estimates for said plurality of customers are based on said financial information and said information corresponding to risks and related hedging strategies from said public data sources as well as said aggregated financial and transaction data supplied from said plurality of customers to said system,
   and wherein said benchmarking estimates are performed for each customer of said plurality of customers using combined data from said private customer data sources and said public data sources from a plurality of industries, where each benchmarking estimate for said each customer, among said plurality of customers, is assigned a weighted assessment against a plurality of industries such that said benchmark estimates provided to said each customer are customizably weighted by percentage for comparison against public and private customer data with corresponding industry weighting,
   said system configured to generate a benchmarking estimate report for each of said plurality of customers, including said weighted assessment against said plurality of industries.

2. The system in accordance with claim 1, wherein said private customer data sources include asset information corresponding to each customer of said plurality of customers whose information is stored in said data aggregation module, said asset information including one or more of asset categories from a list comprising real estate assets, automobile assets, inventory assets, technology assets and heavy equipment assets.

3. The system in accordance with claim 1, wherein said private customer data sources include legal information, insurance policy information, and claims information.

4. The system in accordance with claim 1, wherein said private customer data sources include financial information selected from the group consisting of payroll and general ledger information.

5. The system in accordance with claim 1, wherein said each customer of said plurality of customers is a subsidiary of a conglomerate, such that said benchmarking analysis more accurately reflects a comparison industry peer group.

6. The system as claimed in claim 1, wherein
   said analytical module performs benchmarking estimates against modeled data, said modeled data being an estimated data derived from said private customer data sources and said public data sources.

* * * * *